United States Patent [19]
Hamada et al.

[11] Patent Number: 5,734,938
[45] Date of Patent: *Mar. 31, 1998

[54] AUTOMATIC FOCUSING APPARATUS OF A CAMERA

[75] Inventors: Masataka Hamada; Tokuji Ishida; Hiroshi Ootsuka, all of Osaka, Japan

[73] Assignee: Minolta Co., Ltd., Osaka, Japan

[21] Appl. No.: 590,349

[22] Filed: Jan. 23, 1996

[*] Notice: The term of this patent shall not extend beyond the expiration date of Pat. No. 5,517,274.

Related U.S. Application Data

[62] Division of Ser. No. 314,930, Sep. 29, 1994, Pat. No. 5,517,274, which is a continuation of Ser. No. 22,888, Feb. 16, 1993, abandoned, which is a continuation of Ser. No. 592,799, Oct. 4, 1990, abandoned, which is a division of Ser. No. 351,167, May 12, 1989, Pat. No. 4,988,856.

[30] Foreign Application Priority Data

May 13, 1988 [JP] Japan ................................ 63-117439

[51] Int. Cl.$^6$ ................................................ G03B 13/34
[52] U.S. Cl. ................................................ 396/95; 396/121
[58] Field of Search ................................ 354/402, 406, 354/407, 408, 403; 250/201.2, 201.7, 201.8; 348/392; 396/95

[56] References Cited

U.S. PATENT DOCUMENTS

| | | | |
|---|---|---|---|
| 4,816,856 | 3/1989 | Hamada et al. | 354/402 |
| 4,831,403 | 5/1989 | Ishida et al. | 354/402 |
| 4,860,045 | 8/1989 | Hamada et al. | 354/402 |
| 4,872,058 | 10/1989 | Baba et al. | 354/402 |
| 4,882,601 | 11/1989 | Taniguchi et al. | 354/407 |
| 4,988,856 | 1/1991 | Hamada et al. | 250/201.8 |
| 5,023,646 | 6/1991 | Ishida et al. | 354/402 |
| 5,031,049 | 7/1991 | Toyama et al. | 354/402 |
| 5,049,731 | 9/1991 | Ishida et al. | 354/408 |
| 5,053,801 | 10/1991 | Ishida et al. | 354/402 |
| 5,517,274 | 5/1996 | Hamada et al. | 354/402 |

*Primary Examiner*—Russell E. Adams
*Attorney, Agent, or Firm*—Burns, Doane, Swecker & Mathis, LLP

[57] ABSTRACT

An automatic focusing apparatus of a camera according to the present invention includes: a focus detector which detects repeatedly focus conditions of a photographic lens and outputs successively focus signals corresponding to the focus conditions; a drive unit for driving the photographic lens for focus adjustment; a predictor for predicting an in-focus point from the plurality of focus signals from the focus detector; a control unit for controlling the drive unit to drive the photographic lens toward the in-focus point predicted by the predictor; an auxiliary light projector for projecting auxiliary light onto an object to enable detecting operation of the focus detector; and a forbidding device for forbidding the control of drive by the control unit while the auxiliary light is projected by the auxiliary light projector.

22 Claims, 69 Drawing Sheets

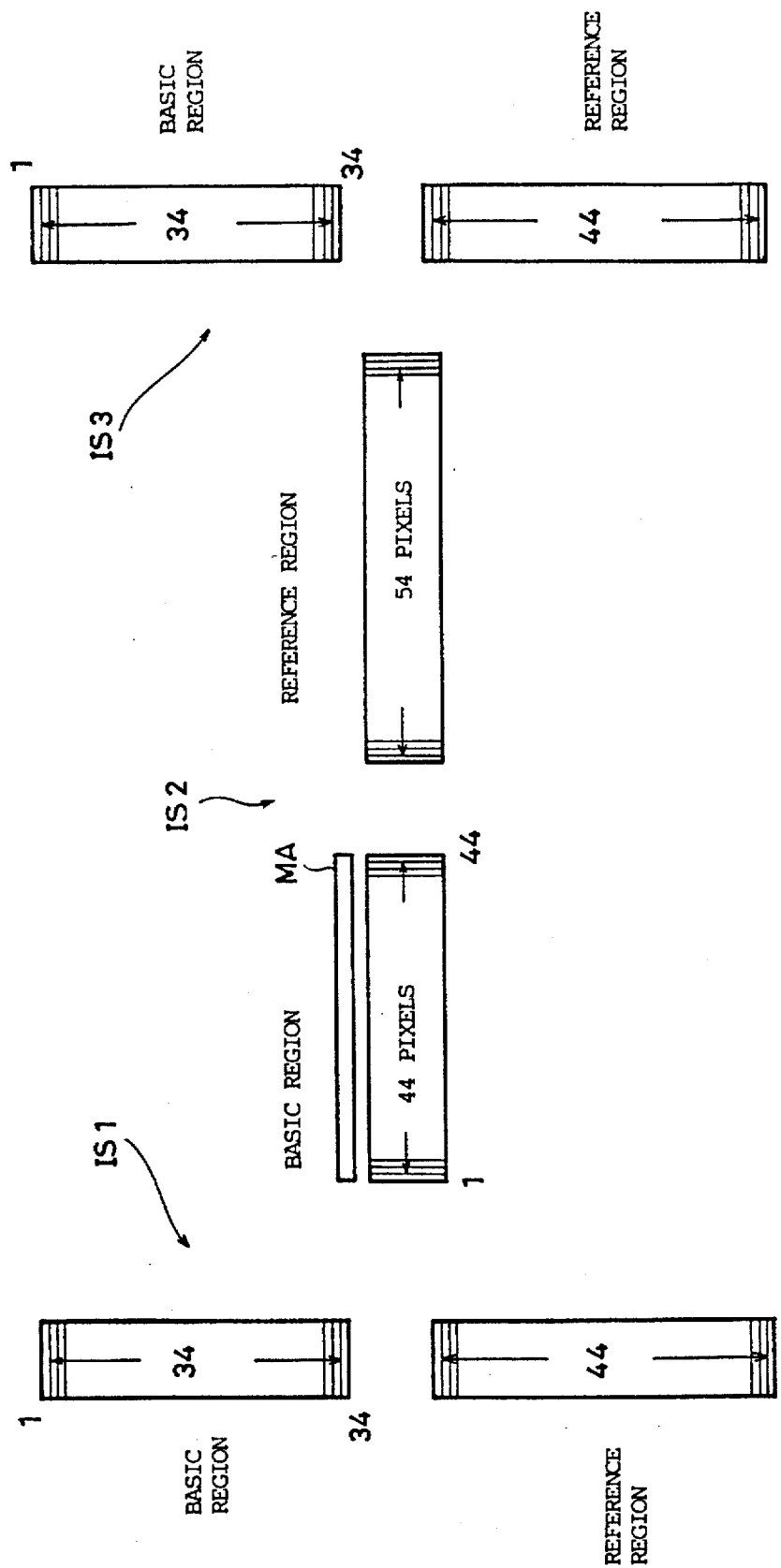

FRONT FOCUS (DISTANT SIDE)    REAR FOCUS (NEAR SIDE)

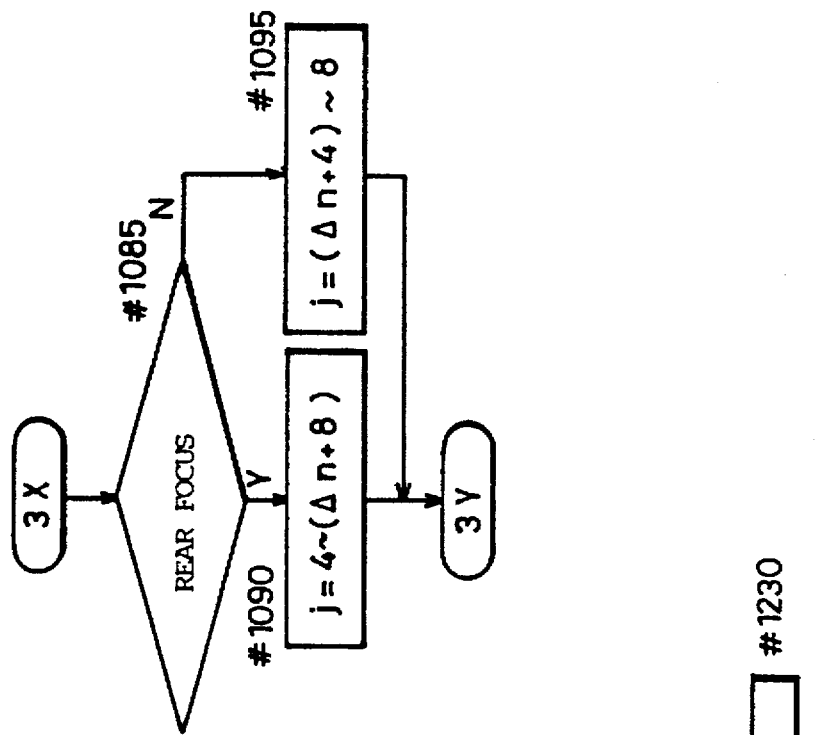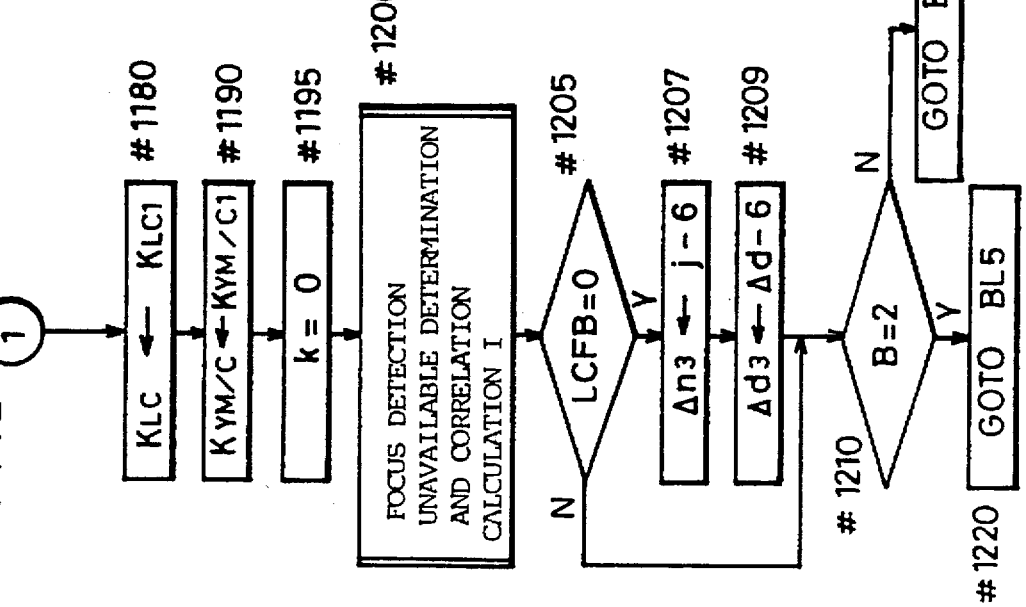

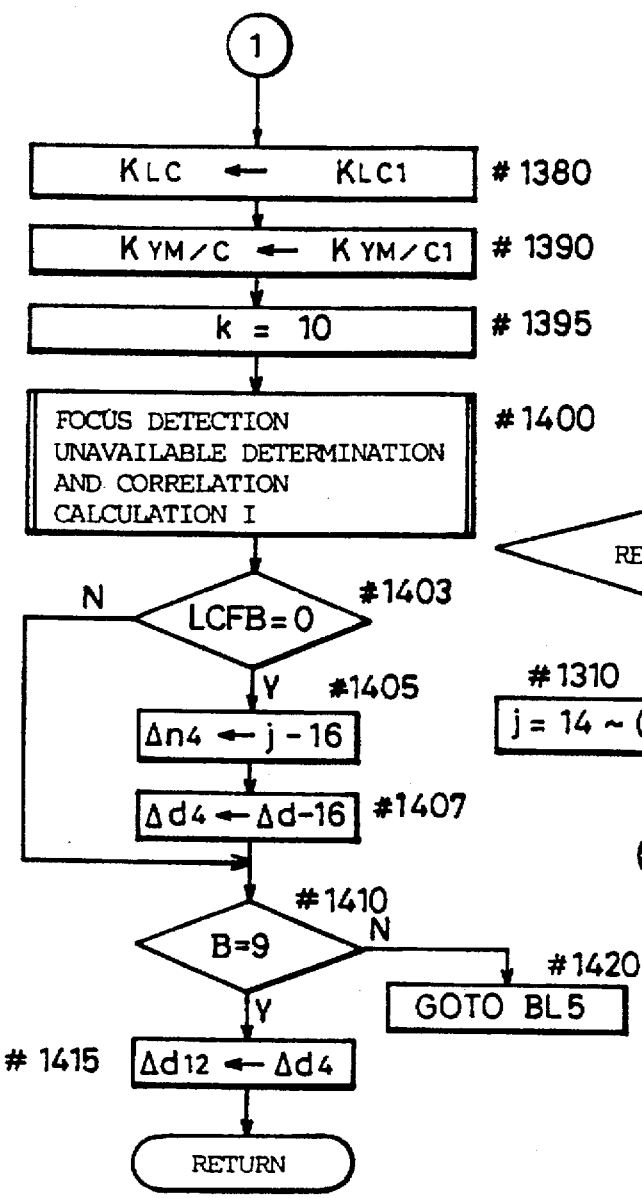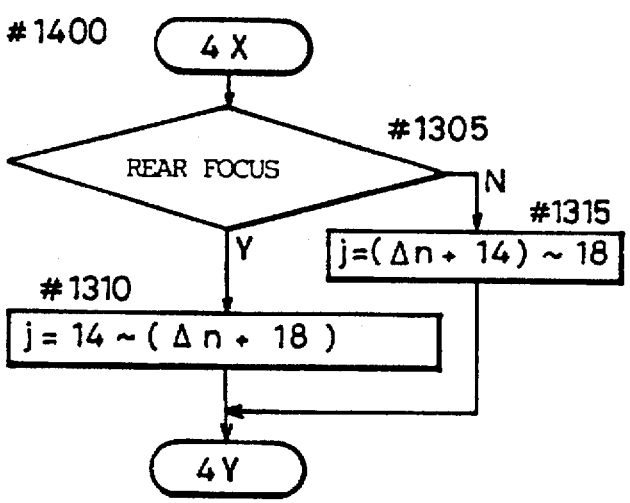

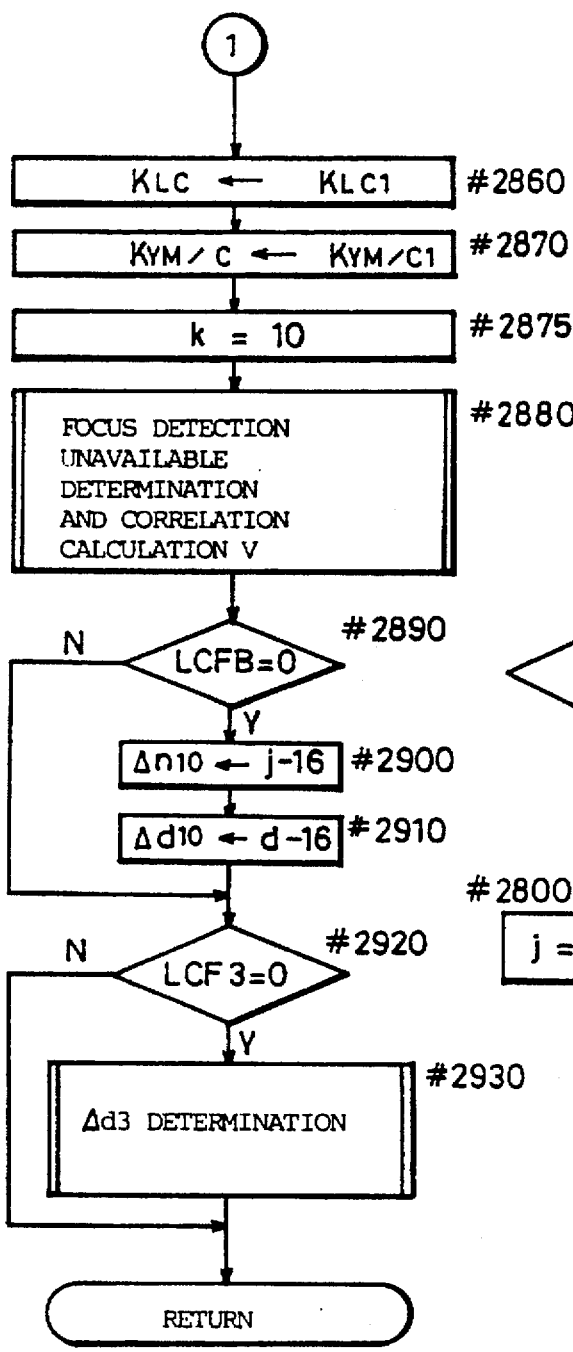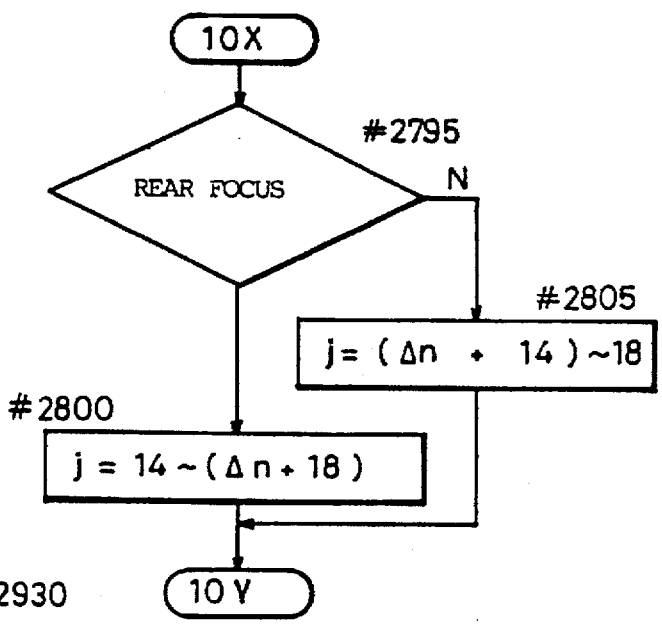

AUTOMATIC FOCUSING APPARATUS OF A CAMERA

This application is a divisional of application Ser. No. 08/314,930, filed Sep. 29, 1994, now U.S. Pat. No. 5,517, 274 which is a continuation of application Ser. No. 08/022, 888, filed Feb. 16, 1993, now abandoned which is a continuation of application Ser. No. 07/592,799, filed Oct. 4, 1990, now abandoned which is a divisional of application Ser. No. 07/351,167, filed May 12, 1989, now U.S. Pat. No. 4,988,856.

BACKGROUND OF THE INVENTION

1. Field of the Invention

The present invention relates to an automatic focusing (AF) apparatus of a camera and particularly to an AF apparatus of a camera, which detects repeatedly in-focus condition through a photographic lens while driving the photographic lens, predicts an in-focus point, namely, a moving amount by which the lens is driven for setting the focusing condition, based on the results of the detections, and drives the photographic lens toward the predicted in-focus point.

2. Description of the Related Art

According to U.S. Pat. No. 4,762,986, it is proposed that if a predicted value for an in-focus point by the so-called hill climbing method differs by more than a prescribed value from an actual value obtained by driving according to the predicted value, prediction control operation is forbidden because the predicted value is regarded as lacking reliability. In addition, in an AF apparatus of a camera, which drives a lens by obtaining an amount of defocus and a defocusing direction by the so-called TTL phase difference system, if an object to be photographed is a moving object, an in-focus point for the moving object is predicted so that the lens is driven, as proposed in U.S. patent application Ser. No. 936,103 assigned to the same assignee of the present application. According to this apparatus of U.S. patent application Ser. No. 936,103, moving object determining operation as to whether the object is a moving object or not is not effected in cases in which the defocusing directions detected at the previous time and at the present time are reversed, a value for converting the defocus amount to a lens drive amount is larger than a prescribed value, the defocus amount is larger than a prescribed amount, or a charge accumulation period of a charge coupled device (CCD) for focus detection is longer than a prescribed value.

However, for example if zooming operation is carried out, a size of an image on the focus detection CCD changes considerably or in the case of an object photographed in a large magnification, a small movement of the object causes a large movement on the CCD. As a result, it happens that a correct defocus amount cannot be obtained, making it impossible to predict an in-focus point for the moving object. The above mentioned conventional AF apparatus does not give any disclosure as to the countermeasures. In addition, if focus detection is effected by projection of auxiliary light to an object having a low luminance, a noise component is liable to be superimposed onto an output of the CCD and blur of an image due to the movement of the object cannot be disregarded. Thus, the focus detection precision is lowered and, consequently, the in-focus point for the moving object cannot be predicted.

SUMMARY OF THE INVENTION

An object of the present invention is to achieve focusing operation with high reliability in an automatic focusing apparatus of a camera.

Another object of the present invention is to achieve focusing operation with high reliability independent of a magnification in an automatic focusing apparatus of a camera.

Still another object of the present invention is to achieve focusing operation with high reliability even if an object has a low luminance and auxiliary light is used in an automatic focusing apparatus of a camera.

A further object of the present invention is to predict correctly an in-focus point for a moving object in an automatic focusing apparatus of a camera.

A still further object of the present invention is to achieve correctly focusing operation independent of whether an object is a still object or a moving object, in an automatic focusing apparatus of a camera.

In order to attain the above described objects, an automatic focusing apparatus according to an aspect of the present invention includes: a focus detector, a drive device, a predictor, a control device, an auxiliary light projector, and a forbidding device. The focus detector detects repeatedly in-focus conditions of a photographic lens and outputs focus signals successively based on the results of the detections. The drive device drives the photographic lens for focus adjustment. The predictor predicts an in-focus point from the plurality of focus signals from the focus detector. The control device controls the drive device so that it drives the photographic lens toward the in-focus point predicted by the predictor. The auxiliary light projector projects auxiliary light onto an object so that the focus detector can carry out detecting operation. The forbidding device forbids the drive control of the control device when the auxiliary light is projected by the auxiliary light projector.

In the automatic focusing apparatus of the camera constructed as described above, the drive of the photographic lens is controlled dependent on whether the auxiliary light is projected or not and, thus, reliability of focus adjustment is improved.

In order to attain the above described objects, an automatic focusing apparatus according to another aspect of the present invention includes: a focus detector, a drive device, a predictor, a control device, a changing device, a change detecting device, and a forbidding device. The focus detector detects repeatedly focus conditions of a photographic lens and outputs focus signals successively based on the results of the detections. The drive device drives the photographic lens for focus adjustment. The predictor predicts an in-focus point from the plurality of focus signals from the focus detector. The control device controls the drive device so that it drives the photographic lens toward the in-focus point predicted by the predictor. The changing device changes a focal length of the photographic lens. The change detecting device detects a change in focal length of the photographic lens. The forbidding device forbids the device control of the control device in response to a detection output of the change detecting device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are views showing details of a CCD chip used for focus detection in FIG. 2.

FIGS. 14A, 14B and 14C are flowcharts showing detailed procedures of the correlation calculation subroutine in FIG. 10.

FIGS. 16A, 16B and 16C are flowcharts showing detailed procedures of correlation calculation of the fourth block in FIG. 14B.

FIGS. 30A, 30B and 30C are flowcharts showing detailed procedures of correlation calculation of the tenth block in FIG. 28B.

DESCRIPTION OF THE PREFERRED EMBODIMENTS

Figure 1:
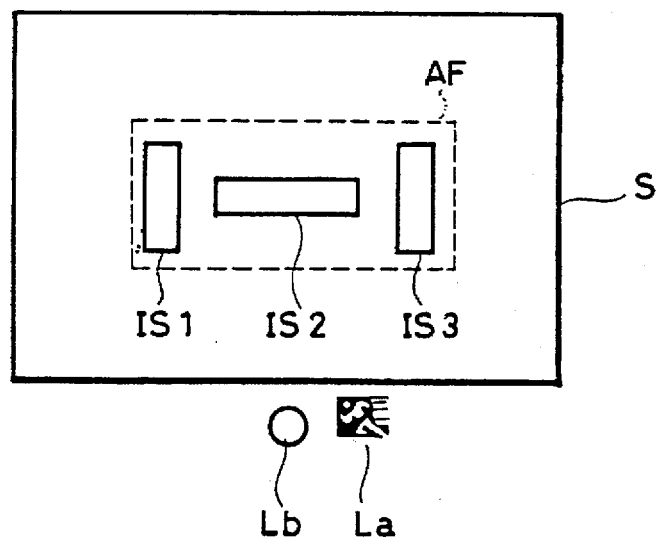
FIG. 1 is a view showing a display in a finder of a camera according to an embodiment of the present invention.

FIG. 1 shows focus detection areas in a photographing area of a camera using an automatic focusing apparatus according to an embodiment of the invention, as well as a display in a finder.

In this example, focus detection can be effected for the objects in three areas IS1, IS2 and IS3 (referred to hereinafter as the first to third islands) shown by the solid lines in the central portion of the photographing area S. A rectangular frame AF shown by the dotted lines is given to indicate the region where focus detection is effected, for the photographer. A display element Lb located outside the photographing area S serves to indicate a focus detection state. It is illuminated in green when an in-focus condition is attained and it is illuminated in red when focus detection cannot be effected. A mark La is provided to display a prediction mode as described afterwards.

Figure 2:
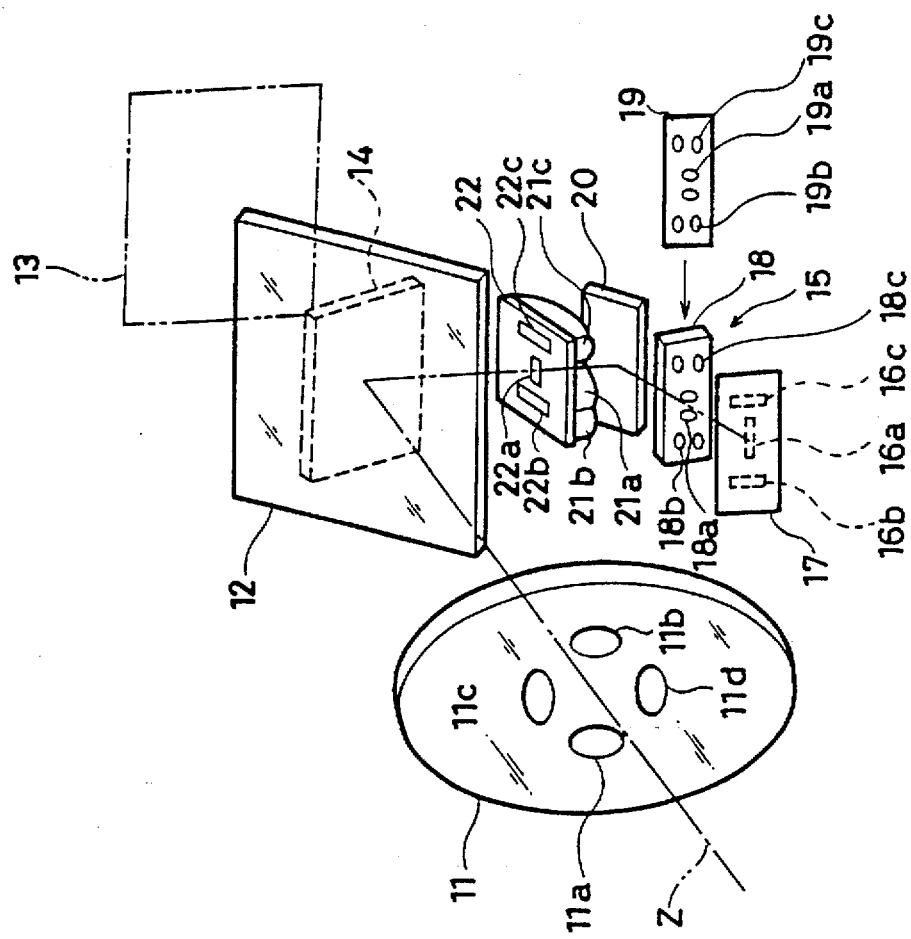
FIG. 2 is a perspective view of a focus detection optical system according to the embodiment of the invention.

FIG. 2 is a view showing a general construction of a multiple point focus detection module having the above described focus detection areas. Referring to FIG. 2, this module comprises a photographic lens 11, a main mirror 12, a sub mirror 14, and a focus detection optical system 15. A field aperture unit 22 has rectangular apertures 22a, 22b and 22c and is arranged in the vicinity of a plane equivalent to a film surface 13. The module further comprises condenser lenses 21a, 21b and 21c, a module mirror 20, separator lens pairs 18a, 18b and 18c, and CCD image sensor arrays 16a, 16b and 16c arranged on a focal plane 17 of the separator lens pairs. An aperture mask 19 has circular or oval aperture pairs 19a, 19b and 19c. An image the visual angle of which is limited by the rectangular opening 22a passes through the condenser lens 21a and it is projected as two images on the CCD image sensor array 16a through the field apertures 19a and the separator lens pair 18a. If a spacing of the two images is a prescribed spacing, an in-focus condition is determined. If it is shorter than the prescribed spacing, a front focus condition is determined and if it is longer than the prescribed spacing, a rear focus condition is determined. The images through the field aperture pairs 19b and 19c are projected on the CCD image sensor arrays 16b and 16c through the condenser lenses 21b and 21c and the separator lens pairs 18b and 18c, respectively.

FIG. 3A shows light receiving portions of the CCD image sensor arrays used in this focus detection module (each CCD image sensor array including a light receiving portion, an accumulating portion and a transfer portion and being referred to hereinafter simply as "CCD"). A basic region and a reference region are provided for each of the islands IS1, IS2 and IS3 shown in FIG. 1 and a monitoring light receiving element MA for controlling an integration period for the accumulation portion of the CCD is provided on one of the lateral longitudinal sides of the basic region in the central island IS2. The numbers (X, Y) of pixels of the basic and reference regions of the respective islands IS1, IS2 and IS3 are (34, 44) in the island IS1, (44, 54) in the island IS2 and (34, 44) in the island IS3. Those islands IS1 to IS3 are all formed on one chip.

In the focus detection module of this embodiment, the basic region of each of the above mentioned three islands is divided into a plurality of blocks and focus detection is effected by comparing each block thus divided in the basic region with all or part of the reference region. Data of the rearmost focus out of the results of focus detections in the respective blocks is used as focus detection data in each island and, based on the focus detection data of each island, focus detection data of the camera is evaluated (to be described in detail afterwards).

Figure 3B:
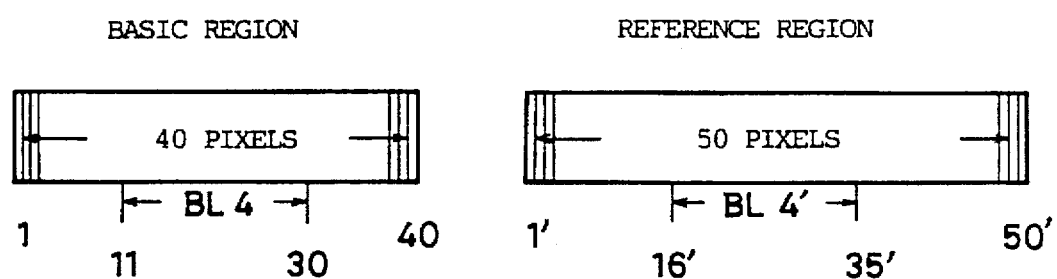
Figure 4:
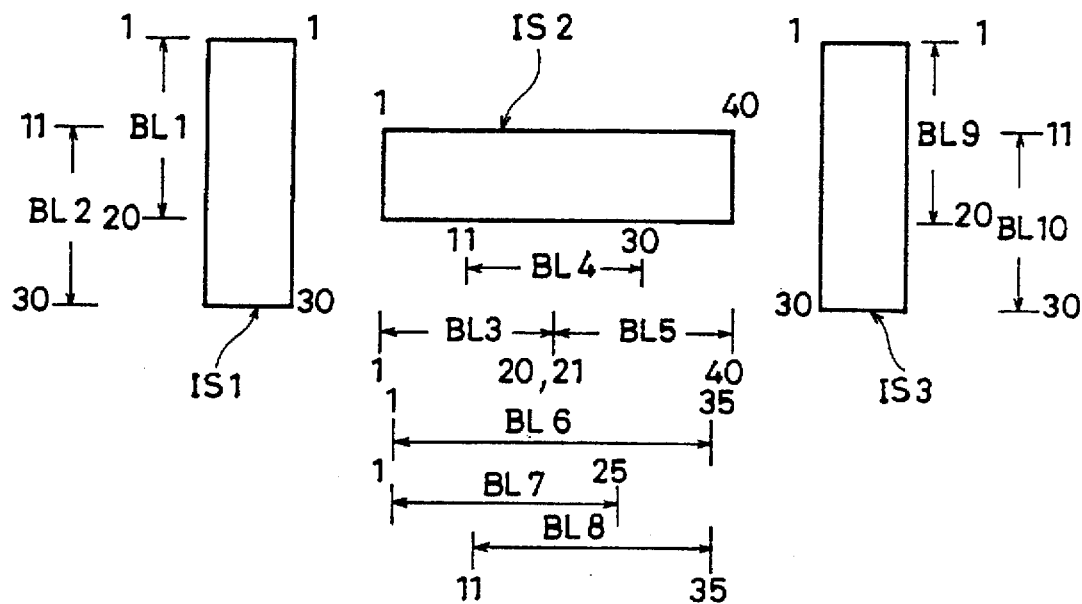
FIG. 4 is an illustration for explanation showing divided areas of a basic region in the CCD chip shown in FIGS. 3A and 3B.
Figure 5:
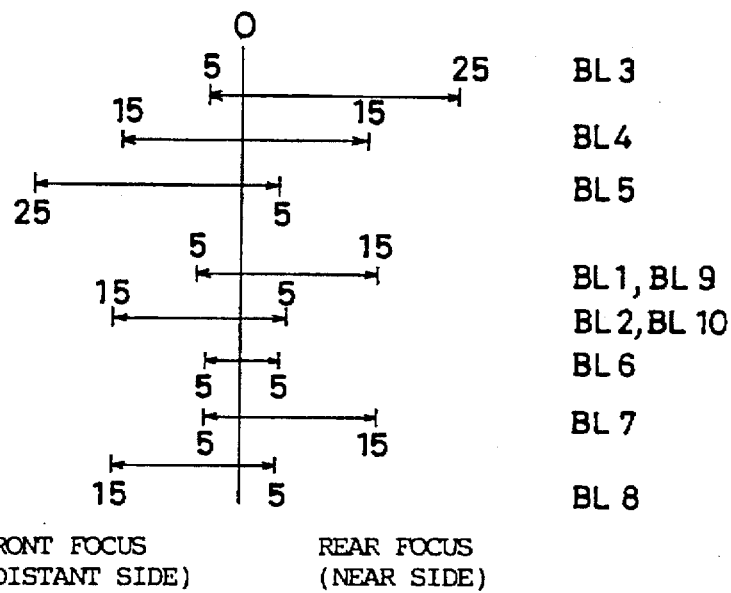
FIG. 5 is an illustration for explanation showing detectable deviation amounts in the divided areas shown in FIG. 4.

The ranges of the division and the detectable defocus range of the divided island will be described with reference to FIGS. 4, 5 and 3B. FIG. 4 shows a focus detection areas of the photographing area shown in FIG. 1. The respective islands IS1, IS2 and IS3 for focus detection correspond to the basic regions shown in FIG. 3A. Referring to FIG. 4, the numerical values shown in each island represent the numbers of differences in obtaining difference data of the respective two pixels distant from each other by three pixels in the CCD shown in FIG. 3A. The difference data may be obtained for the respective two pixels distant from each other by two or one pixel (in such a case, the above mentioned numerical values become different). Accordingly, the numbers of pixels (X, Y) of the basic and reference regions are (30, 40) in the island IS1, (40, 50) in the island IS2, and (30, 40) in the island IS3. As for the division in each island, the island IS1 is divided into two blocks, i.e., the first block BL1 defined by the difference data starting from the upper end difference data (1 to 20) and the second block BL2 defined by the difference data (11 to 30). The second island IS2 is divided into three blocks, i.e., the third block BL3 defined by the difference data starting from the left end (1 to 20), the fourth block BL4 defined by the difference data (11 to 30), and the fifth block BL5 defined by the difference data (21 to 40). The island IS3 is divided into two blocks, i.e., the ninth block BL9 defined by the difference data starting from the upper end (1 to 20) and the tenth block BL10 defined by the difference data (11 to 30). According to this embodiment, data of the sampling frequency changed for an object the spatial frequency of which is low, more specifically, difference data of the respective two pixels distant from each other by seven pixels are obtained and calculation of focus detection is performed by using sum data of the respective adjacent difference data in the above described second island. The numbers of the sum data are 35 for the basic region and 45 for the reference region. This block is defined as the sixth block BL6. In order to effect focus detection for a wider range by using the same data as that of the sixth block, the sixth block is divided into two blocks, i.e., the seventh block BL7 and the eighth block BL8.

In the focus detection of this phase difference detection system, a rear focus condition occurs if the spacing of the images which are coincident with each other in the basic and reference regions is larger than the prescribed spacing; a front focus condition occurs if the spacing is smaller than the prescribed spacing; and an in-focus condition occurs if the spacing is equal to the prescribed spacing. This will be described in more detail with reference to FIG. 3B in which the difference data have been obtained. FIG. 3B shows the basic and reference regions of the island IS2. Let us assume a defocus range of the fourth block BL4 defined by the division. In this case, the in-focus condition is set when an image in the portion BL4' from the 16th to the 35th pixels counted from the left end in the reference region coincides with an image in the fourth block BL4. If coincidence of the images occurs on the left side of the reference region from that position, a front focus condition is brought about and the number of the data corresponding to the largest deviation of the front focus (referred to hereinafter as the deviation pitch) is 15. If coincidence of the images occurs on the right side of the reference region from the position shown in the figure, a rear focus condition is brought about. The deviation pitch corresponding to the larger deviation of the rear focus is 15. The same applies to the defocus ranges of the blocks divided in each of the other islands, as shown in FIG. 5. Referring to FIG. 5, the deviation pitch of the front focus is 5 and that of the rear focus is 25 in the third block BL3; and the deviation pitch of the front focus is 25 and that of the rear focus is 5 in the fifth block BL5. As for the first and third islands IS1 and IS3, the deviation pitches of the front focus and that of the rear focus are 5 and 15, respectively, in each of the first and ninth blocks BL1 and BL9; and the deviation pitches of the front focus and that of the rear focus are 15 and 5, respectively, in each of the second and tenth blocks BL2 and BL10. The deviation pitches of the rear and front focuses are both 5 in the sixth block BL6. In the seventh block BL7, the deviation pitch of the front focus is 5 and that of the rear focus is 15. In the eighth block BL8, the deviation pitch of the front focus is 15 and that of the rear focus is 5.

Figure 6:
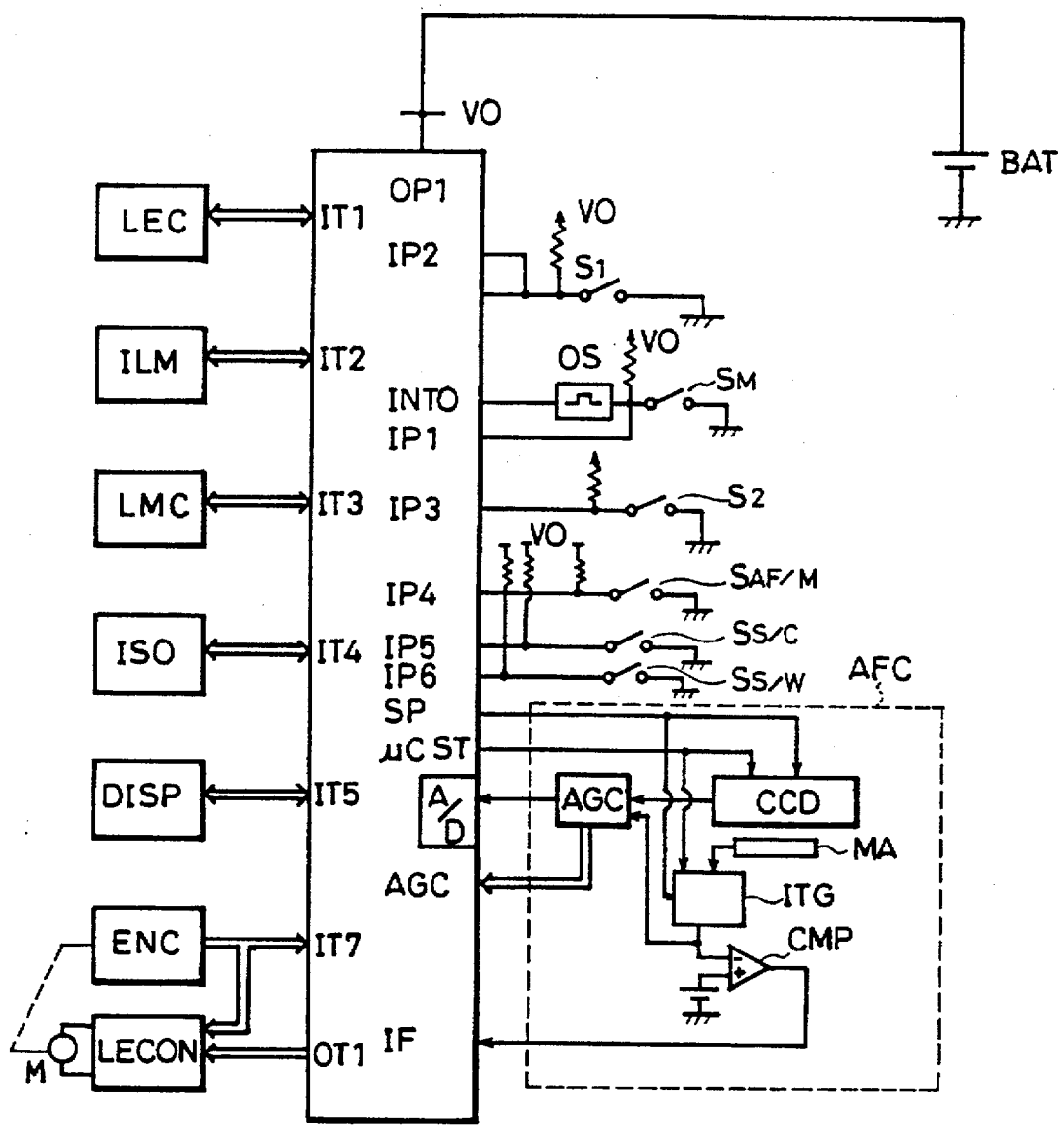
FIG. 6 is a block circuit diagram of the entire construction of a camera according to the embodiment of the invention.

FIG. 6 is a circuit block diagram of the entire construction of the camera. A microcomputer μC performs calculations for sequential operation of the camera, exposure and focus detection. A lens circuit LEC of an exchangeable lens mounted on the camera body (not shown) as the photographic lens 11 shown in FIG. 2 transmits lens information peculiar to the exchangeable lens to the camera body. A focus detection data output circuit AFC including CCD (referred to hereinafter as the AF sensor) receives light transmitted through the exchangeable lens and converts it to an analog electric signal. The AF sensor comprises: a CCD circuit including a light receiving element array; a monitoring light receiving element MA used for control of an integration period; an integration circuit ITG for integrating current from the monitoring light receiving element MA and outputting the result of the integration; a comparator CMP for comparing the output of the integration circuit ITG with a prescribed value; and a circuit AGC for amplifying the analog image signal from the CCD circuit according to the output of the integration circuit ITG.

The operation will be briefly described in the following.

When an integration start signal ST is outputted from the microcomputer μC, the CCD circuit and the integration circuit ITG are reset so as to start integration. When the output of integration of the integration circuit ITG attains a prescribed value to cause inversion in the comparator CMP or an integration timer in the microcomputer μC counts a prescribed value, an accumulation stop signal SP directing termination of charge accumulation in the CCD is outputted. In consequence, the analog image signal representing charge accumulated in the CCD circuit is transmitted to a transfer register (not shown) and it is successively sent to the circuit AGC. In the meantime, the integration circuit ITG responsive to the accumulation stop signal SP holds the output of the integration. The AGC circuit amplifies the analog signal from the CCD circuit according to this output to a value eight times as much at the maximum and outputs the amplified signal to the microcomputer μC. The microcomputer μC contains an A/D converter which converts the analog data to digital data. The amplification data of the AGC circuit is also outputted to the microcomputer μC.

A light measuring circuit LMC measures the light transmitted through the lens and detects brightness of the object. The circuit LMC outputs a digital signal $B_{VO}$ represented by an APEX unit corresponding to the brightness of the object to the microcomputer μC. A film sensitivity reading circuit ISO outputs a digital signal Sv represented by the APEX unit according to the film sensitivity to the microcomputer μC. A display circuit DISP displays exposure information and a focus condition of the lens. An encoder ENC detects a rotation of a motor M for lens drive and outputs pulse to a lens control circuit LECON each time the motor M rotates a predetermined amount. The lens control circuit LECON receives from the microcomputer μC the signal of the rotation quantity (i.e., the number of revolutions) of the motor to be moved and the motor control signal (for the speed and the rotating direction) and drives the motor M based on those signals. The circuit LECON further receives the signal from the encoder ENC to detect actual rotation of the motor M and controls stop of the motor M. The microcomputer μC contains a counter for detecting a position of the photographic lens and controls upward or downward counting with respect to the pulses from the encoder ENC according to an internal instruction. An auxiliary light circuit ILM emits auxiliary light for focus detection toward the object when focus detection cannot be effected and the brightness of the object is low.

A battery BAT supplies electric power to all the circuits. A main switch $S_M$ is turned on by manual operation to a main switch member (not shown). A one-shot circuit OS generates pulse in response to the turn-on of the switch $S_M$. The microcomputer μC receives the pulse and executes an interruption routine of INT0 described afterwards. A switch $S_{AF/M}$ is used for changing-over between an auto focus mode and a manual focus mode. In the auto focus mode, lens drive is automatically carried out based on the results of focus detection and in the manual focus mode, only focus detection operation is effected. A photographing preparation switch S1 is turned on by depression of a first stroke of a shutter release button (not shown) to start light measuring and focus detecting operation. A release switch S2 is turned on by depression of a second stroke longer than the first stroke of the shutter release button to start photographing operation. A switch $S_{S/C}$ is used for changing-over between a single photographing mode and a continuous photographing mode. A switch $S_{S/W}$ is used for changing-over between a spot AF mode and a wide AF mode, Now, operation of the camera will be described with reference to the flow charts of the microcomputer μC.

Figure 9:
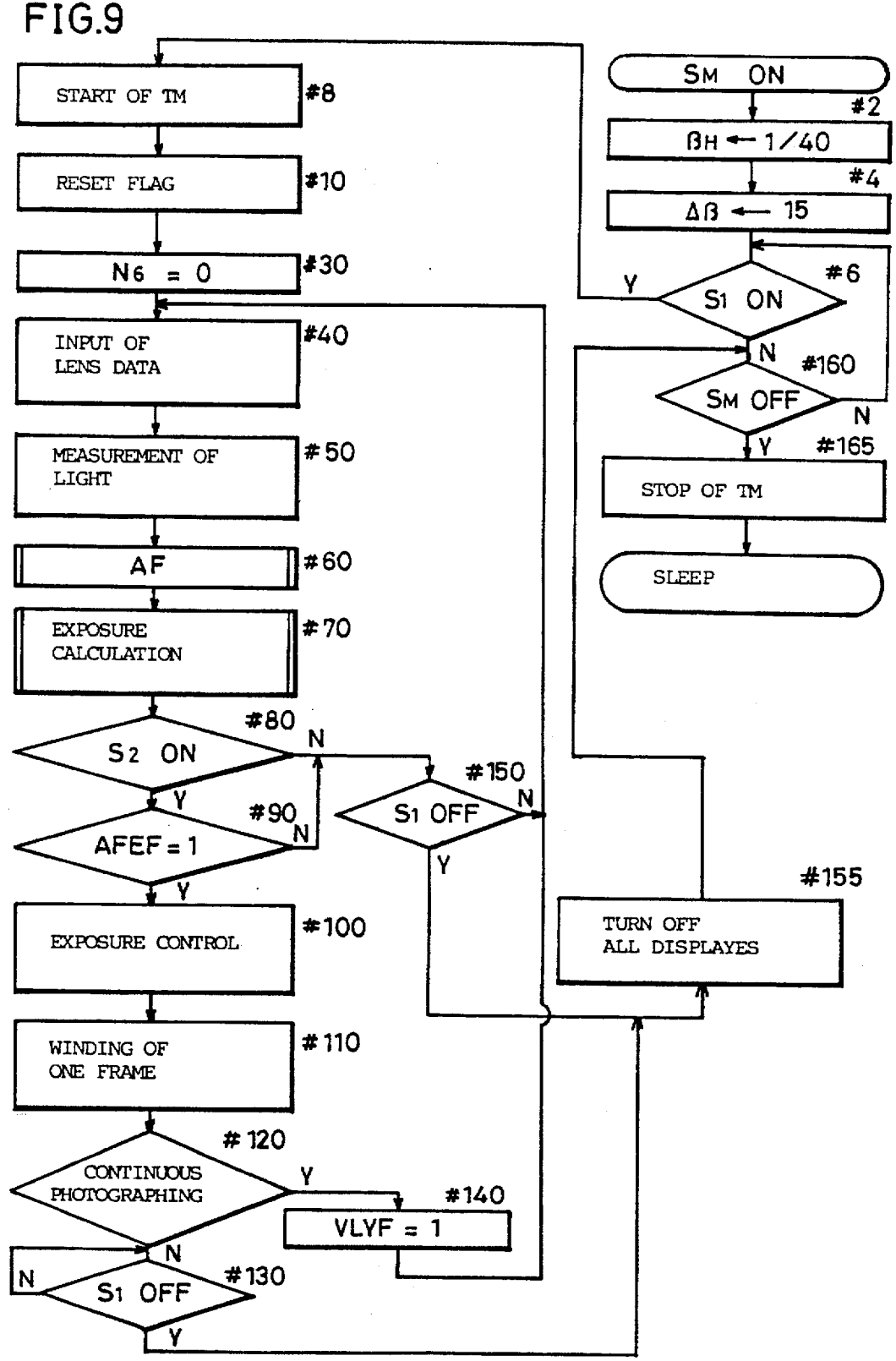
FIG. 9 is a flowchart showing a main camera routine of a microcomputer according to the embodiment of the invention.

When the main switch $S_M$ is turned on, interruption processing of $S_M$ON shown in FIG. 9 is executed. In step 2, a determination reference value $\beta_H$ for the larger magnification is set to 1/40. In step 4, an increase amount $\Delta\beta$ of a determination reference value for the smaller magnification is set to 15. In step 6, it is determined whether the photographing preparation switch S1 is on or not. If the photographing preparation switch S1 is not on in step 6, the processing flow proceeds to step 160. If the switch S1 is on, the processing flow proceeds to step 8. In step 8, a free timer TM is reset so that it starts counting. This timer TM is used for determination of a moving object at the time of focus detection. In step 10, respective flags are reset. In step 30, a variable N6 is reset to 0. This variable N6 indicates the number of drives of the lens during prediction determination in a defocus condition. In step 40, lens data peculiar to the lens is inputted from the lens circuit LEC. The lens data includes focal length data f, a conversion coefficient $K_{LR}$ for converting a defocus amount DF to a lens drive amount $\Delta n$, a constant $D_{V\infty}$ to be described afterwards, a fully open aperture value $A_{VO}$, etc. In step 50, a light measuring circuit LMC is operated so that light measurement data $B_{VO}$ is inputted from the light measuring circuit LMC. In step 60, automatic focusing (AF) is controlled. Detailed procedures of the subroutine of step 60 will be described afterwards. In step 70, calculation of exposure is performed. This calculation of exposure is carried out to obtain an exposure value $E_V=B_{VO}+S_V+A_{VO}$ based on a light measurement value $B_{VO}$ from the light measuring circuit LMC, film sensitivity $S_V$ from the film sensitivity reading circuit ISO and a fully open aperture value $A_{VO}$ from the lens. Based on the obtained exposure value $E_V$ and a predetermined program line, a shutter speed $T_V$ and an aperture value $A_V$ are obtained. In step 80, it is determined whether the release switch S2 is on or not, i.e., whether the shutter button is depressed at the second stroke subsequent to the depression at the first stroke. If the release switch S2 is on in step 80, it is determined in step 90 whether a flag AFEF indicating an in-focus condition is set or not. If the flag AFEF is set in step 90, exposure control is effected in step 100. In step 110, one frame of the film is wound-up after the end of the exposure control. In step 120, it is determined by using the switch $S_{S/C}$ whether the continuous photographing mode is selected or not. If the continuous photographing mode is not selected in step 120, there is a wait for turn-off of the photographing preparation switch S1 in step 130. When the photographing preparation switch S1 is turned off, the processing flow proceeds to step 155. If the continuous photographing mode is selected in step 120, a continuous photographing flag VLYF is set in step 140 and the processing flow returns to step 40.

If the release switch S2 is not on in step 80, it is determined in step 150 whether the photographing preparation switch S1 is turned off or not. If the photographing preparation S1 is off in step 150, the processing flow proceeds to step 155. if the photographing switch S1 is not off in step 150, the processing flow returns to step 40. In step 155, all the displays are turned off. In step 160, it is determined whether the main switch $S_M$ is off or not. If the main switch $S_M$ is off in step 160, the processing flow proceeds to step 165, in which the counting operation of the free timer TM is stopped and the microcomputer μC stops generation of clock pulses and is in a sleep state. If the main switch $S_M$ is not off in step 160, the processing flow returns to step 6, so that the determination as to the on or off state of the photographing preparation switch S1 is repeated.

Figure 10:
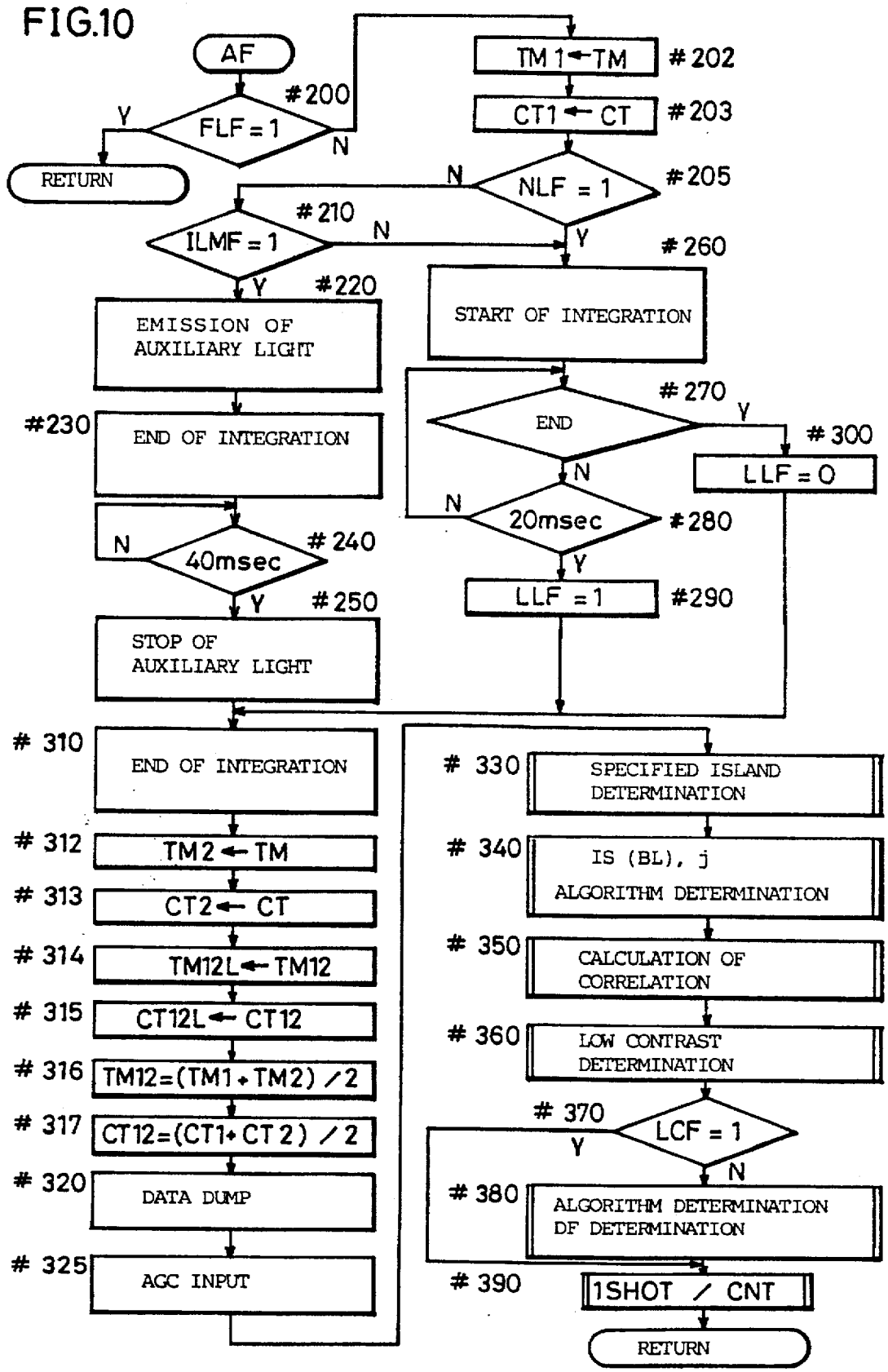
FIG. 10 is a flowchart showing detailed procedures of the AF subroutine in FIG. 9.

The AF subroutine in step 60 is shown in FIG. 10 and the subsequent figures. In step 200, it is determined whether a flag FLF indicating a focus lock is set or not. If the flag FLF is set in step 200, AF is not required and the processing flow returns. If the flag FLF is not set in step 200, the present time is read as TM1 in step 202 from the free timer TM which always operates. In step 203, a moving amount of the lens is read as CT1 from the lens position counter CT. In step 205, it is determined whether an auxiliary light forbidding flag NLF is set or not. If the flag NLF is not set in step 205, it is determined in step 210 whether an auxiliary light flag ILNF indicating the auxiliary light AF mode is set or not. This flag ILNF is set when the brightness of the object is low and focus detection is unavailable. If the auxiliary light flag INLF is set in step 210, a signal directing turn-on of the auxiliary light is outputted in step 220. At the same time, measuring of time is started. In step 230, a signal ST for starting accumulation is outputted to the AF sensor. In step 240, there is a wait for 40 msec. After the elapse of 40 msec, a signal for directing turn-off of the auxiliary light is outputted in step 250. In step 310, a signal SP directing termination of accumulation is outputted to the AF sensor.

If the auxiliary light flag ILNF is not set in step 210, the processing flow proceeds to step 260. If the auxiliary light forbidding flag NLF is set in step 205, the processing flow also proceeds to step 260. In step 260, the signal ST for starting accumulation is outputted to the AF sensor. At the same time, measurement of time is started. In step 270, it is determined whether or not a signal for terminating accumulation is inputted from the comparator CMP of the AF sensor. If the signal from the AF sensor for terminating accumulation is not inputted in step 270, it is determined in step 280 whether or not 20 msec have passed from the start of accumulation. If 20 msec does not pass in step 280, the processing flow returns to step 270. If 20 msec have passed in step 280, a low luminance is determined in step 290 and a low luminance flag LLF is set, whereby the processing flow proceeds to step 310. When the signal from the AF sensor for terminating accumulation is inputted from the AF sensor in step 270, the flag LLF indicating low luminance is reset and the processing flow proceeds to step 310. In step 310, a signal directing termination of accumulation is outputted to the AF sensor.

In step 312, the time is read as TM2 from the free timer TM. In step 313, the moving amount of the lens is read as CT2 from the lens position counter CT. In step 314, the time TM12 at the center of the previous accumulation is substituted for TM12L. In step 315, the lens position CT12 at the center of the previous accumulation is substituted for CT12L. In step 316, an average value of the times TM1 and TM2 read at the start and at the end of the accumulation, namely, the time at the center of the present accumulation, (TM1+TM2)/2 is obtained as TM12. In step 317, an average value of the lens moving amounts CT1 and CT2 read at the start and at the end of the accumulation, namely, a lens position at the center of the accumulation, (CT1+CT2)/2 is obtained as CT12.

Figure 11:
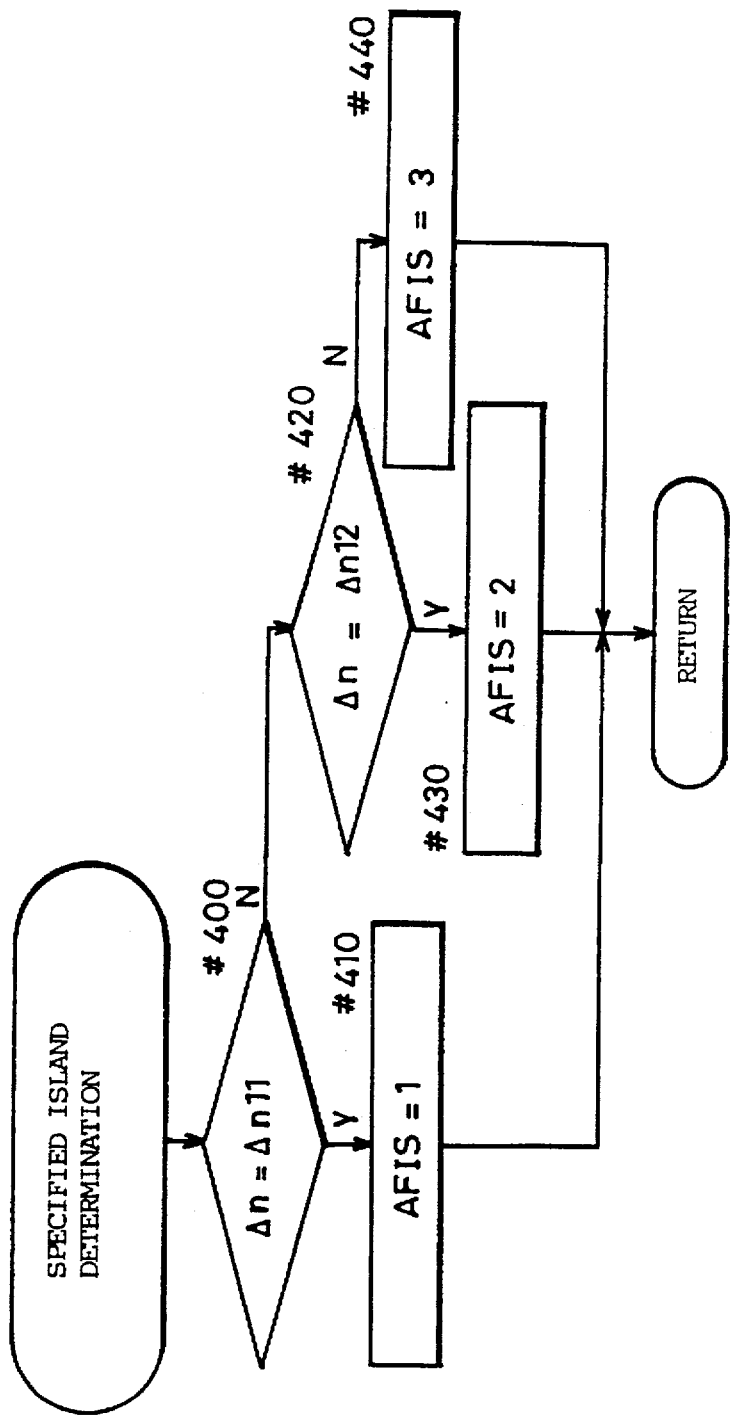
FIG. 11 is a flowchart showing detailed procedures of the specified island determining subroutine in FIG. 10.

In step 320, the analog image signal representing accumulated charge is inputted from the AF sensor. In step 325, AGC data is inputted from the AF sensor. In step 330, a specified island used for the previous drive of the lens is determined. This subroutine will be described with reference to FIG. 11. In step 400, a shift number n indicating the maximum correlation used for the previous drive of the lens is compared with a shift number n11 indicating the maximum correlation in the first island. If Δn≠Δn11 in step 400, the processing flow proceeds to step 410, in which the first island is determined to have been selected for the previous drive and a variable AFIS indicating a specified island is set to 1. Then, the processing flow returns. If Δn≠Δn11 in step 400, the processing flow proceeds to step 420, in which the shift number Δn is compared with a shift number Δn12 indicating the maximum correlation in the second island. If the Δn=Δn12 in step 420, the processing flow proceeds to step 430, in which the variable AFIS indicating the specified island is set to 2 because the second island is determined to have been selected for the previous drive. Then, the processing flow returns. If Δn≠Δn12 in step 420, the processing flow proceeds to step 440, in which the third island is determined to have been selected for the previous drive and the variable AFIS indicating the specified island is set to 3. Then, the flow returns.

After the determination of the specified island, the microcomputer μC returns to the flow of FIG. 10 to execute the subroutine of step 340, in which an island IS (or a block BL) for focus detection and a range of correlation calculation (a range of a shift number j) are determined according to the sequence or the AF condition and the like, and an algorithm for focus detection according to the above mentioned conditions is determined.

(A) Types of focus detection algorithms

Before a detailed explanation of the subroutine of step 340, types and contents of focus detection algorithms will be briefly described.

(i) Pattern recognition algorithm

According to this algorithm, a pattern of a distance distribution of an object is recognized based on the results of focus detections in the three islands and a defocus amount for lens drive is calculated based on the results of focus detections in the three islands by taking account of the recognized pattern and other conditions such as the magnification and the focal length of the exchangeable lens. This algorithm is represented as AR=1 in the below described processing.

(ii) Minimum defocus algorithm

According to this algorithm, focus is adjusted to an object nearest the present focus position of the lens. This algorithm is represented as AR=2 to 4 in the below described processing. AR=4 is the minimum defocus algorithm in the prediction mode. AR=3 indicates the minimum defocus algorithm in the case in which continuous photographing operation is not carried out after the in-focus condition is set. AR=3 is different from AR=4 in that an offset amount $\Delta DF_R$ is provided.

The offset amount $\Delta DF_R$ will be described. According to the present invention, a moving object is determined based on the results of a plurality of focus detections in a state in which the lens is stopped after the in-focus condition is set. Since the moving object moves to some extent until the result of a focus detection is obtained, an offset amount $DF_R$ taking account of such movement is given in a direction approaching the camera. In this embodiment, an object moving away from the camera is not taken into account. However, if the moving direction or the moving speed of the moving object is detected, the value and the direction of the offset amount $DF_R$ may be defined according to the moving direction or speed in such a case. Assuming that a position taking account of the offset amount $DF_R$ is a present focus position of the lens, a defocus amount in the island in which an object nearest to this position exists is used. In this embodiment, the offset amount $DF_R$ is 50 μm.

AR=2 indicates the minimum defocus algorithm in the continuous photographing mode after setting of an in-focus condition. In the continuous photographing mode, release operation is added and accordingly, the time in which focus detection is not effected is increased. Consequently, the offset amount $DF_R$ in the continuous photographing mode is 100 μm.

(iii) Specified island algorithm

According to this algorithm, the island selected previously is also used this time and the lens is driven based on the defocus amount obtained by the focus detection in this island. This algorithm is represented as AR=5 in the below described processing.

(iv) Predetermined island (or block) algorithm

Focus detection is always carried out only in a predetermined block, e.g., the fourth block (or a predetermined island, e.g., the second island). This algorithm is represented as AR=6 in the below described processing.

(B) Determination of an island (block) and a shift range

Determinations of an island (or a block) where focus detection is to be effected and a range of correlation calculation (a shift range.) will be described. In the below described processing, the island and the range are determined by using a variable B.

B=1 indicates that there are no limitations on the shift range and the islands (or the blocks).

B=2 indicates that the blocks BL1, BL2 and BL4 are not used and no limitation is imposed on the other conditions.

B=3 indicates that correlation calculation is performed only in the range of ±4 pitches from the present focus position.

B=4 indicates that correlation calculation is performed only in the range of ±2 pitches from the present focus position.

B=5 indicates that correlation calculation is performed only in the range from −2 pitches from the present focus position to +2 pitches from a predicted in-focus position or in the range of +2 pitches from the present focus position to −2 pitches from the predicted in-focus position. The selection of the former range or the latter range depends on the direction of drive of the lens, namely, the direction of the predicted in-focus position.

B=6 indicates that correlation calculation is performed only in the range of ±4 pitches from an in-focus position.

B=7 indicates that correlation calculation is performed only in the range of ±4 pitches from the present focus position as for the island used for the previous lens drive and no limitation is imposed for the other islands.

B=8 indicates that focus detection is performed only for the second island and that no limitation is imposed on the shift range.

B=9 indicates that focus detection is performed only for the fourth block BL4 and that no limitation is imposed on the shift range.

Procedures for using the variable B for each of the above described cases will be described afterwards.

Figure 12A:
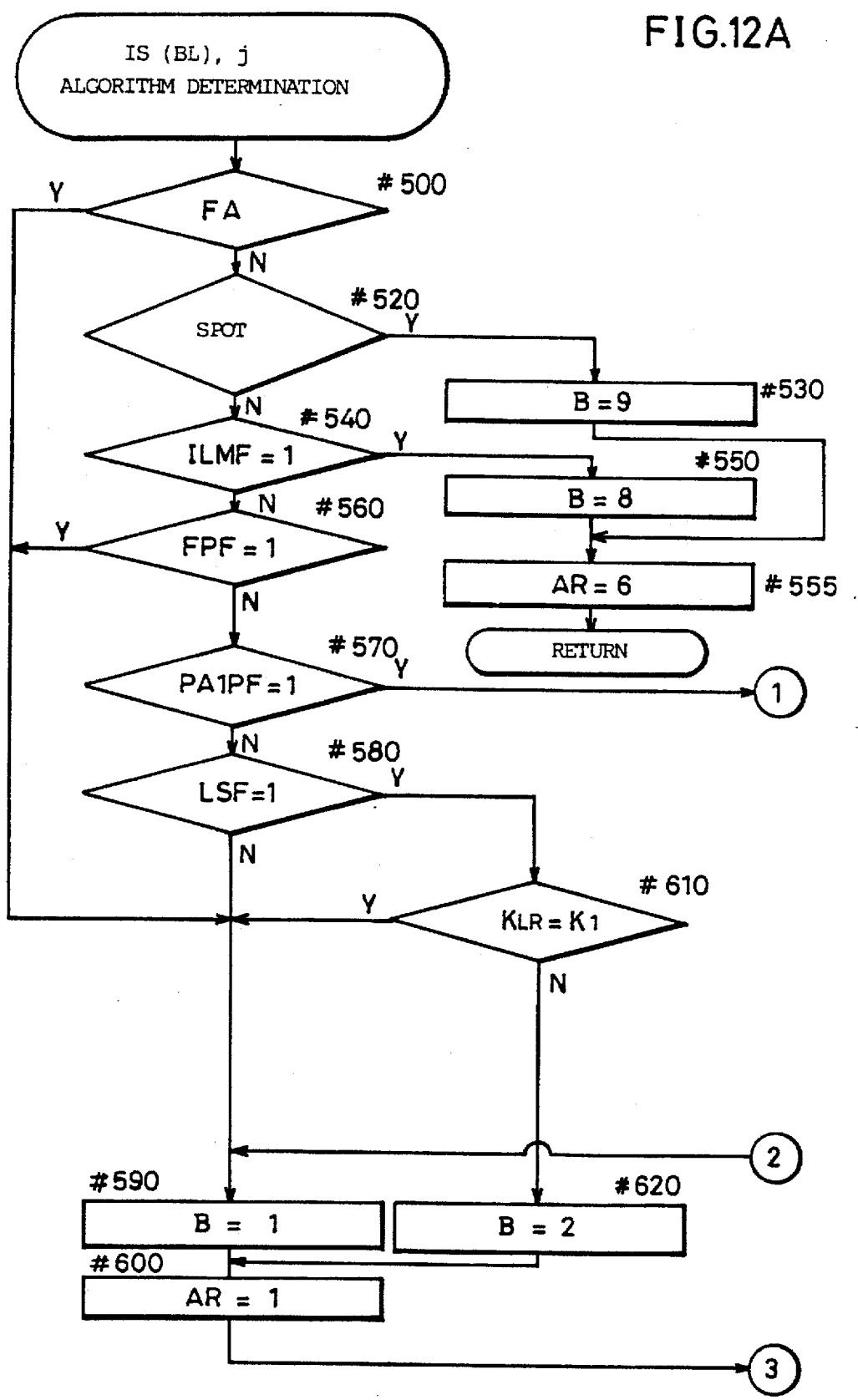
FIGS. 12A, 12B and 13 are flowcharts showing detailed procedures of the IS(BL), j algorithm determining subroutine in FIG. 10.
Figure 12B:
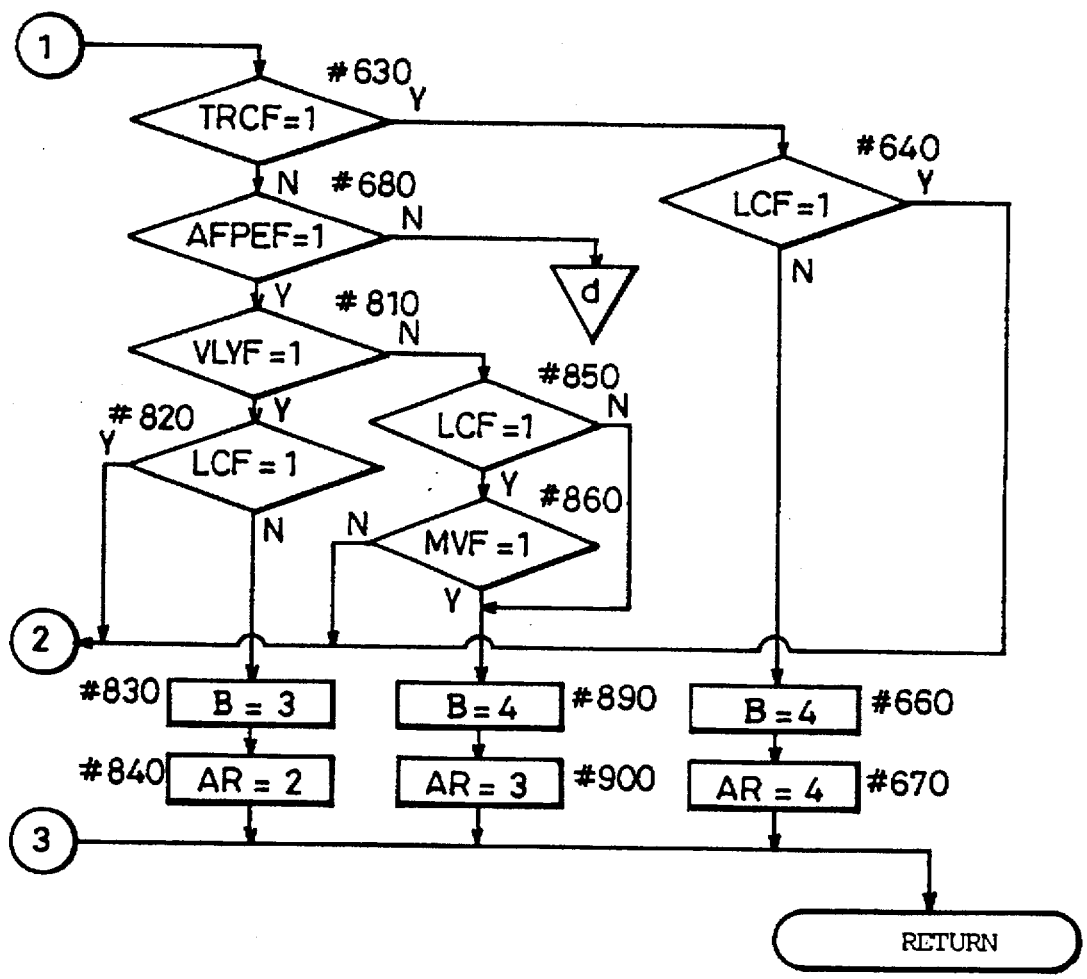
Figure 13:
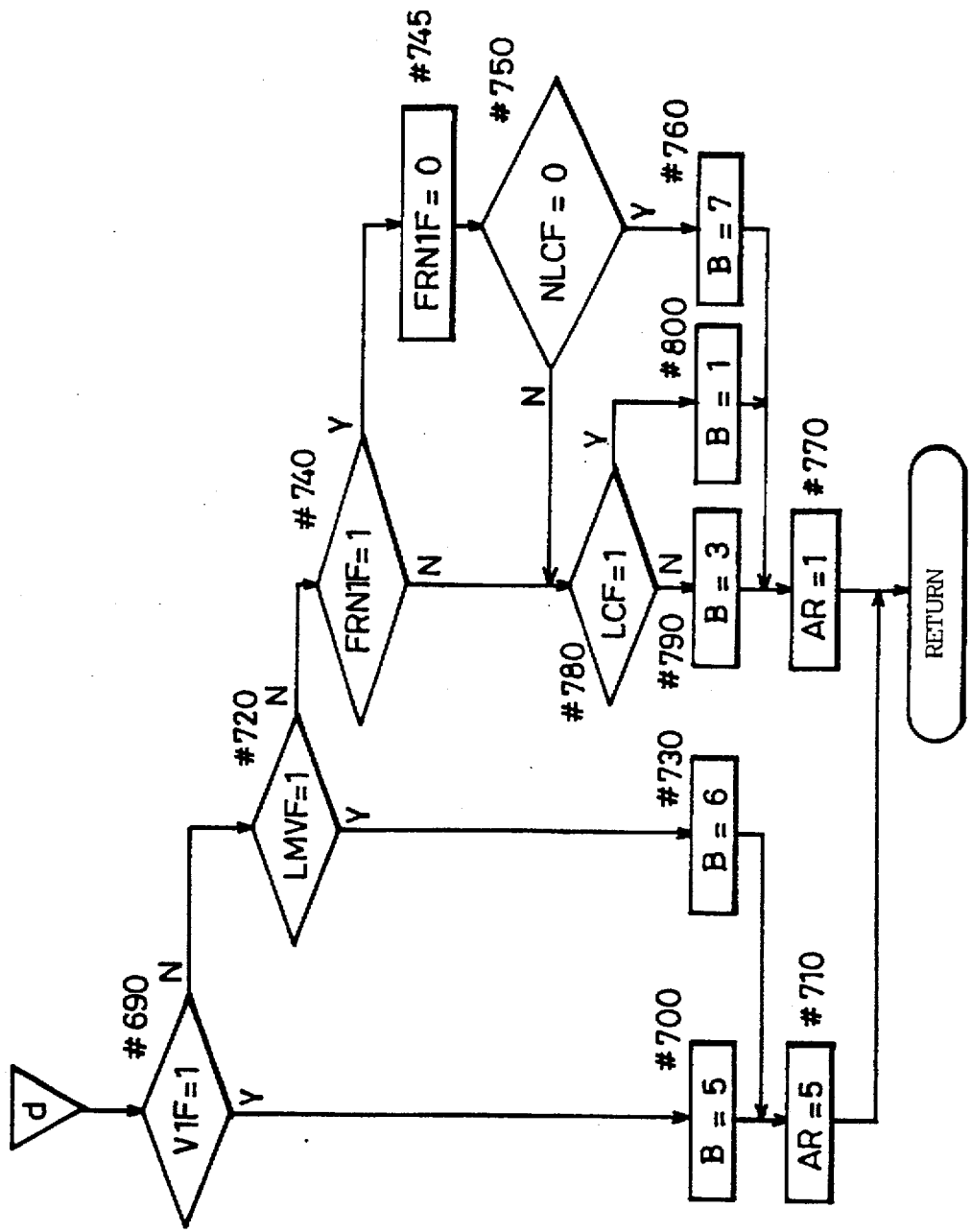
Figure 14A:
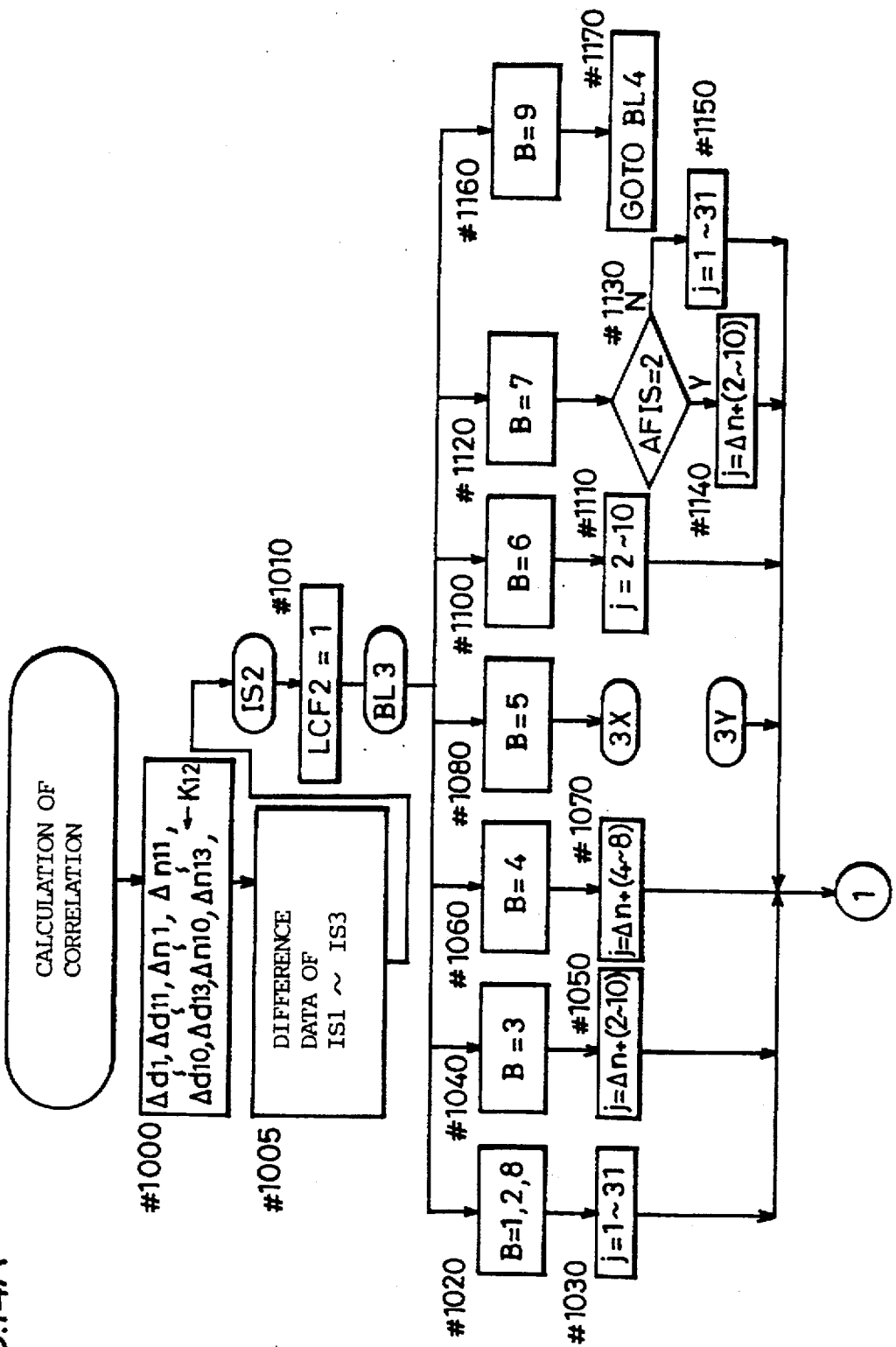

Referring now to FIGS. 12A, 12B and 13, the subroutine of step 340 will be described. In step 500, it is determined by the position of the switch $S_{AF/M}$ whether the manual focus mode (FA: Focus Aid) without lens drive is selected or not. If the switch $S_{AF/M}$ is at the manual focus mode position, B=1 (no limitation) is set in step 590 and AR=1 (pattern recognition algorithm) is set in step 600, whereby the processing flow returns. Then, in steps 4610 to 4660 of the pattern recognition algorithm to be described afterwards, the second island is preferentially selected. More specifically, since the photographer usually sets a main object at a central portion of the image area (i.e., the photographing area) in the manual focus mode, the second island is preferentially used. Only in the case in which focus detection is unavailable in the second island, the distances of the objects from the camera in the first and third islands are compared each other and the defocus amount in the island in which the object nearer to the camera exists is used. As for the shift range of correlation calculation, no limitation is imposed since the lens drive is not executed and the defocus amount cannot be predicted.

If the switch $S_{AF/M}$ is at the auto focus mode position in step 500, it is determined dependent on the switch $S_{S/W}$ whether spot AF is selected or not in step 520. If spot AF is selected in step 520, B=9 (spot AF) and AR=6 (indicating the predetermined block algorithm) are set in steps 530 and 555, respectively, and the processing flow returns. Thus, only the fourth block BL4 as an area of the spot AF is selected. Since AF is effected only in this block in the spot AF, a period of focus detection is short and it is not necessary to limit the shift range particularly.

If the spot AF is not selected in step 520, it is determined in step 540 whether the auxiliary light mode is selected or not based on the determination as to whether the auxiliary light flag ILNF is set or not. If the auxiliary light flag ILNF is set in step 540, B=8 (only the second island) and AR=6 (indicating the predetermined island algorithm) are set in steps 550 and 555, respectively, and the processing flow returns. More specifically, in the auxiliary light mode, only the second island is used. This is because the range of emission of the auxiliary light covers at least the second island at the center of the image area out of the three islands and sometimes does not include the first or third island when a standard lens (having the focal length of 35 mm to 105 mm) is mounted in the camera. In consequence, since focus detection is effected only in the second island, the period of focus detection is short and it is not needed to limit the shift range.

If the auxiliary light flag ILNF is not set in step 540, it is determined in step 560 whether the flag FPF is set or not. This flag FPF indicates that the pattern recognition algorithm is to be forcedly executed. If the flag FPF is set in step 560, B=1 is set in step 590 to indicate that no limitation is imposed on the shift range, and AR=1 is set in step 600 to indicate the pattern recognition algorithm.

If the flag FPF is not set in step 560, it is determined in step 570 whether the flag PA1PF is set or not. This flag PA1PF indicates that the pattern recognition algorithm is executed at least once. If focus detection is unavailable in all the areas due to a low contrast at the time of the first focus detection after a start of focus detection, operation for searching for a lens position enabling focus detection (referred to hereinafter as low contrast scanning) is performed while the lens is driven, and the pattern recognition algorithm is selected in the low contrast scanning. As a result, when focus detection is possible, the flag PA1PF is set. If the flag PA1PF is not set in step 570, it is determined in step 580 whether the flag LSF indicating low contrast scanning is set or not. If the flag LSF is not set in step 580, B=1 and AR=1 are set in steps 590 and 600, respectively, and the processing flow returns.

If the flag LSF is set in step 580, it is determined in step 610 whether a conversion coefficient $K_{LR}$ is larger than a prescribed value K1 or not. The conversion coefficient $K_{LR}$ is a coefficient used for obtaining a lens drive amount (an amount of rotation of the AF motor) from a defocus amount. If $K_{LR} \leq K1$ in step 610, the defocus amount for the unit rotation amount of the AF motor becomes large and the time required for focus detection calculation during the lens drive becomes long. Consequently, an excess occurs over the focus detectable range defined by the focus detection optical system, causing regions where focus detection is unavailable.

Figure 7:
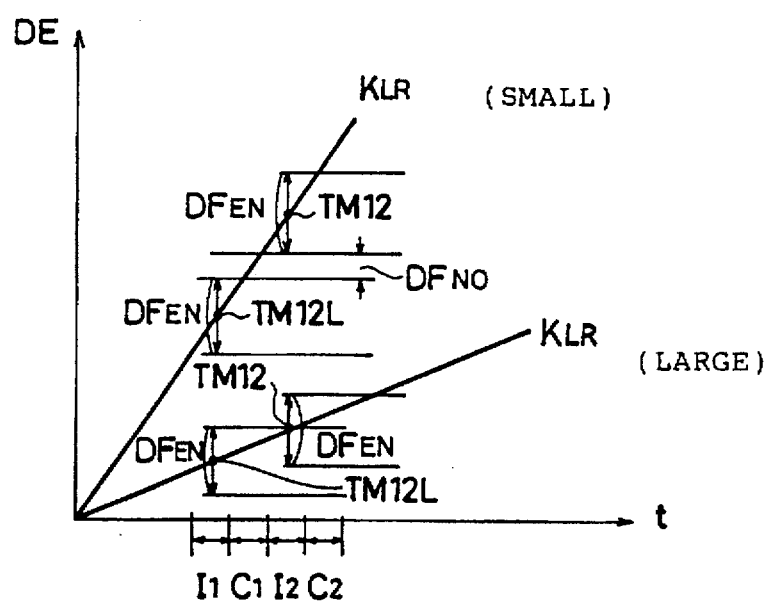
FIGS. 7 and 8 are diagrams for explaining focus detecting operation according to the embodiment of the invention.

This phenomenon will be described with reference to FIG. 7. In FIG. 7, the abscissa represents the time t and the ordinate represents a defocus amount DF. The range $DF_{EN}$ is a focus detectable range defined by the focus detection optical system and the number of data in the basic region. The reference characters $I_1$, $I_2$, etc. represent accumulation periods of the CCD. The reference characters $C_1$, $C_2$ etc. represent calculation periods. Let us consider the focus detectable range $DF_{EN}$ based on the defocus amount at each of the accumulation centers TM12L, TM12, etc. If the conversion coefficient $K_{LR}$ is a large value, the focus detectable range $DF_{EN}$ covers a defocus amount caused by the drive for each of the periods ($I_1+C_1$), ($I_2+C_2$) etc. required for one focus detection and, accordingly, the object can be always caught in sight. However, if the conversion coefficient $K_{LR}$ is a small value, the focus detectable range $DF_{EN}$ does not cover the defocus amount caused by the drive for the period ($I_1+C_1$) and, accordingly, if an object exists in a range $DF_{NO}$ shown in FIG. 7, the object fails to be caught. In order to prevent this, if $K_{LR} \leq K1$ in step 610, B=2 is set in step 620 and focus detection is not effected in the blocks BL1, BL2 and BL4 so that the focus detection time can be reduced to the minimum. In the case of an object shaped like a horizontal line, focus detection is not enabled in the second island but focus detection is enabled in either he first or third island. Accordingly, since focus detection may be effected in either of the islands, focus detection in the first island (the blocks BL1 and BL2) is not effected according to this embodiment. Focus detection in the fourth block is not effected because the fourth block exists between the third and fifth blocks and those two blocks BL3 and BL5 cover the area of the fourth block BL4. Those two blocks are sufficient for searching for an object in the focus detectable range. In consequence, B=2 is set in step 620. If $K_{LR} \geq K1$ in step 610, B=1 and AR=1 are set in steps 590 and 600, respectively, and the processing flow returns.

If the flag PA1PF is set in step 570, which means that the pattern recognition algorithm is executed once, it is determined in step 630 whether a prediction flag TRCF indicating the prediction mode is set or not. If the prediction flag TRCF is set in step 630, it is determined in step 640 whether the flag LCF is set or not. This flag LCF is a low contrast flag indicating that focus detection was unavailable in all the islands at the previous cycle. If the flag LCF is set in step 640, B=1 and AR=1 are set in steps 590 and 600, respectively, so that focus detection is newly performed from the beginning, and the flow returns.

If the flag LCF is not set in step 640, it is determined that the object is continuously caught, and B=4 is set in step 660 so that correlation calculation may be performed only in the shift range of ±2 pitches from the previous in-focus position. With regard to the focus detection algorithm, AR=4 is set in step 670 to select an algorithm for selecting an object nearest to the previous in-focus position, and then the processing flow returns. Thus, since the prediction mode is set in this mode, the object is already caught and it is assumed that the object hardly deviates during one focus detection with regard to the defocus amount from the in-focus position. All the islands are used in this mode because the object is a moving object which often moves rightward and leftward.

If the prediction flag TRCF indicating the prediction mode is not set in step 630, it is determined in step 680 whether the flag AFPEF is set or not. This flag AFPEF indicates that an in-focus condition was set previously.

If the flag AFPEF is not set in step 680, it is determined in step 690 in FIG. 13 whether the flag V1F is set or not. This flag V1F indicates focus detection during lens drive at the maximum speed (hereinafter referred to as the free run). If the flag V1F is set in step 690, focus detection in the free run is determined. B=5 is set in step 700 so that correlation calculation is performed in the range of −2 (or +2) pitches from the previous in-focus position to +2 (or −2) pitches from a predicted in-focus position. Thus, the calculation time can be reduced. The reasons that a margin of two pitches is given in a direction opposite to the defocus direction from the previous in-focus position are as follows. If a lens having a large conversion coefficient $K_{LR}$ is mounted in the camera body, the lens moves for only a small defocus amount even if the rotation amount of the AF motor in the camera needs a large value and consequently a defocus amount might be generated erroneously in the direction opposite to the present direction (namely, the direction in which the margin of two pitches is given) due to noise or unsteady hold of the camera. A similar phenomenon also occurs in the case in which the object moves to a larger extent than the defocus amount due to the lens drive in the direction in which the above mentioned margin of two pitches is given. Thus, another margin of two pitches is given in the direction opposite to that of the previously obtained defocus amount, taking account of such deviation. As for the focus detection algorithm, AR=5 is set in step 710, so that the specified island algorithm using the previously selected island is selected, and the flow returns. Thus, the time until an in-focus condition is attained can be reduced by using the previously selected algorithm and the lens can be driven stably. If an algorithm such as the pattern recognition algorithm which selects an object from the three islands is used in this case, the lens will be driven in the direction opposite to the present driving direction when another object in a different defocus direction is erroneously selected during the lens drive, and thus, the lens drive will be unstable. The same applies to the case of focus detection during low-speed drive to be described afterwards. In the latter case, when an object having a large defocus amount, though in the same defocusing direction, is selected, the low-speed drive will change abruptly to a high-speed drive and if an object having a small defocus amount is selected during the high-speed drive, it will change again to a low-speed drive and thus unstable drive occurs.

The use of the specified island algorithm makes it possible to reduce the focus detection time and consequently to increase the precision of focus detection because the number of focus detections within a prescribed period is increased. More specifically, if the lens is driven at high speed, a large defocus amount will be caused and the value of the defocus amount will include some errors. If a stop position of the lens is determined according to the defocus amount, a small deviation might occur from the in-focus position. Consequently, the number of focus detections is increased and small defocus amounts are detected more frequently, whereby the error can be reduced. Thus, the stop position of the lens is determined with little error.

If the flag V1F is not set in step 690, it is determined that focus detection is not in the free run, and, in step 720, it is determined whether the flag LMVF is set or not. The flag LMVF indicates focus detection during low-speed drive. If the flag LMVF is set in step 720, focus detection during low-speed drive is determined. The defocus amount based on the result of focus detection is small compared with that of the focus detection in the free run and it is normally in the range of ±4 pitches assuming that one pitch corresponds to about 1 mm of the defocus amount. Consequently, in order to perform correlation calculation only within the shift range of ±4 pitches from the in-focus position, B=6 and AR=5 are set in steps 730 and 710, respectively, and the processing flow returns.

If the flag LMVF is not set in step 720, it is determined that focus detection is not the focus detection during low-speed drive, and it is determined in step 740 whether the flag FRN1F is set or not. This flag FRN1F indicates the first focus detection after the stop of the lens driven once at the free run (maximum speed). If the flag FRN1F is set in step 740, this flag FRN1F is reset in step 745. Then, in step 750, it is determined whether the flag NLCF is set or not. This flag NLCF indicates that there is an island where focus detection was unavailable according to the previously applied pattern recognition algorithm. If the flag NLCF is set in step 750, correlation calculation is performed only in the shift range of ±4 pitches for the previously selected island. In order to perform correlation calculation without limitations for the other islands, B=7 and AR=1 are set in steps 760 and 770, respectively, and the processing flow returns. Thus, in order to confirm whether focus detection was unavailable for an object to be recognized with respect to the. lens position at that time according to the previously applied pattern recognition algorithm, the pattern recognition algorithm is executed again. As for the previously selected island, namely, the island where focus detection was available, calculation of focus detection is performed only in the shift range of ±4 pitches, so that the time can be reduced.

If the flag FRN1F is not set in step 740, this means that focus detection is not the first focus detection after the stop of the lens driven at the free run. If the flag NLCF is not set in step 750, this means that there is no island where focus detection is unavailable according to the previously applied pattern recognition algorithm. In those cases, it is determined in step 780 whether the flag LCF is set or not. This flag LCF indicates that focus detection is unavailable for all the islands according to the result of focus detection obtained this time, as described previously. If focus detection is enabled in any one of the islands, that is, if the flag LCF is not set, B=3 and AR=1 are set in steps 790 and 770, respectively, so that calculation of correlation can be performed only in the shift range of ±4 pitches from the present focus position. Then, the flow returns. If focus detection is not enabled (LCF=1) in all of the islands, B=1 and AR=1 are set in steps 800 and 770, so as to impose no limitations in the shift range and the flow returns.

Referring again to FIG. 12B, if the flag AFPEF indicating that an in-focus condition was obtained previously is set in step 680, it is determined in step 810 whether the continuous photographing flag VLYF is set or not. This continuous photographing flag VLYF indicates the continuous photographing mode. If the continuous photographing flag is set in step 810, it is determined in step 820 whether the flag LCF indicating unavailable focus detection in all the islands is set or not. If the flag LCF is set in step 820, B=1 and AR=1 are set in steps 590 and 600, respectively, and the processing flow returns. If the flag LCF is not set in step 820, B=3 is set in step 830. In this case, continuous photographing operation is being carried out and there exists at least one island in which focus detection is available in the previous focus detection and, therefore, correlation calculation is performed only in the shift range of ±4 pitches from the present focus position. The shift range in this case is enlarged because the defocus amount becomes large compared with that of the previous focus detection indicating the result of the in-focus condition, when the object is moving since a time for exposure is required in the continuous photographing operation. Since the camera of this embodiment has a focus preference system in which photographing operation is not enabled without an in-focus condition, at least the previous focus detection has the in-focus result. Consequently, in order to select the minimum defocus algorithm assuming that the object exists nearest to the present focus position, AR=2 is set in step 840 and the flow returns. In this case, since the object may be a moving object, an offset amount $DF_R$ of 100 μm is provided on the side approaching the camera and the position based on the offset amount is set to an in-focus position.

If the continuous photographing flag VLYF is not set in step 810, it is determined in step 850 whether the flag LCF is set or not in order to determine whether focus detection is unavailable in all the islands. If the flag LCF is not set in step 850, this means that at least one island exists in which focus detection is available and the processing flow proceeds to step 890. If the flag LCF is set in step 850, this means that focus detection is unavailable in all the islands and it is determined in step 860 whether the moving object determination flag MVF is set or not. The moving object determination flag MVF is a flag set when moving object determination is being effected. If the moving object determination flag is not set in step 860, it is determined that the moving object determination is not effected and B=1 and AR=1 are set in steps 590 and 600, respectively, and the processing flow returns. If the moving object determination flag MVF is set in step 860, or the flag LCF is not set in step 850, B=4 is set in step 890 so that correlation calculation is performed only in the shift range of ±2 pitches from the present focus position. Further, in order to select the minimum defocus algorithm and to set the offset amount $\Delta DF_R$ to 50 μm, AR=3 is set in step 900 and the processing flow returns. Those steps 890 and 900 are executed when moving object determination is being effected or the continuous AF mode is set. Since the object may move during focus detection in the moving object determination, the offset amount $\Delta DF_R$ is set to 50 μm. Since only the moving object which approaches the camera is determined, the offset amount is +50 μm. The island nearest the offset position is regarded as the position of the object. The same applies to the continuous AF mode. In this case (in which moving object determination is being effected or the continuous AF mode is applied), the object is liable to move in the optical axis direction or in the direction of the plane vertical to the optical axis and even if focus detection is unavailable in all the islands, this state is regarded as a temporary state and correlation calculation in the range of ±2 pitches, the minimum defocus algorithm and the offset amount $\Delta DF_R$=50 μm are selected.

Referring again to FIG. 10, when the subroutine in step 340 is terminated, correlation calculation is performed according to the subroutine of step 350 based on the selections of the range of the shift number j and the island IS (or the blocks BL) determined in the subroutine of step 340. The subroutine of step 350 will be described in the following with reference to FIGS. 14A and 14B through 31.

In step 1000, a prescribed value $K_{12}$ is set as variables $\Delta n1$ to $\Delta n10$, $\Delta n11$ to $\Delta n13$, $\Delta d1$ to $\Delta d10$, and $\Delta d11$ to $\Delta d13$. $\Delta n1$ to $\Delta n10$ are shift numbers indicating maximum correlations in correlation calculation of the respective blocks BL1 to BL10, and $\Delta n11$ to $\Delta n13$ are shift numbers selected for the islands IS1 to IS3. $\Delta d1$ to $\Delta d10$ in the respective blocks are defocus amounts from the in-focus position after interpolation calculation, and $\Delta d11$ to $\Delta d13$ are defocus amounts from the in-focus position after interpolation calculations in the islands IS1 to IS3. The prescribed value $K_{12}$ is a large negative value which is unlikely to be obtained as the result of focus detection and which is an initial value indicating a front focus side (distant from the camera). In step 1005, difference data of the islands IS1 to IS3 are prepared. The difference data in the second island IS2 are $a_i$ (in the basic region) and $a'_i$ (in the reference region); the difference data in the first island IS1 are $b_i$ (in the basic region) and $b'_i$ (in the reference region); and the difference data in the third island IS3 are $c_i$ (in the basic region) and $c'_i$ (in the reference region).

Then, correlation calculation in the second island IS2 is performed. First, in step 1010, the flag LCF2 indicating that focus detection is unavailable in the second island IS2 is set in advance. This flag LCF2 is reset when it is determined afterwards that focus detection is available in the second island IS2. Then, correlation calculation in the third block BL3 of the second island IS2 is performed. If the above mentioned variable B is 1, 2 or 8, the flow proceeds to step 1020; if B=3, the flow proceeds to step 1040; if B=4, the flow proceeds to step 1060; if B=5, the flow proceeds to step 1080; if B=6, the flow proceeds to step 1100; if B=7, the flow proceeds to step 1120; and if B=9, the flow proceeds to step 1160. If the variable B is 1, 2 or 8, no limitation is imposed on the shift number in the third block BL3 and accordingly the range of the shift number j is set to 1 to 31 (in step 1030). If the variable B is 3, the shift range is set to ±4 pitches from the present focus position. Since the shift number at the in-focus position in the third block is j=6 and the present focus position is (6+$\Delta n$), the range of the shift number j is set to $\Delta n$+(2 to 10) by adding ±4 pitches (in step 1050). If the variable B is 4, the shift range is set to ±2 pitches from the present focus position. Similarly, since the shift number at the in-focus position in the third block is j=6 and the present focus position is (6+$\Delta n$), the range of the shift number j is set to n+(4 to 8) by giving ±2 pitches to the present focus position (in step 1070). If the variable B is 5, it is determined in step 1085 whether a rear focus condition exits or not. If the rear focus condition is determined, the shift range is set to a range from a rear focus (+2) deviating by two pitches from the present focus position to a front focus (−2) deviating by two pitches from the in-focus position (j=6) and thus the range of the shift number j is set to 4 to ($\Delta n$+8) (in step 1090). If it is determined that the rear focus condition does not exist, the shift range is set to a range from a front focus (−2) deviating by two pitches from the present focus position ($\Delta n$+6) to a rear focus (+2) deviating by two pitches from the in-focus position (j=6) and thus the range of the shift number j is set to ($\Delta n$+4) to 8 (in step 1095). If the variable B is 6, the shift range is set to ±4 pitches from the in-focus position. Since the shift number at the in-focus position is j=6, ±4 pitches are given thereto and the range of the shift number j is set to 2 to 10 (in step 1110). If the variable B is 7, it is determined in step 1130 whether the variable AFIS is 2 or not in order to determine whether the island previously used is the second island IS2 or not. If it is determined that the variable AFIS is 2 in step 1130, the shift range is set to ±4 pitches from the present focus position (6+$\Delta n$) and ±4 pitches are given to the present focus position (6+$\Delta n$), whereby the range of the shift number j is set to $\Delta n$+(2 to 10) (in step 1140). If it is determined that the variable AFIS is not 2 in step 1130, no limitation is imposed on the shift number and the range of the shift number j is set to 1 to 31 (in step 1150). If the variable B is 9, only the fourth block BL4 is available, and the flow proceeds to a subroutine processing in the fourth block BL4 in step 1170.

If the variable B is any of 1 to 8, the flow proceeds to step 1180 from the corresponding one of the steps 1030, 1050, 1070, 1090, 1095, 1110, 1140 and 1150, so that the low contrast determination level $K_{LC}$ is set to a prescribed value $K_{LC1}$. A reliability determination level $K_{YM/C}$ is set to a prescribed value $K_{YM/C1}$ in step 1190. In step 1195, a start number in the basic region for obtaining correlation is set to k=0. The number i=1 is added to this start number k (in later steps 3010 and 3030) and an actual start number in the basic region is i+k=1. In step 1200, determination of unavailable focus detection and correlation calculation I are performed.

Figure 15:
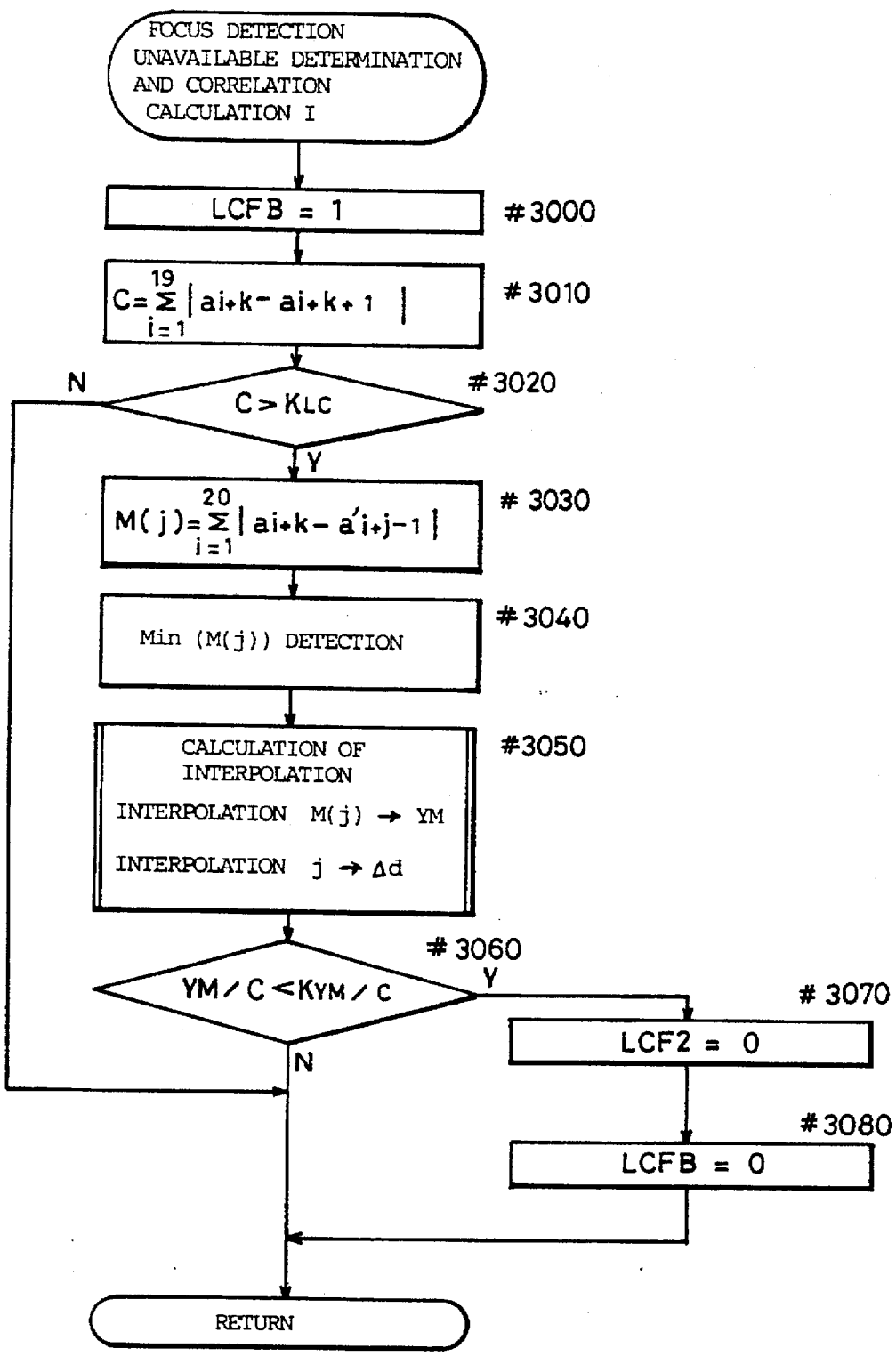
FIG. 15 is a flowchart showing detailed procedures of the subroutine of focus detection unavailable determination and correlation calculation I in FIG. 14B.

The subroutine of step 1200 will be described with reference to FIG. 15. First of all, in step 3000, a flag LCFB is set to indicate that focus detection is unavailable in the block (the third block BL3 in the case of calling from step 1200) in which correlation calculation is currently performed. In step 3010, a contrast value C is obtained according to the below described equation, in the block (the third block) where correlation calculation in the basic region is carried out.

$$C = \sum_{i=1}^{19} |a_{i+k} - a_{i+k+1}|$$

In step 3020, it is determined whether the contrast value C thus obtained is larger than the prescribed value $K_{LC}$ or not. If $C \leq K_{LC}$, the flow returns. In this return, the flag LCFB is kept set. If $C > K_{LC}$, correlation calculation is performed in step 3030 according to the below indicated equation.

$$M(j) = \sum_{i=1}^{20} |a_{i+k} - a'_{i+j-1}|$$

In step 3040, the minimum value MIN(M(j)) of the correlation calculation value M(j) is obtained. This minimum value MIN(M(j)) and the shift number j in that case are obtained roughly by the unit of one pitch and in order to obtain more precise values, calculation of interpolation is carried out in step 3050. The minimum value of the correlation calculation value obtained by the interpolation is represented as YM and the shift amount interpolated is represented as Δd. In step 3060, a value YM/C representing the minimum value YM of the correlation calculation value normalized by the contrast value C is compared with the prescribed value $K_{YM/C}$, so that reliability is determined. If it is determined in step 3060 that YM/C≧$K_{YM/C}$, lack of reliability is determined and the flow returns. In this return, the set state of the flag LCFB is also maintained. If it is determined in step 3060 that YM/C<$K_{YM/C}$, reliability is determined and since focus detection is available, the flag LCF2 indicating unavailable focus detection in the second island IS2 is reset to zero in step 3070 and the flag LCFB indicating unavailable focus detection in the block where correlation calculation is being performed is also reset to zero in step 3080, whereby the processing flow returns.

Referring again to FIG. 14B, it is determined in step 1205 whether the flag LCBF is reset or not in order to determine whether focus detection is available or not in the block where calculation of correlation has been performed. If the flag LCBF is reset in step 1205, a value obtained by subtraction of an in-focus position value 6 from the value j is substituted for the variable Δn3 indicating a deviation shift number in the third block BL3 where correlation calculation has been performed (in step 1207). In order to obtain a defocus amount from the in-focus position, the shift number j=6 at the in-focus position is subtracted from the shift number Δd obtained by the interpolation and the result of the subtraction is used as the shift number Δd3 of the third block BL3 (in step 1209). If the flag LCBF is not reset in step 1205, this means that focus detection is unavailable in the third block BL3 and, accordingly, the processing flow skips steps 1207 and 1209 and proceeds to step 1210.

In step 1210, it is determined whether the variable B is 2 or not. If the variable B is 2 in step 1210, correlation calculation in the fourth block BL4 is not effected and the flow proceeds to step 1220 where correlation calculation in the fifth block BL5 is effected. If the variable B is not 2 in step 1210, the flow proceeds to step 1230 to perform correlation calculation in the fourth block BL4.

Figure 16A:
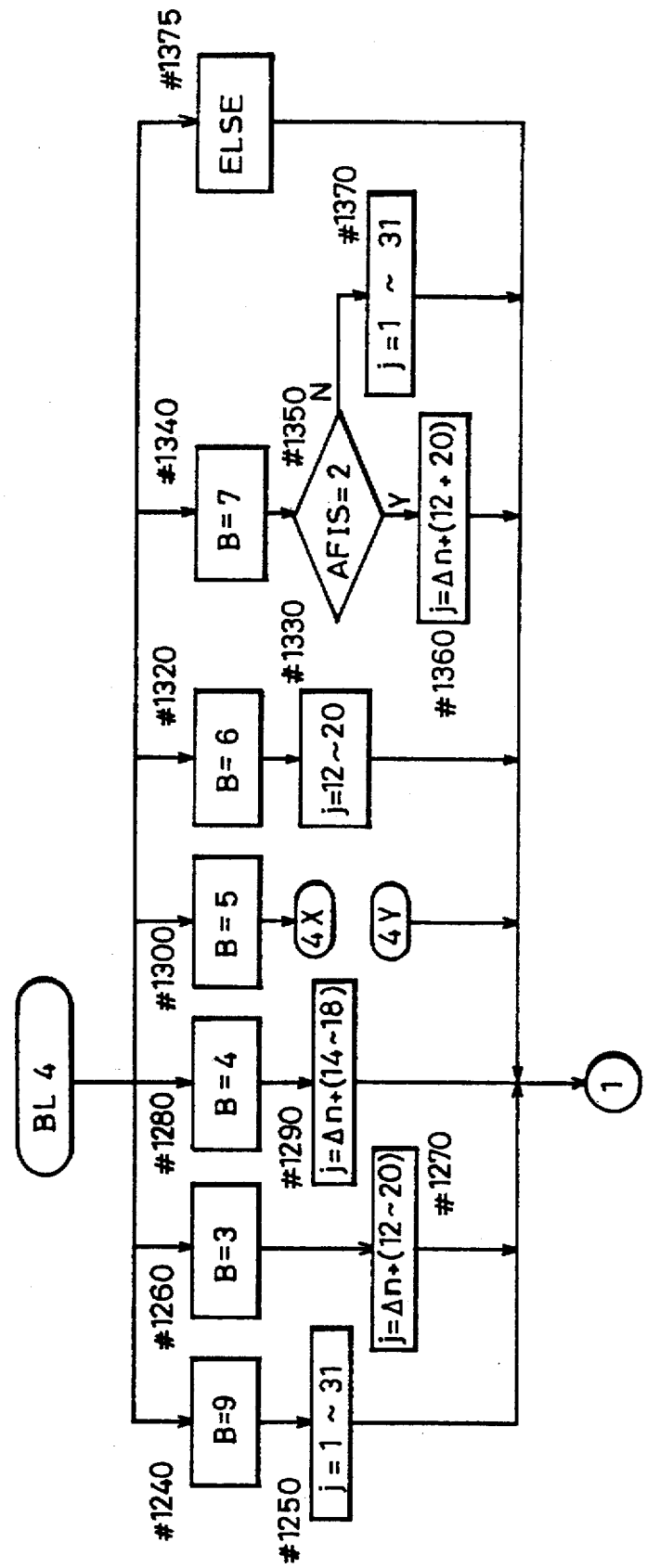

Correlation calculation in the fourth block BL4 is shown in FIGS. 16A and 16B. If the variable B is 9, the flow proceeds to step 1240; if B=3, the flow proceeds to step 1260; if B=4, the flow proceeds to step 1280; if B=5 the flow proceeds to step 1300; if B=6, the flow proceeds to step 1320; and if B=7, the flow proceeds to step 1340. In other cases, the flow proceeds to step 1375. If the variable B is 9, which means that the spot AF mode is selected, the range of the shift number j is set to 1 to 31 (in step 1030) since there is no limitation on the shift number in the fourth block BL4. If the variable B is 3, the shift range is set to ±4 pitches from the present focus position. If the variable B is 6, the shift range is set to ±4 pitches from the in-focus position. Although the shift number at the in-focus position in the third block BL3 was j=6, the shift number at the in-focus position in the fourth block BL4 is j=16 and ±4 pitches are added to the present focus position (16+Δn) in the case of B=3 and to the in-focus position 16 in the case of B=6, so that the range of the shift number j is set to Δn+(12 to 20) and 12 to 20 in each case (in steps 1270 and 1330). If the variable B is 4, the shift range is set to ±2 pitches from the present focus position (16+Δn) and accordingly the range of the shift number j is set to Δn+(14 to 18) (in step 1290). If the variable B is 5, it is determined in step 1305 whether a rear focus condition occurs or not. If it is determined that the rear focus condition occurs, the shift range is set to a range from a rear focus (+2) deviating by two pitches from the present focus position to a front focus (−2) deviating by two pitches from the in-focus position 16 and accordingly the range of the shift number j is set to 14 to (Δn+18) (in step 1310). If it is determined that a rear focus condition does not occur, the shift range is set to a range from a front focus (−2) deviating by two pitches from the present focus position (16+Δn) to a rear focus (+2) deviating by two pitches from the in-focus position 16 and accordingly the range of the shift number j is set to (Δn+14) to 18 (in step 1315). If the variable B is 7, it is determined in step 1350 whether the variable AFIS is equal to 2 or not in order to determine whether the previously used island is the second island IS2 or not. If the variable AFIS is equal to 2 in step 1350, the shift range is set to ±4 pitches from the present focus position (16+Δn) and accordingly the range of the shift number j is set to Δn+(12 to 20) by adding ±4 pitches to the present focus position (in step 1360). If it is determined in step 1350 that the variable AFIS is not 2, the range of the shift number j is set to 1 to 31 assuming that no limitation is imposed on the shift number (in step 1370). In other cases, that is, if the variable B is 1 or 8, the range has been already set in step 1030 and there is no change. Accordingly, new setting is not required. If the variable B is 2, correlation calculation in the fourth block BL4 is not effected (in step 1210).

In any of the above mentioned cases, the processing flow proceeds to step 1380 from the corresponding one of the steps 1250, 1270, 1290, 1310, 1315, 1330, 1360, 1370 and 1375, so that the low contrast determination level $K_{LC}$ is set to the prescribed value $K_{LC1}$. In step 1390, the reliability determination level $K_{YM/C}$ is set to the prescribed value $K_{YM/C1}$. In step 1395, a start number in the basic region for obtaining correlation is set to k= 10. In step 1400, determination of unavailable focus detection and correlation calculation I are performed. Since this subroutine of step 1400 is the same as the above described subroutine called in step 1200, the description is not repeated. After a return from the subroutine, it is determined in step 1403 whether the flag LCFB is reset or not. If it is determined in step 1403 that the flag LCFB is reset, focus detection is not unavailable in the fourth block BL4 and a value obtained by subtraction of the in-focus position value 16 from the shift number j before interpolation indicating the maximum correlation is substituted for the deviation shift number Δn4 in step 1405. In step 1407, the shift number j=16 at the in-focus position is subtracted from the shift amount Δd obtained after the interpolation, so that the defocus amount Δd4 in the fourth block BL4 is calculated as Δd−16. If it is determined in step 1403 that the flag LCBF is not reset, it is determined that focus detection is unavailable in the fourth block BL4 and the processing flow skips steps 1405 and 1407. In step 1410, it is determined whether the variable is 9 (indicating the spot AF mode) or not. If B=9 is determined in step 1410, Δd4 is substituted for Δd12 indicating the defocus amount of the second island in step 1415 and since only the focus detection in the fourth block BL4 is required, the flow returns. If it is determined that the variable B is not 9, the flow proceeds to step 1420 to perform correlation calculation in the fifth block BL5.

Figure 17A:
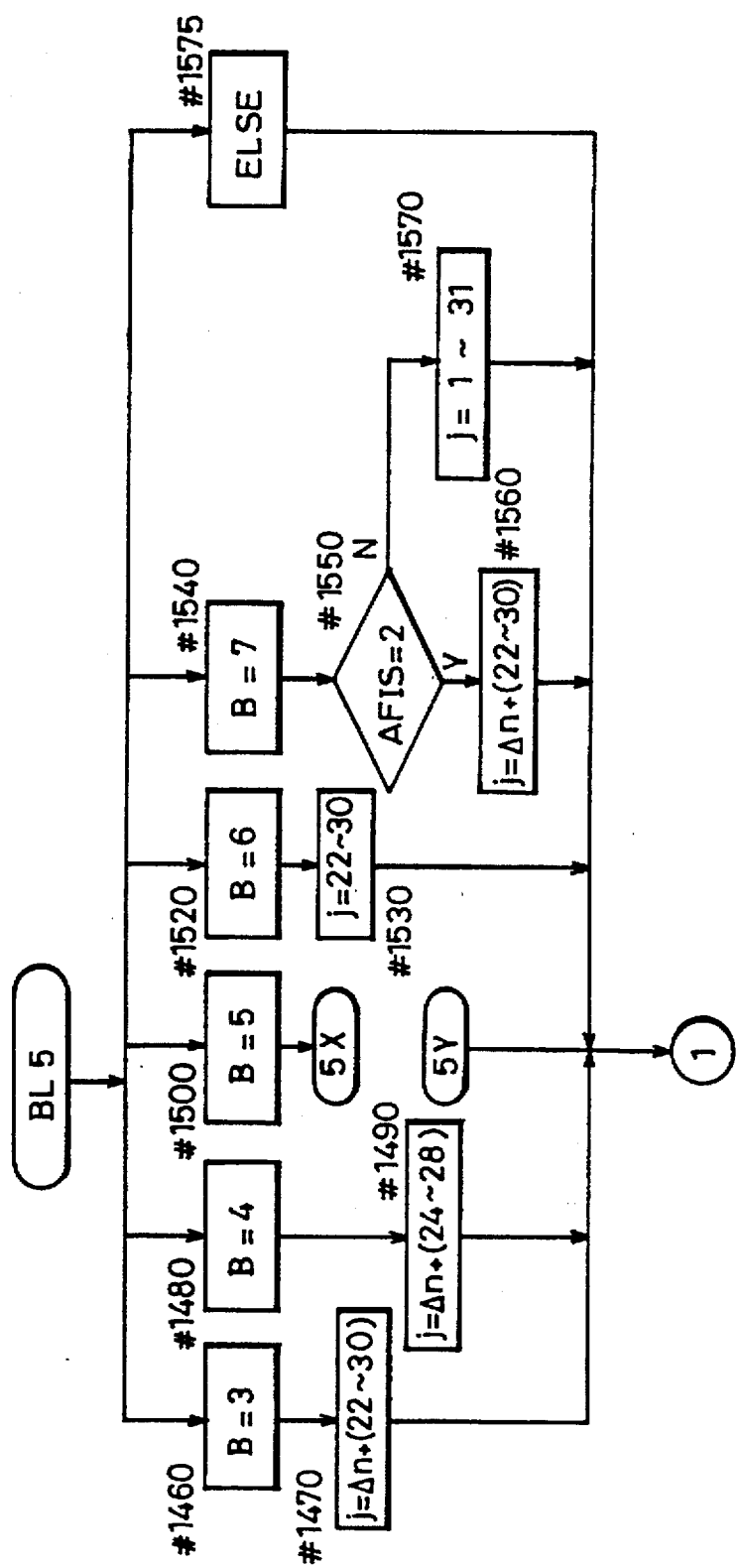
FIGS. 17A, 17B and 17C are flowcharts showing detailed procedures of correlation calculation of the fifth block in FIG. 14B.
Figure 17B:
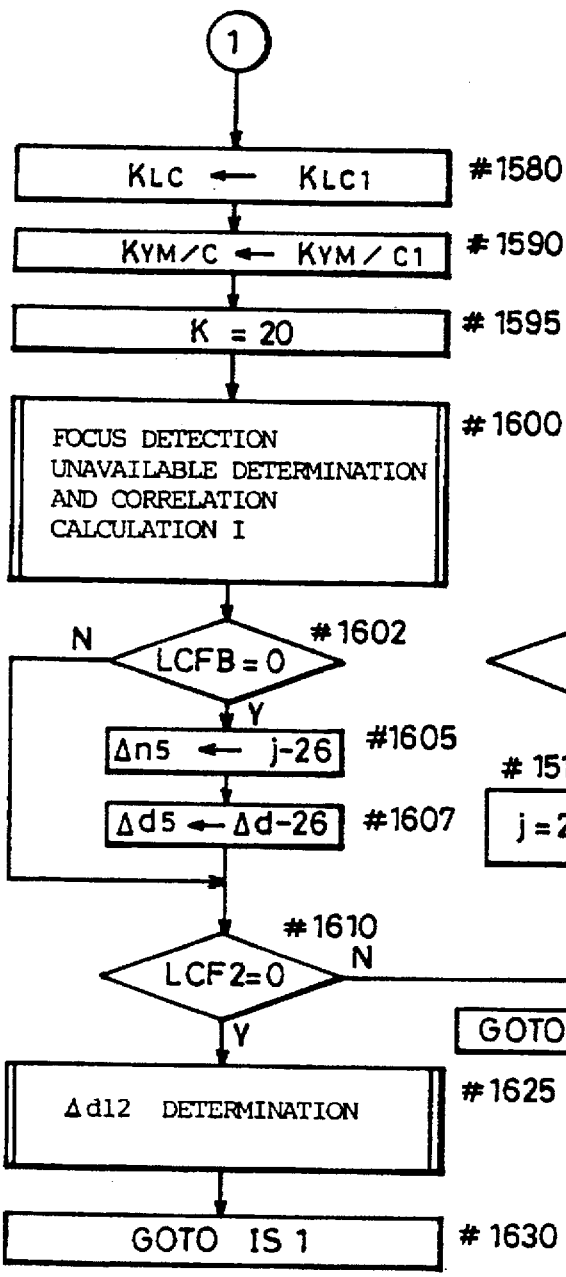
Figure 17C:
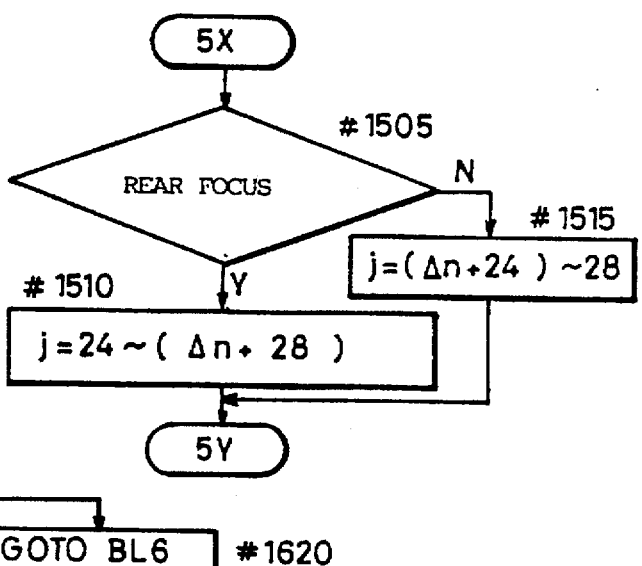

The correlation calculation in the fifth block BL5 is shown in FIGS. 17A and 17B. If the variable B is 3, the flow proceeds to step 1460; if B=4, it proceeds to step 1480; if B=5, it proceeds to step 1500; if B=6, it proceeds to step 1520; if B=7, it proceeds to step 1540; and in the other cases, it proceeds to step 1575. If the variable B is 3, the shift range is defined as a range of ±4 pitches from the present focus position and if the variable B is 6, the shift range is defined as a range of ±4 pitches from the in-focus position. Although the shift numbers at the in-focus positions in the above mentioned third and fourth blocks are j=6 and j=16, respectively, the shift number at the in-focus position in the fifth block BL5 is j=26 and accordingly ±4 pitches are added to the present focus position (26+Δn) in the case of B=3 and to the in-focus position 26 in the case of B=6, so that the range of the shift number j in each case is set to Δn+(22 to 30) and 22 to 30 (in steps 1470 and 1530). If the variable B is 4, the shift range is defined as a range of ±2 pitches from the present focus position (26+Δn) and accordingly ±2 pitches are given to the present focus position (26+Δn), whereby the range of the shift number j is set to Δn+(24 to 28) (in step 1490). If the variable B is 5, it is determined in step 1505 whether a rear focus condition occurs or not. If it is determined that the rear focus condition occurs, the shift range is defined as a range from a rear focus (+2) deviating by two pitches from the present focus position to a front focus (−2) deviating by two pitches from the in-focus position 26 and accordingly the range of the shift number j is set to 24 to (Δn+28) (in step 1510). If it is determined that the rear focus condition does not occur, the shift range is defined as a range from a front focus (−2) deviating by two pitches from the present focus position to a rear focus (+2) deviating by two pitches from the in-focus position 26 and accordingly the range of the shift number j is set to (Δn+24) to 28 (in step 1515). If the variable B is 7, it is determined in step 1550 whether the variable AFIS is 2 or not in order to determine whether the previously used island is the second island IS2 or not. If it is determined in step 1550 that the variable AFIS is 2, the shift range is defined as a range of ±4 pitches from the present focus position (26+Δn) and accordingly ±4 pitches are given additionally to the present focus position (26+Δn), whereby the range of the shift number j is set to Δn+(22 to 30) (in step 1560). If it is determined in step 1550 that the variable AFIS is not 2, no limitation is imposed on the shift number and the range of the shift number j is set to 1 to 31 (in step 1570). In other cases, that is, if the variable B is 1, 2 or 8, there is no change since the range has been already set (in step 1030), and new setting is not required. If the variable B is 9 (indicating the spot AF mode), correlation calculation in the fifth block BL5 is not performed (in step 1410).

In any of the above mentioned cases, the processing flow proceeds to step 1580 from the corresponding one of the steps 1470, 1490, 1510, 1515, 1530, 1560, 1570 and 1575, so that the low contrast determination level $K_{LC}$ is set to the prescribed value $K_{LC1}$. In step 1590, the reliability determination level $K_{YM/C}$ is set to the prescribed value $K_{YM/C1}$. In step 1595, a start number k in the basic region for obtaining correlation is set to k=20. In step 1600, determination of unavailable focus detection and correlation calculation I are performed. Since this subroutine of step 1600 is the same as the above described subroutine called in step 1200, the description is not repeated. After a return from the subroutine, it is determined in step 1602 whether the flag LCFB is reset or not. If it is determined in step 1602, that the flag LCFB is reset, it is determined that focus detection is not unavailable in the fifth block BL5, and a value obtained by subtraction of the in-focus position value 26 from the shift number j before the interpolation indicating the maximum correlation is stored as the variable Δn5 in step 1605. in step 1607, the shift number j=26 at the in-focus position is subtracted from the shift amount Δd after the interpolation calculation, so that the defocus amount Δd5 in the fifth block BL5 is calculated as Δd−26. If it is determined in step 1602 that the flag LCFB is not reset, it is determined that focus detection is unavailable in the fifth block BL5 and the processing flow skips the steps 1605 and 1607. In step 1610, it is determined whether the flag LCF2 is reset or not. If it is determined in step 1610 that the flag LCF2 is not reset, it is determined that focus detection is unavailable for the moment in the second island IS2 and the processing flow proceeds to step 1620 to perform correlation calculation in the sixth block BL6. If it is determined in step 1610 that the flag LCF2 is reset, which means that focus detection is available in at least one of the third to fifth blocks BL3 to BL5, the subroutine for determining the defocus amount Δd12 from the in-focus position in the second island is called in step 1625.

Figure 18:
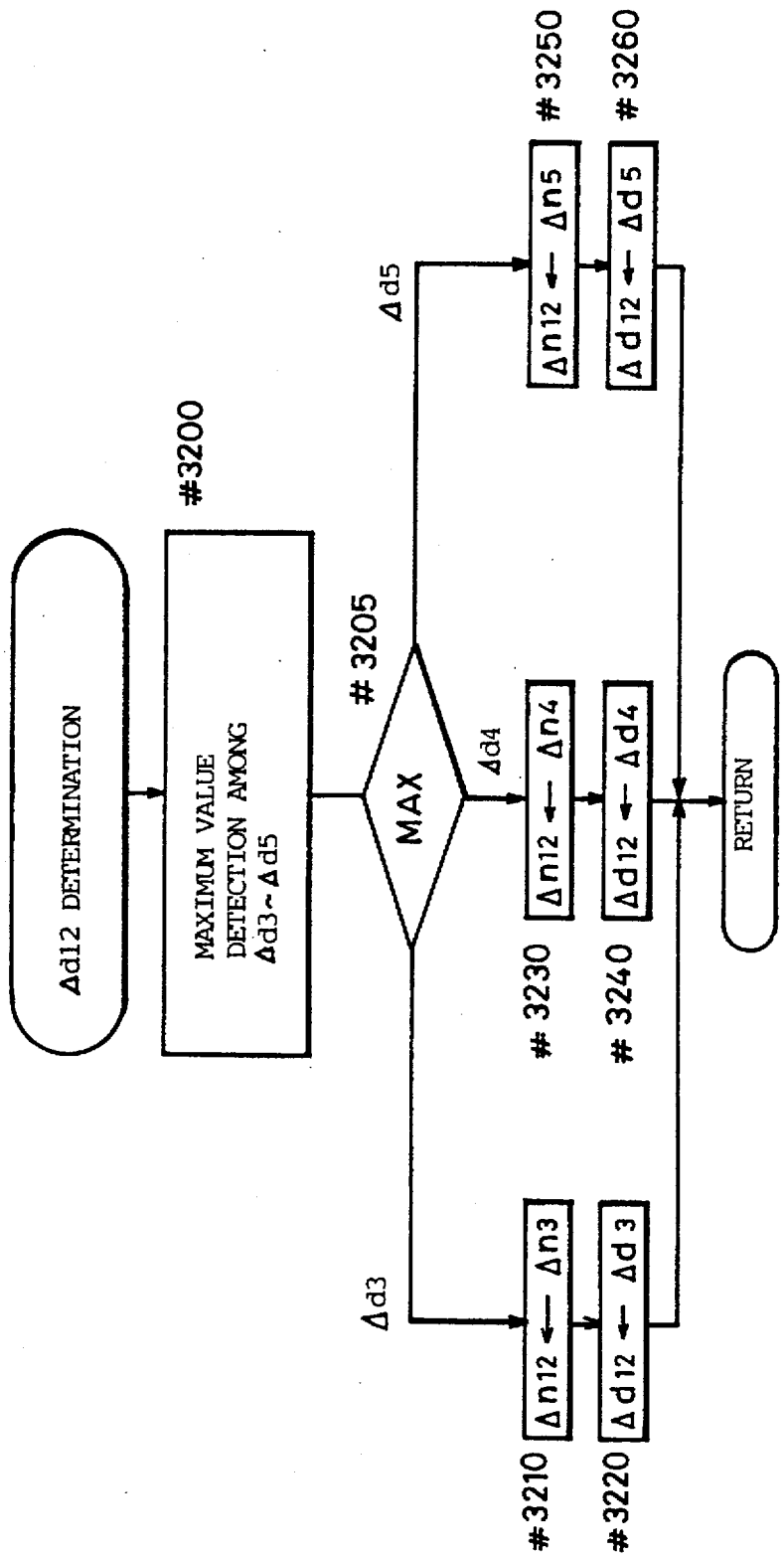
FIG. 18 is a flowchart showing detailed procedures of the subroutine for determining a defocus amount in FIG. 17B.

This subroutine will be described with reference to FIG. 18. In step 3200, the maximum value among the defocus amounts Δd3 to Δd5 in the third to fifth blocks BL3 to BL5 is detected. This detection means that an object at the rearmost focus, namely, nearest to the camera is detected.

If the maximum value is Δd3, the flow proceeds to step 3210 from 3205, so that the shift number Δn3 in the third block BL3 is set as the shift number Δ12 in the second island IS2. In step 3220, the defocus amount Δd3 from the in-focus position in the third block BL3 is set as the defocus amount Δd12 from the in-focus position in the second island IS2 and then the processing flow returns.

If the maximum value is Δd4, the processing flow proceeds to step 3230 from step 3205, so that the shift number Δn4 in the fourth block BL4 is set as the shift number Δ12 in the second island IS2. Further, in step 3240, the defocus amount Δd4 from the in-focus position in the fourth block BL4 is set as the defocus amount Δd12 from the in-focus position in the second island IS2 and then the processing flow returns.

If the maximum value is Δd5, the processing flow proceeds to step 3250 from step 3205, so that the shift number Δn5 in the fifth block BL5 is set as the shift number Δ12 in the second island IS2. Further, in step 3260, the defocus amount Δd5 from the in-focus position in the fifth block BL5 is set as the defocus amount Δd12 from the in-focus position in the second island IS2 and then the processing flow returns.

After the return from the subroutine, correlation calculation in the first island IS1 is started through step 1630.

Figure 19A:
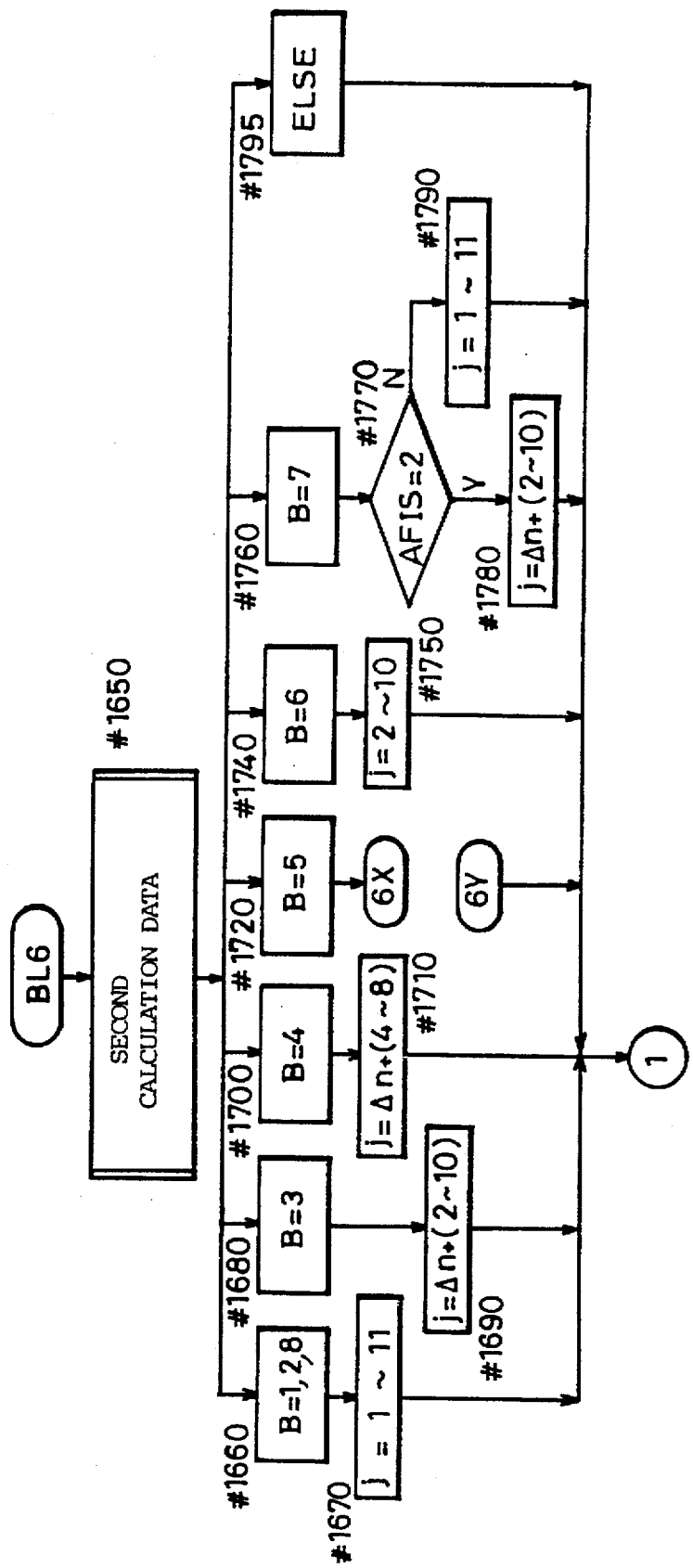
FIGS. 19A, 19B and 19C are flowcharts showing detailed procedures of correlation calculation of the sixth block in FIG. 17B.
Figure 19C:
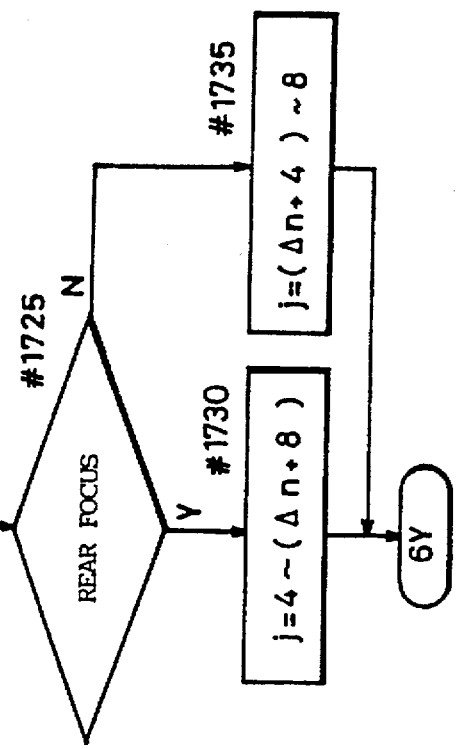

Before explanation of the correlation calculation in the first island IS1, description will be made of correlation calculation of the sixth block BL6 in the second island IS2 with reference to FIGS. 19A and 19B. The sixth block BL6 is a block in which focus detection is effected for an object the spatial frequency of which is low. First, in step 1650, in order to adapt focus detection for a low spatial frequency of the object, each of the difference data taken from the respective two pixels distant from each by three pixels is regarded as a group and further difference data are obtained from the respective two groups of difference data distant from each other by three groups, that is, they are obtained consequently from the respective two pixels distant from each other by seven pixels. Then, calculation data are prepared from those difference data by addition of the adjacent different data. More specifically, assuming that the difference data in the basic region and the reference region are $a_i$ and $a'_i$, respectively, the second difference data are $(a_i - a_{i+3})$ and $(a'_i - a'_{i+3})$ respectively. Further, the calculation data $a''_i$ and $a'''_i$ obtained by addition of the adjacent data among the second difference data are represented as follows.

$$a''_i = (a_i - a_{i+3}) + (a_{i+1} - a_{i+4})$$
$$= (a_i + a_{i+1}) - (a_{i+3} + a_{i+4})$$
$$a'''_i = (a'_i - a'_{i+3}) + (a'_{i+1} - a'_{i+4})$$
$$= (a'_i + a'_{i+1}) - (a'_{i+3} + a'_{i+4})$$

Those data are calculated with respect to the difference data of the second island IS2, so that the second calculation data $a''_i$ and $a'''_i$ are obtained. The number of the data in the basic region and that in the reference region are 35 and 45, respectively.

After the calculation data are prepared in step 1650, the variable B is determined. If the variable B is 1, 2 or 8, the processing flow proceeds to step 1660; if B=3, it proceeds to step 1680; if B=4, it proceeds to step 1700; if B=5, it proceeds to step 1720; if B=6, it proceeds to step 1740; if B=7, it proceeds to step 1760; and in other cases, it proceeds to step 1795. If the variable B is 1, 2 or 8, no limitation is imposed on the shift number in the sixth block BL6 and the range of the shift number j is set to 1 to 11 (in step 1670). If the variable B is 3, the shift range is set to ±4 pitches from the present focus position. Since the shift number at the in-focus position in the sixth block BL6 is j=6, ±4 pitches are given additionally to the present focus position (6+Δn), whereby the range of the shift number j is set to Δn+(2 to 10) (in step 1690). If the variable B is 4, the shift range is set to ±2 pitches from the present focus position. Since the shift number at the in-focus position in the sixth block BL6 is j=6, ±2 pitches are given additionally to the present focus position (6+Δn), whereby the range of the shift number j is set to Δn+(4 to 8) (in step 1710). If the variable B is 5, it is determined in step 1725 whether a rear focus condition exists or not. If it is determined that the rear focus condition exists, the shift range is defined as a range from a rear focus (+2) two pitches away from the present focus position to a front focus (−2) two pitches away from the in-focus position 6 and accordingly the range of the shift number j is set to 4 to (Δn+8) (in step 1730). If it is determined that the rear focus condition does not exist, the shift range is defined as a range from a front focus (−2) two pitches away from the present focus position to a rear focus (+2) two pitches away from the in-focus position and accordingly the range of the shift number j is set to (Δn+4) to 8 (in step 1735). If the variable B is 6, the shift range is set to ±4 pitches from the in-focus position. Since the shift number at the in-focus position in the sixth block BL6 is j=6, ±4 pitches are given additionally and the range of the shift number j is set to 2 to 10 (in step 1750). If the variable B is 7, it is determined in step 1770 whether the variable AFIS is 2 or not in order to determine whether the previously used island is the second island IS2 or not. If it is determined in step 1770 that the variable AFIS is 2, the shift range is set to ±4 pitches from the present focus position (6+Δn) and accordingly by addition of ±4 pitches to the present focus position (6+Δn), the range of the shift number j is set to Δn+(2 to 10) (in step 1780). If it is determined in step 1770 that the variable AFIS is not 2, it is assumed that no limitation is imposed on the shift number, and the range of the shift number j is set to 1 to 11 (in step 1790). If the variable B is 9, the spot AF mode is set and only the fourth block BL4 is concerned and, accordingly, the flow does not proceed to step 1795 in this embodiment.

If the variable B is any of 1 to 8, the flow proceeds to step 1800 from the corresponding one of the steps 1670, 1690, 1710, 1730, 1735, 1750, 1780 and 1790, so that the low contrast determination level $K_{LC}$ is set to the prescribed value $K_{LC2}$ ($\neq K_{LC1}$). In step 1810, the reliability determination level $K_{YM/C}$ is set to the prescribed value $K_{YM/C2}$ ($\neq K_{LC}$). More specifically, since the number used in the sixth block BL6 is different from that in the third to fifth blocks BL3 to BL5, the low contrast determination level $K_{LC}$ and the reliability determination level $K_{YM/C}$ are different from the determination levels in the third to fifth blocks. In step 1820, determination of unavailable focus detection and correlation calculation II are performed.

Figure 20:
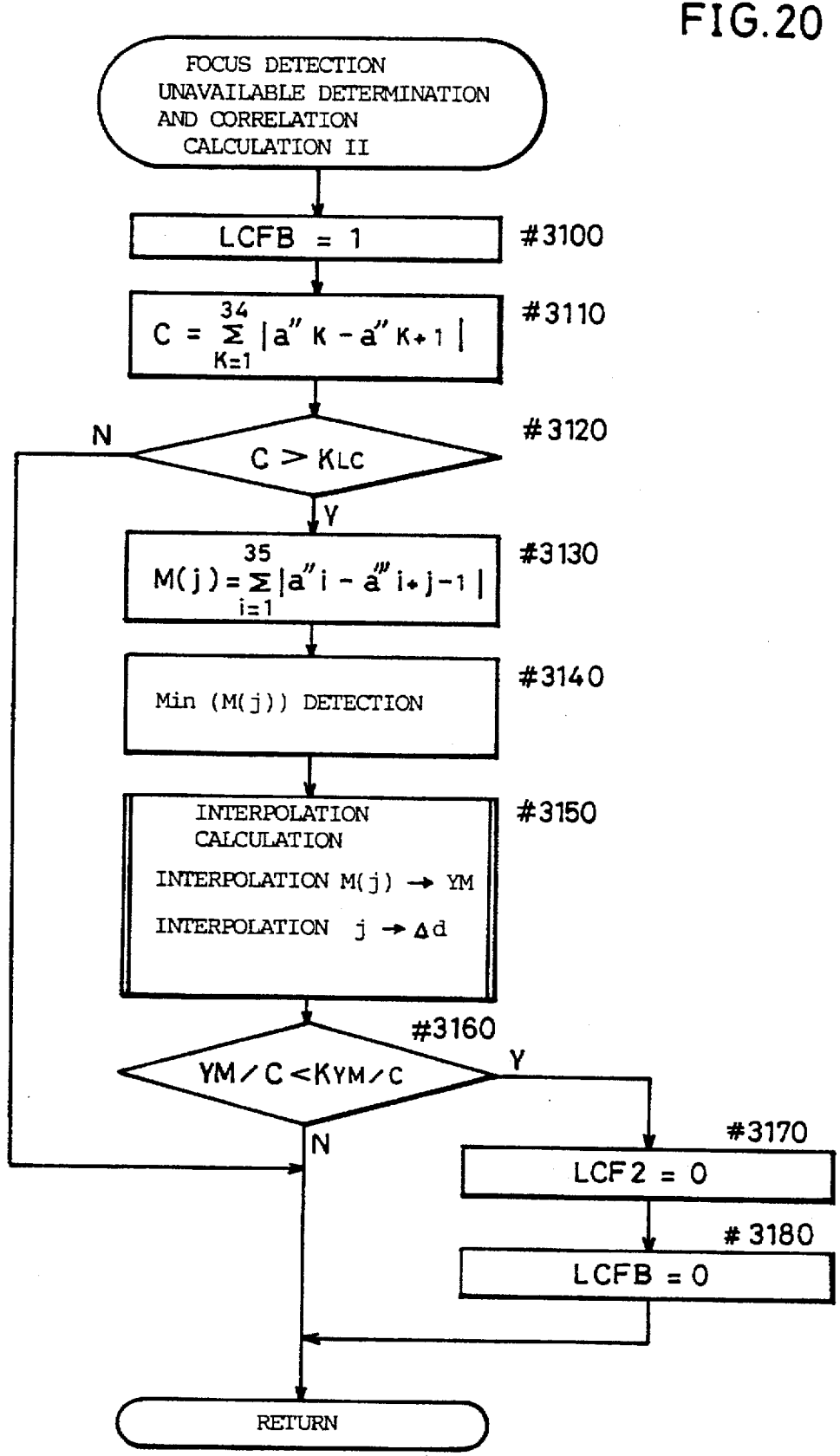
FIG. 20 is a flowchart showing detailed procedures of focus detection unavailable determination and correlation calculation II in FIG. 19B.

The subroutine of this step 1820 will be described with reference to FIG. 20. First, in step 3100, the flag LCFB is set to indicate that focus detection is unavailable in the block (the sixth block BL6) where calculation for focus detection is presently performed. In step 3110, a contrast value of the object is obtained from the sixth block BL6 of the basic region according to the below indicated equation.

$$C = \sum_{k=1}^{34} |a''_k - a''_{k+1}|$$

Since the number of data in the sixth block BL6 is different from that in the third to fifth blocks, the number of calculations for obtaining the contrast value C is different from that in step 3010. In step 3120, it is determined whether the obtained contrast value C is larger than the prescribed value $K_{LC}$ or not. If it is the prescribed value or less ($C \leq K_{LC}$), the processing flow returns. If the contrast value C is larger than the prescribed value $K_{LC}$ ($C > K_{LC}$), the processing flow proceeds to step 3130 to perform correlation calculation according to the below indicated equation;

$$M(j) = \sum_{i=1}^{35} |a''_i - a'''_{i+j-1}|$$

where $a''_i$ represents data in the basic region and $a'''_{i+j-1}$ represents data in the reference region. Those data are obtained by the calculation in step 1650. Since the number of the data in the sixth block BL6 is different from that in the third to fifth blocks BL3 to BL5, the number of correlation calculations is different from that in step 3030. In steps 3140 to 3180, the minimum value MIN(M(j)) of the correlation calculation value M(j) is obtained and interpolation calculation is performed for this minimum value, so that reliability of the correlation calculations is determined. If the reliability is determined, the flags LCF2 and LCFB are reset and the processing flow returns. Since the detailed procedures of those steps are entirely the same as those in step 3040 to 3080, the description is not repeated.

Figure 19B:
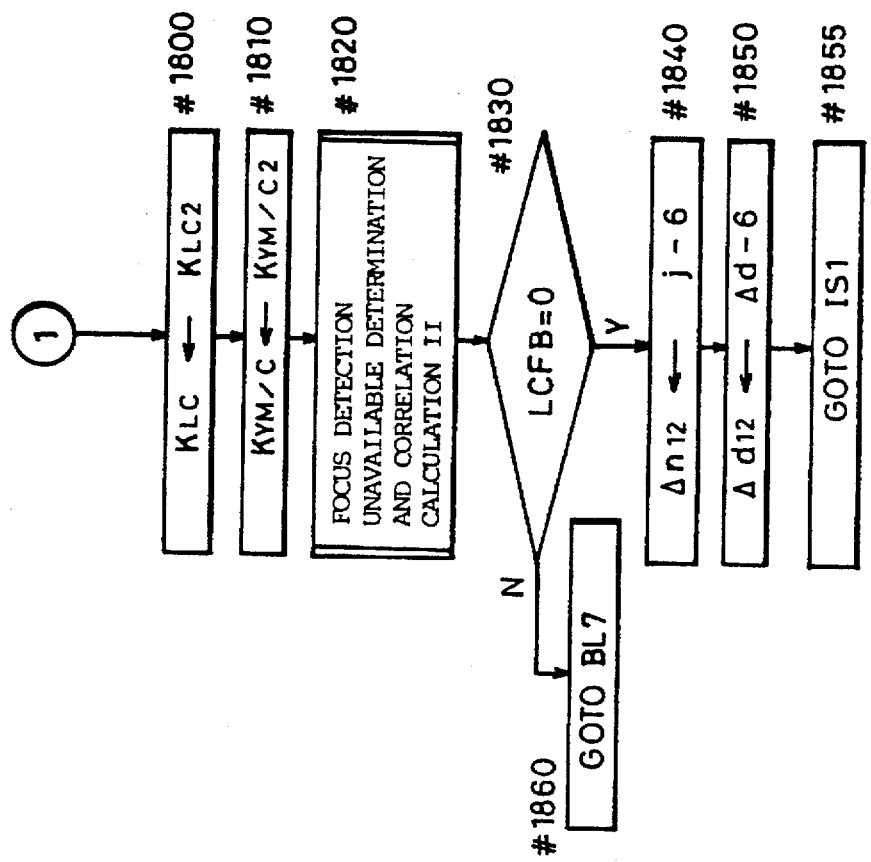

Referring again to the flow of FIG. 19B, it is determined in step 1830 whether the flag LCFB is reset or not in order to determine whether focus detection is unavailable in the sixth block BL6 where the correlation calculation was performed in step 1820. This flag LCFB is reset when focus detection is unavailable (in step 3180) in the block where correlation calculation was performed. If it is determined in step 1830 that the flag LCFB is reset, that is, focus detection is not unavailable in the sixth block BL6, a value obtained by subtraction of the in-focus position value 6 from the shift number j of the sixth block BL6 obtained in step 3140 is substituted for the variable Δn12 indicating the deviation shift number in the second island IS2 so that the result of focus detection in the sixth block BL6 is used as the result of focus detection in the second island IS2 (in step 1840). In order to obtain a defocus amount from the in-focus position in the second island IS2, the shift number j=6 at the in-focus position of the sixth block BL6 is subtracted from the shift number Δd obtained in the interpolation calculation in step 3150 and the result is obtained as Δd12 (in step 1850). Then, the flow proceeds to correlation calculation in the first island IS1 through the step 1855. If it is determined in step 1830 that the flag LCFB is not reset, that is, focus detection is unavailable in the sixth block BL6, the flow proceeds to correlation calculation in the seventh block BL7 through the step 1860.

The flow chart for determination of unavailable focus detection and the correlation calculation III in the seventh block BL7 will be described with reference to FIG. 21. If the variable B is 1, 2 or 8, the processing flow proceeds to step 1870; if B=7, it proceeds to step 1890; and in other cases, it proceeds to step 1925. If the variable B is 1, 2 or 8, it is assumed that no limitation is imposed on the shift number in the seventh block BL7, and the range of the shift number j is set to 1 to 21 (in step 1880). If the variable B is 7, it is determined in step 1900 whether the variable AFIS is 2 or not in order to determine whether the previously used island is the second island IS2 or not. If it is determined in step 1900 that the variable AFIS is 2, the shift range is set to ±4 pitches from the present focus position (6+Δn). Since the shift number at the in-focus position in the seventh block is j=6, ±4 pitches are given additionally, whereby the range of the shift number j is set to Δn+(2 to 10) (in step 1910). If it is determined in step 1900 that the variable AFIS is not 2, it is assumed that no limitation is imposed on the shift number, and the range of the shift number j is set to 1 to 21 (in step 1920).

The processing flow proceeds to step 1930 from any of the steps 1880, 1910, 1920 and 1925, so that the low contrast determination level $K_{LC}$ is set to a prescribed value $K_{LC3}$. Then, in step 1810, the reliability determination level $K_{YM/C}$ is set to a prescribed value $K_{YM/C3}$. More specifically, the number of data used in the seventh block BL7 is different from that in the third to fifth blocks BL3 to BL5 or that in the sixth block BL6, and the number of data in the basic region is 26. Consequently, the low contrast determination level $K_{LC}$ and the reliability determination level $K_{YM/C}$ are also different from the determination levels in the third to fifth blocks BL3 to BL5 or the sixth block BL6. In step 1945, a start number k in the basic region for obtaining correlation is 0. i=1 is added afterwards (in steps 3310 and 3330) to the start number k and, practically, i+k=1 is used as the start number in the basic region. In step 1950, determination of unavailable focus detection and correlation calculation III are performed.

Figure 22:
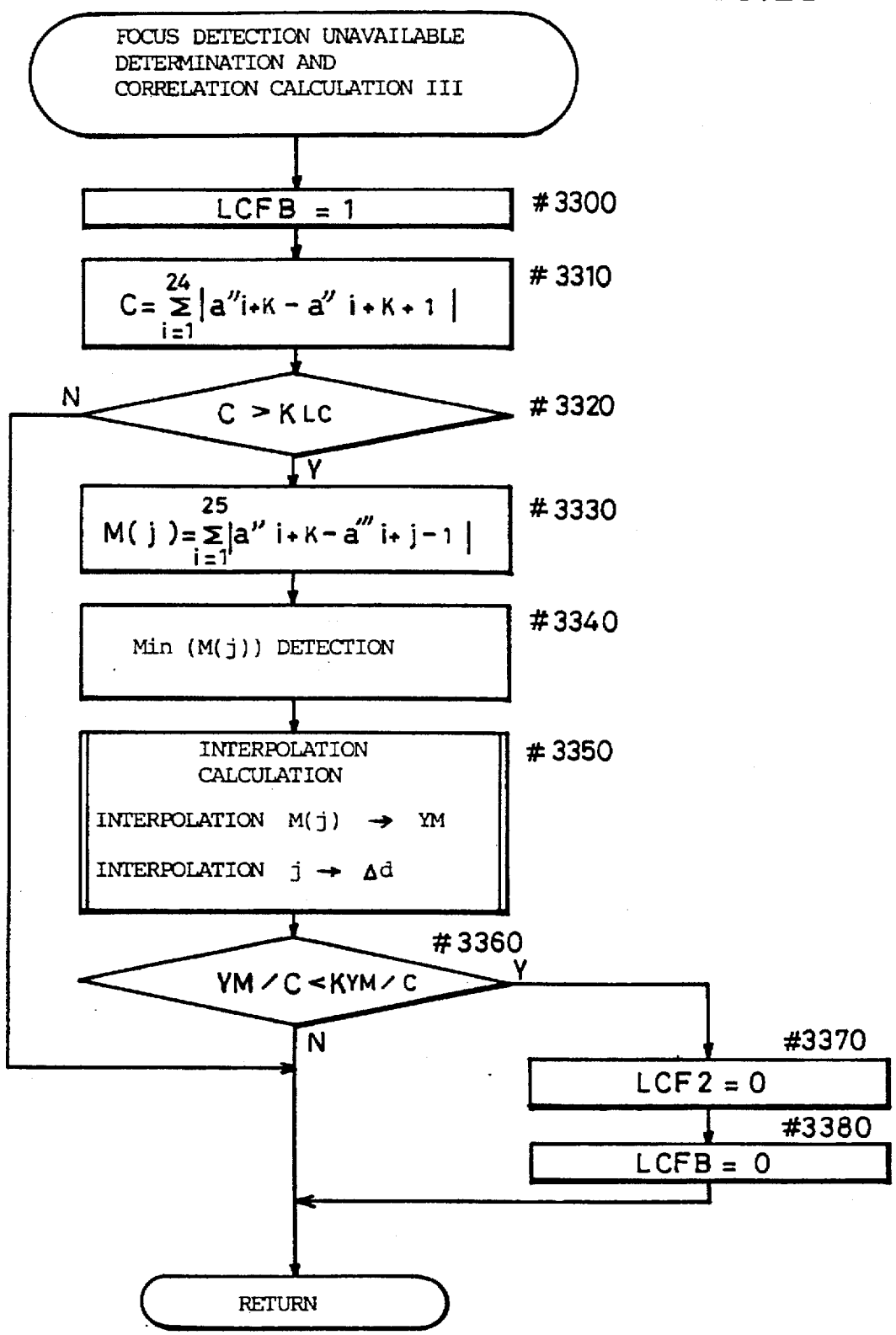
FIG. 22 is a flowchart showing detailed procedures of focus detection unavailable determination and correlation calculation III in FIG. 21.

The subroutine of step 1950 will be described with reference to FIG. 22. First, in step 3300, the flag LCFB is set to indicate that focus detection is unavailable in the block in which calculation for focus detection is currently performed. In step 3310, a contrast value C is obtained from the block (the seventh block BL7) where correlation calculation in the basic region is currently performed, according to the below indicated equation.

$$C = \sum_{i=1}^{24} |a''_{i+k} - a''_{i+k+1}|$$

In step 3320, it is determined whether the contrast value C thus obtained is larger than the prescribed value $K_{LC}$ or not. If it is the prescribed value $K_{LC}$ or less, the flow returns. If C>$K_{LC}$, correlation calculation is performed in step 3330 according to the below described equation:

$$M(j) = \sum_{i=1}^{25} |a''_{i+k} - a'''_{i+j-1}|$$

where $a''_{i+k}$ represents data in the basic region and $a'''_{i+j-1}$ represents data in the reference region. Those data are obtained by the calculation in step 1650. Since the number of data in the seventh block BL7 is different from that in the third to fifth blocks BL3 to BL5 or that in the sixth block BL6, the number of correlation calculations is different from that in step 3030 or 3130. In step 3340 to 3380, the minimum value MIN(M(j)) of the correlation calculation value M(j) is obtained and interpolation calculation is performed for this minimum value, so that reliability of the correlation calculation is determined. If it is determined that the calculation has reliability, the flags LCF2 and LCFB are reset and the flow returns. Since detailed procedures of those steps are entirely the same as those in steps 3040 to 3080, the description is not repeated.

Figure 21:
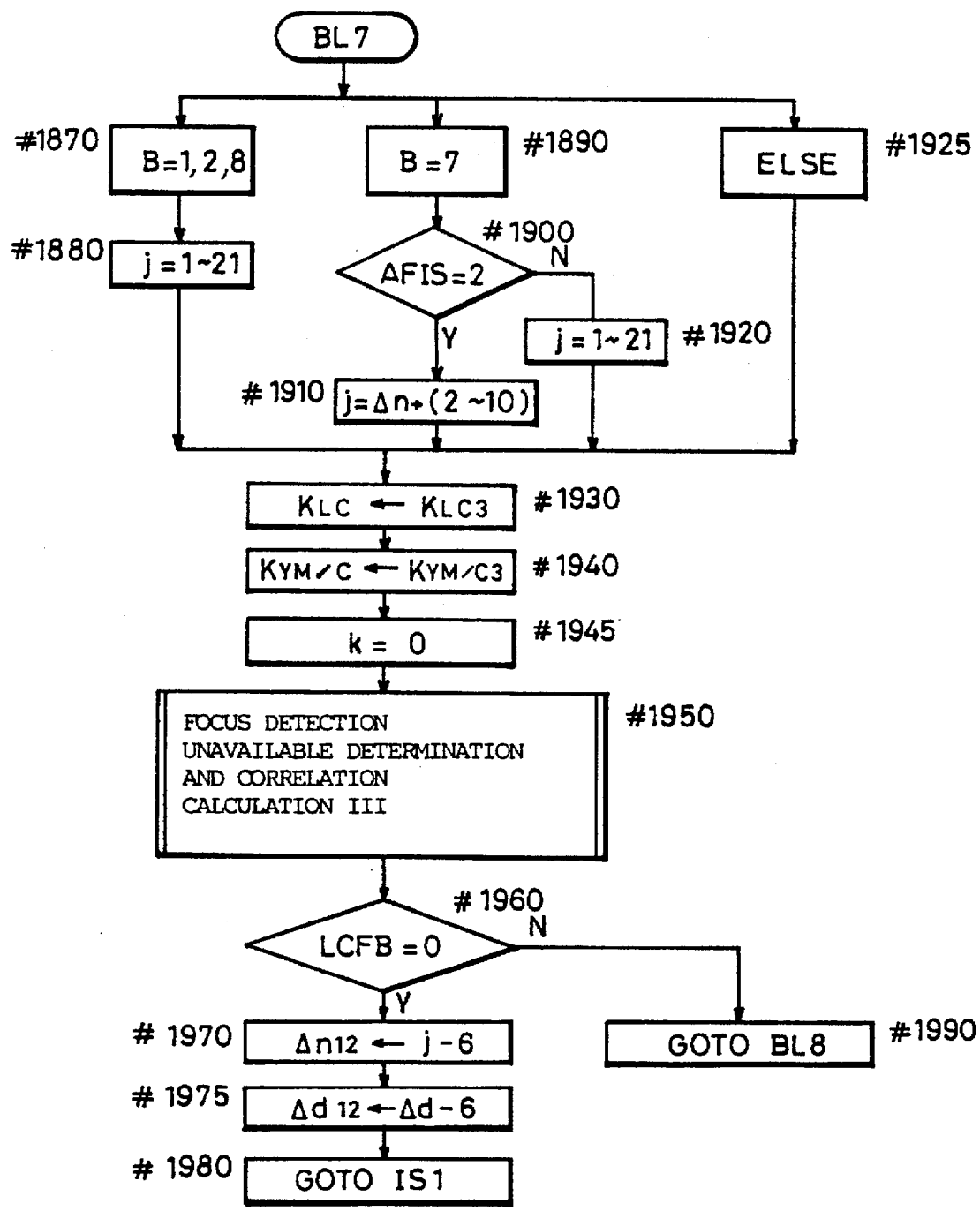
FIG. 21 is a flowchart showing detailed procedures of correlation calculation of the seventh block in FIG. 19B.

Referring again to the flow chart of FIG. 21, it is determined in step 1960 whether the flag LCFB is reset or not in order to determine whether focus detection is unavailable or not in the seventh block BL7 where the correlation calculation has been performed in step 1950. If it is determined in step 1960 that the flag LCFB is reset, that is, focus detection is available in the seventh block BL7, a value obtained by subtraction of the in-focus position value 6 from the deviation shift number j in the seventh block BL7 obtained in step 3340 is substituted for the variable Δn12 indicating the shift number in the second island IS2 (in step 1970) so that the result of focus detection in the seventh block BL7 is adapted as the result of focus detection in the second island IS2. In order to obtain a defocus amount Δd12 from the in-focus position in the second island IS2, the shift number 6 at the in-focus position in the seventh block BL7 is subtracted from the shift number Δd obtained by the interpolation calculation in step 3350 so that the result is obtained as Δd12 (in step 1975). Then, the flow proceeds to correlation calculation in the first island IS1 through step 1980. If it is determined in step 1960 that the flag LCFB is not reset, that is, focus detection is unavailable in the seventh block BL7, the flow proceeds to correlation calculation in the eighth block BL8 through step 1990.

Figure 23A:
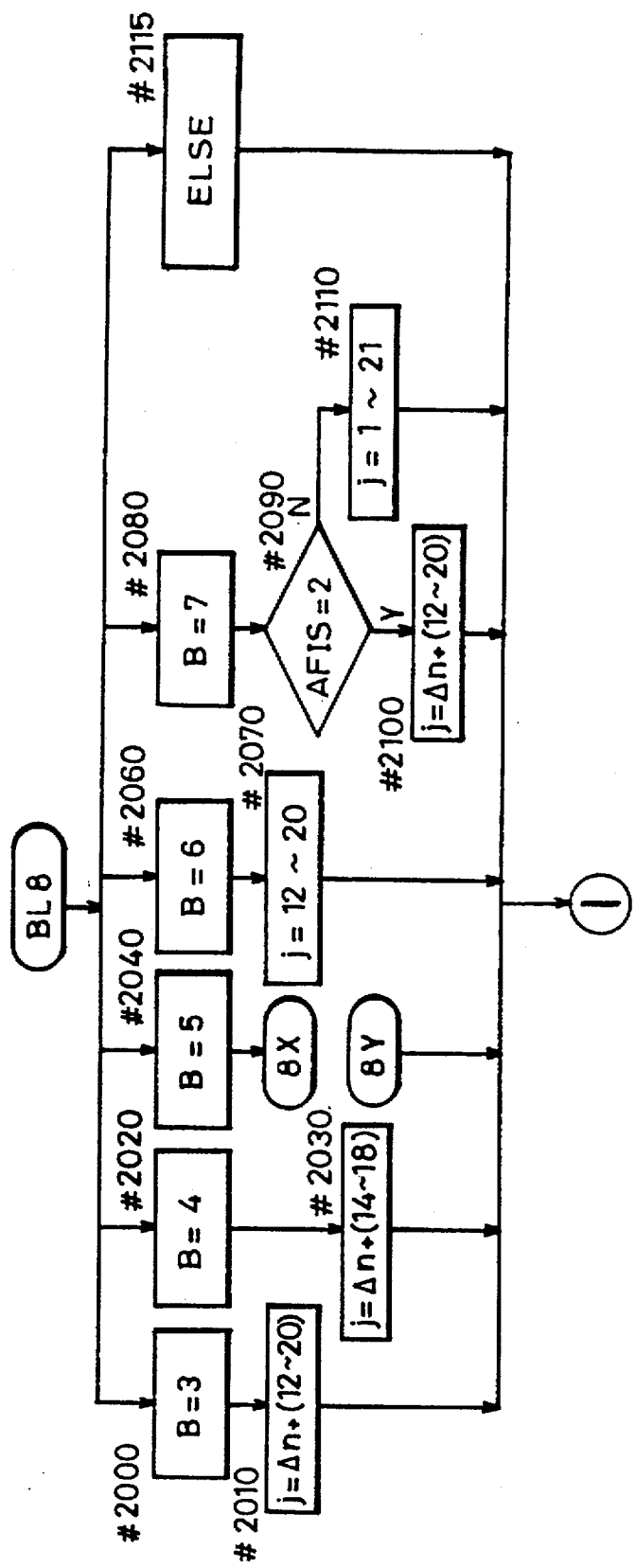
FIGS. 23A, 23B and 23C are flowcharts showing detailed procedures of correlation calculation of the eighth block in FIG. 21.
Figure 23C:
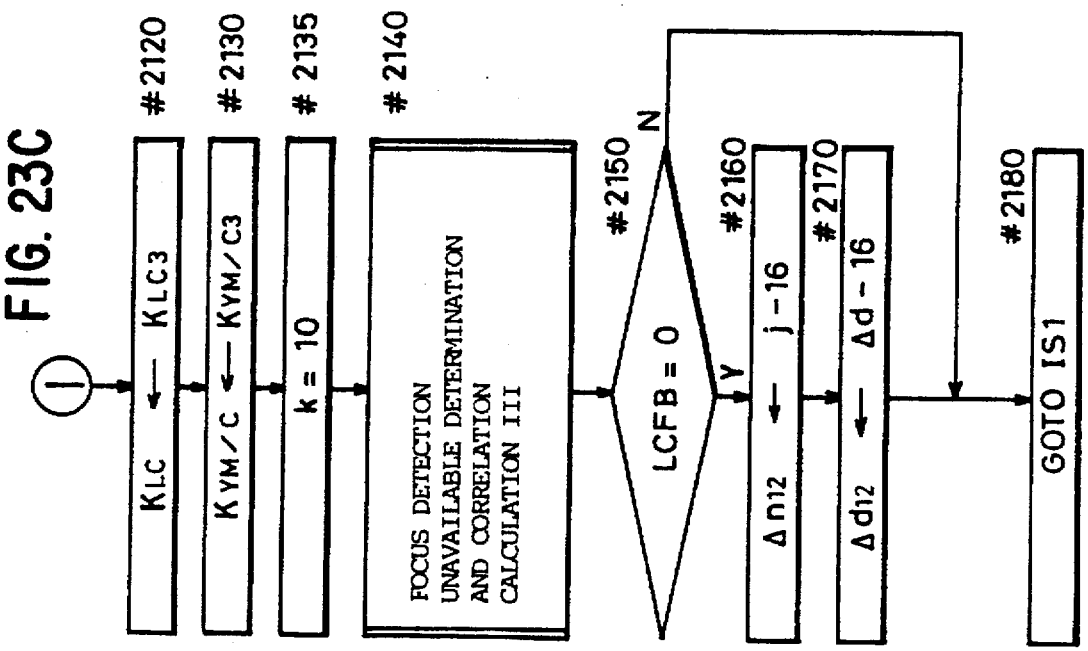
Figure 23B:
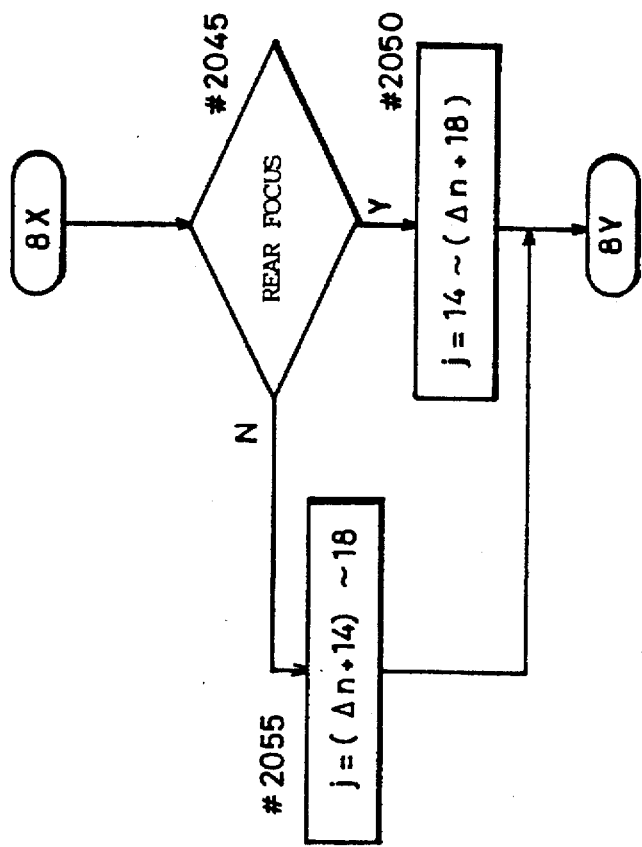

The flow chart for the correlation calculation in the eighth block BL8 will be described with reference to FIGS. 23A and 23B. If the variable B is 3, the flow proceeds to step 2000; if B=4, it proceeds to step 2020; if B=5, it proceeds to step 2040; if B=6, it proceeds to step 2060; if B=7, it proceeds to step 2080; and in other cases, it proceeds to step 2115. If the variable B is 3, the shift range is set to ±4 pitches from the present focus position and if the variable B is 6, the shift range is set to ±4 pitches from the in-focus position. Since the shift number j at the in-focus position in the eighth block BL8 is j=16, the range of the shift number j is set to Δn+(12 to 20) by adding ±4 pitches to the present focus position (16+Δn) in the case of B=3 and set to 12 to 20 in the case of B=6 (in steps 2010 and 2070). If the variable B is 4, the shift range is set to ±2 pitches from the present focus position and ±2 pitches are given additionally to the present focus position (16+Δn), whereby the range of the shift number j is set to Δn+(14 to 18) (in step 2030). If the variable B is 5, it is determined in step 2045 whether a rear focus condition exists or not. If it is determined that the rear focus condition exists, the shift range is defined as a range from a rear focus (+2) two pitches away from the present focus position to a front focus (−2) two pitches away from the in-focus position 16 and accordingly the range of the shift number j is set to 14 to ($\Delta$n+18) (in step 2050). If it is determined that the rear focus condition does not exist, the shift range is defined as a range from a front focus (−2) two pitches away from the present focus position to a rear focus (+2) two pitches away from the in-focus position 16 and accordingly the range of the shift number j is set to ($\Delta$n+14) to 18 (in step 2055). If the variable B is 7, it is determined in step 2090 whether the variable AFIS is 2 or not in order to determine whether the previously used island is the second island IS2 or not. If it is determined in step 2090 that the variable AFIS is 2, the shift range is set to ±4 pitches away from the present focus position (16+$\Delta$n) and accordingly the range of the shift number j is set to $\Delta$n+(12 to 20) by giving ±4 pitches additionally to the present focus position (16+$\Delta$n) (in step 2100). If it is determined in step 2090 that the variable AFIS is not 2, it is assumed that no limitation is imposed on the shift number, and the range of the shift number j is set to 1 to 21 (in step 2110).

The processing flow proceeds to step 2120 from any of the steps 2010, 2030, 2055, 2050, 2070, 2100, 2110 and 2115, so that the low contrast determination level $K_{LC}$ is set to the prescribed value $K_{LC3}$. In step 1810, the reliability determination level $K_{YM/C}$ is set to the prescribed value $K_{YM/C3}$. Thus, since the number of data to be used in the eighth block BL8 is the same as that in the seventh block BL7, the low contrast determination level $K_{LC}$ and the reliability determination level $K_{YM/C}$ are the same as those in the seventh block BL7. However, the start number in the basic region for obtaining correlation is different from that in the seventh block BL7 and the start number k is set to 10 in step 2135. i=1 is added afterwards to the start number k and, practically, i+k=11 is used as the start number in the basic region. In step 2140, determination of unavailable focus detection and correlation calculation III are performed. For this subroutine, the subroutine shown in FIG. 22 for the correlation calculation in the seventh block BL7 (in step 1950) is used. However, the shift number at the in-focus position in the eighth block BL8 is j=16 and the shift start number in the basic region is k=10. Accordingly, since those parameters are different, the result of calculation in step 2140 is different from that in step 1950. It is determined in step 2150 whether the flag LCFB is reset or not in order to determine whether focus detection is unavailable in the eighth block BL8 where correlation calculation has been performed in step 2140. If it is determined in step 2150 that the flag LCFB is reset, that is, focus detection is available in the eighth block BLS, a value obtained by subtraction of the in-focus position 16 from the shift number j in the eighth block BL8 obtained in step 3340 is substituted for the variable $\Delta$n12 indicating the deviation shift number in the second-island IS2 so that the result of focus detection in the eighth block BL8 is adapted as the result of focus detection in the second island IS2 (in step 2160). In order to obtain the defocus amount $\Delta$d12 from the in-focus position in the second island IS2, the shift number 16 at the in-focus position in the eighth block BL8 is subtracted from the shift number $\Delta$d obtained by the interpolation calculation in step 3350 and the result is obtained as $\Delta$d12 (in step 2170). Then, the processing flow proceeds to correlation calculation in the first island IS1 through step 2180. If it is determined in step 2150 that the flag LCFB is not reset, that is, focus detection is unavailable in the eighth block BL8, the processing flow proceeds to correlation calculation in the first island IS1 through step 2180. In this case, it finally means that the flag LCF2 is not reset.

Figure 24A:
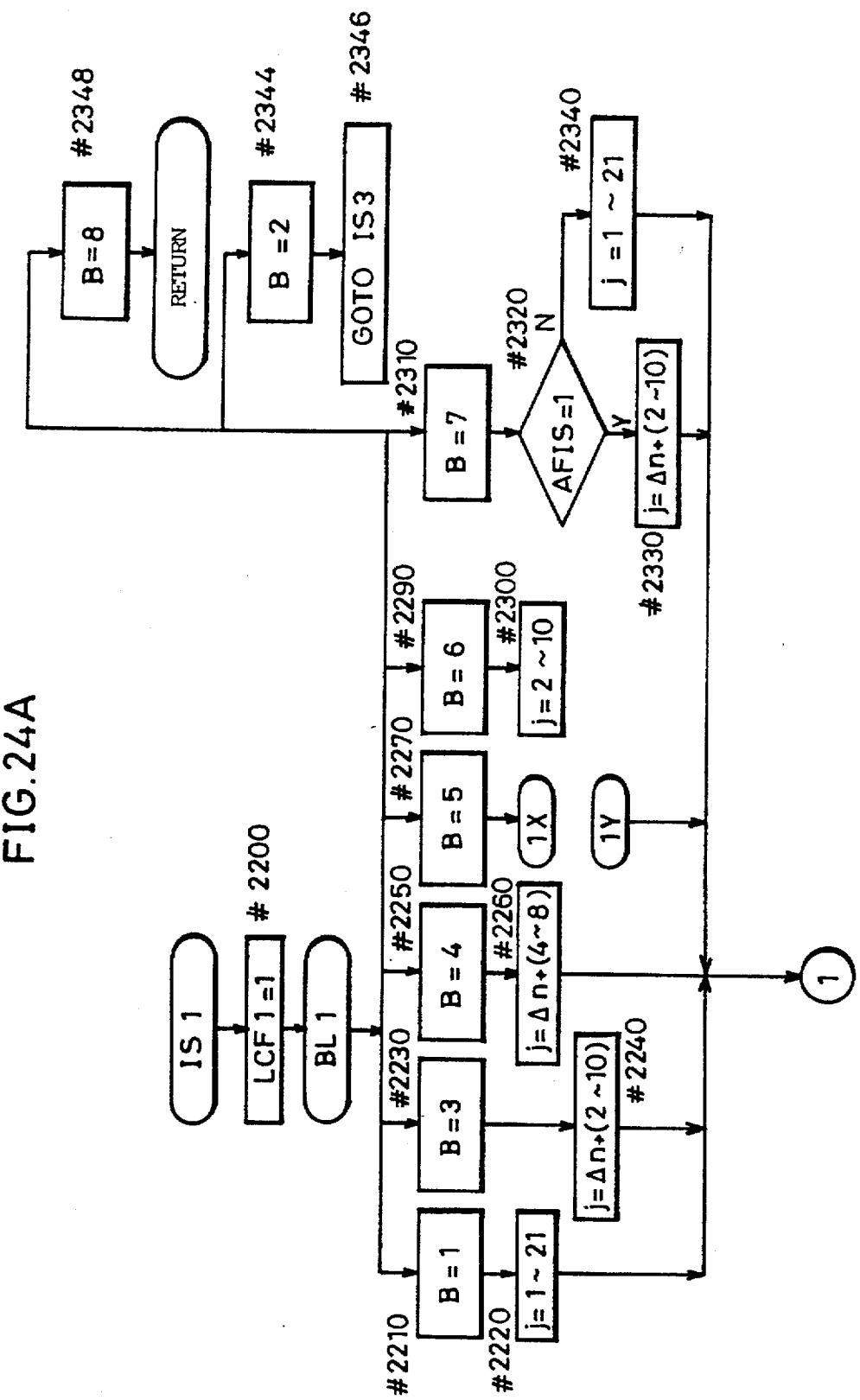
FIGS. 24A, 24B and 24C are flowcharts showing detailed procedures of correlation calculation in the first island in FIG. 23B.
Figure 24C:
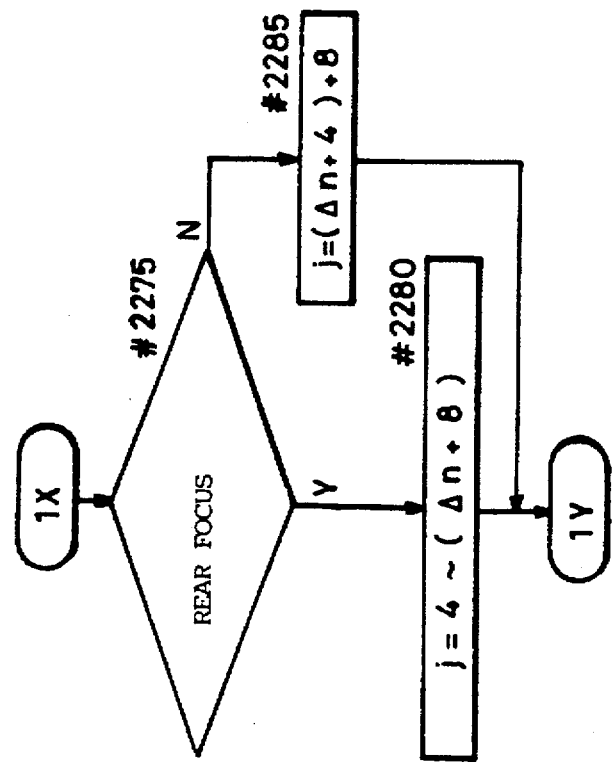
Figure 24B:
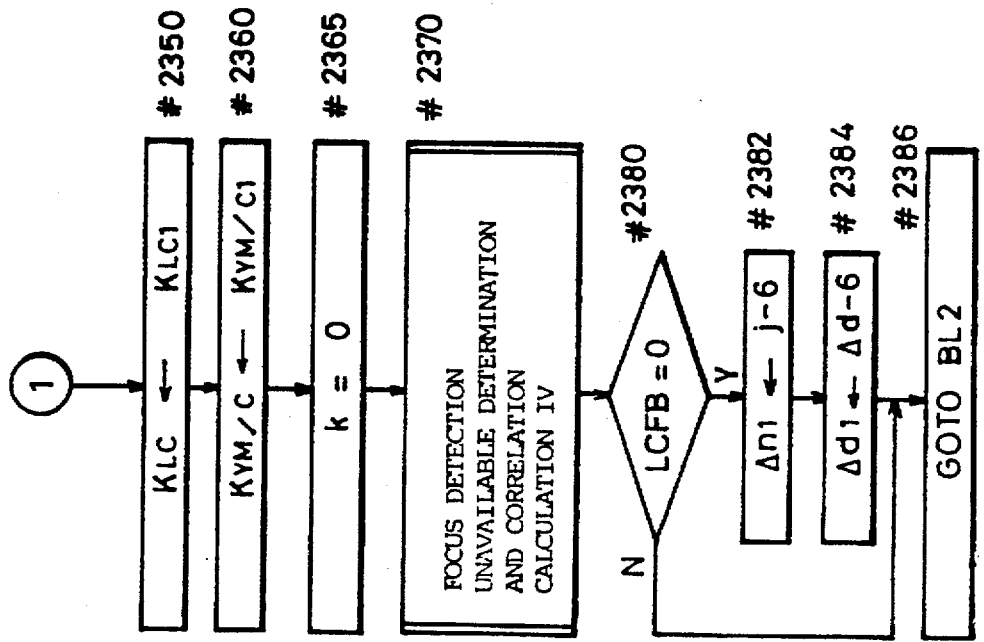

The correlation calculation in the first island IS1 will be described with reference to FIGS. 24A and 24B. First, in step 2200, the flag LCF1 indicating unavailable focus detection in the first island IS1 is set in advance. This flag LCF1 is reset afterwards when it is determined that focus detection is not unavailable in the first island IS1.

Correlation calculation in the first block BL1 of the first island IS1 is first performed. If the variable B is 1, the flow proceeds to step 2210; if B=2, it proceeds to step 2344; if B=3, it proceeds to step 2230; if B=4 it proceeds to step 2250; if B=5, it proceeds to step 2270; if B=6, it proceeds to step 2290; if B=7, it proceeds to step 2310; and if B=8, it proceeds to step 2348. If the variable B is 1, it is assumed that no limitation is imposed on the shift number in the fist block BL1, and the range of the shift number j is set to 1 to 21 (in step 2220). If the variable B is 2, focus detection is not effected in the first island IS1 and the flow proceeds to correlation calculation in the third island through IS3 step 2346. If the variable B is 3, the shift range is set to ±4 pitches from the present focus position and if the variable B is 6, the shift range is set to ±4 pitches from the in-focus position. Since the shift number at the in-focus position in the first block BL1 is j=6, ±4 pitches are given additionally to the present focus position (6+$\Delta$n) in the case of B=3 and to the in-focus value 6 in the case of B=6, whereby the range of the shift number j is set to $\Delta$n+(2 to 10) and 2 to 10 (in steps 2240 and 2300). If the variable B is 4, the shift range is set to ±2 pitches from the present focus position (6+$\Delta$n) and accordingly the range of the shift number j is set to $\Delta$n+(4 to 8) by giving ±2 pitches additionally to the present focus position (6+$\Delta$n) (in step 2260). If the variable B is 5, it is determined in step 2275 whether a rear focus condition exists or not. If it is determined that the rear focus condition exists, the shift range is defined as a range from a rear focus (+2) two pitches away from the present focus position to a front focus (−2) two pitches away from the in-focus position 6 and accordingly the range of the shift number j is set to 4 to ($\Delta$n+8) (in step 2280). If it is determined that the rear focus condition does not exist, the shift range is defined as a range from a front focus (−2) two pitches away from the present focus position to a rear focus (+2) two pitches away from the in-focus position 6 and accordingly the range of the shift number j is set to ($\Delta$n+4) to 8 (in step 2285). If the variable B is 7, it is determined in step 2320 whether the variable AFIS is 1 or not in order to determine whether the previously used island is the first island IS1 or not. If it is determined in step 2320 that the variable AFIS is 1, the shift range is set to ±4 pitches away from the present focus position and accordingly ±4 pitches are given additionally to the present focus position (6+$\Delta$n), whereby the range of the shift number j is set to $\Delta$n+(2 to 10) (in step 2330). If it is determined in step 2320 that the variable AFIS is not 1, it is assumed that no limitation is imposed on the shift number, and the range of the shift number j is set to 1 to 21 (in step 2340). If the variable B is 8, this means that the auxiliary light mode is selected and that focus detection is effected only in the second island IS2. Accordingly, focus detections in the first and third islands IS1 and IS3 are not effected and the flow returns.

After the range of the shift number j is set in any of the steps 2220, 2240, 2260, 2280, 2285, 2300, 2330 and 2340, the low contrast determination level $K_{LC}$ is set to the prescribed value $K_{LC1}$ in step 2350. In step 2360, the reliability determination level $K_{YM/C}$ is set to the prescribed value $K_{YM/C1}$. Since the number of data in the basic region in the first block is the same as that in the third to fifth blocks BL3 to BL5, the determination levels are the same as those in the third to fifth blocks BL3 to BL5. In step 2365, the shift start number k in the basic region for obtaining correlation is set to 0. i=1 is added to this start number k afterwards (in steps 3510 and 3530) and actually i+k=1 is adapted as the start number in the basic region. In step 2370, determination of unavailable focus detection and correlation calculation IV are performed.

Figure 25:
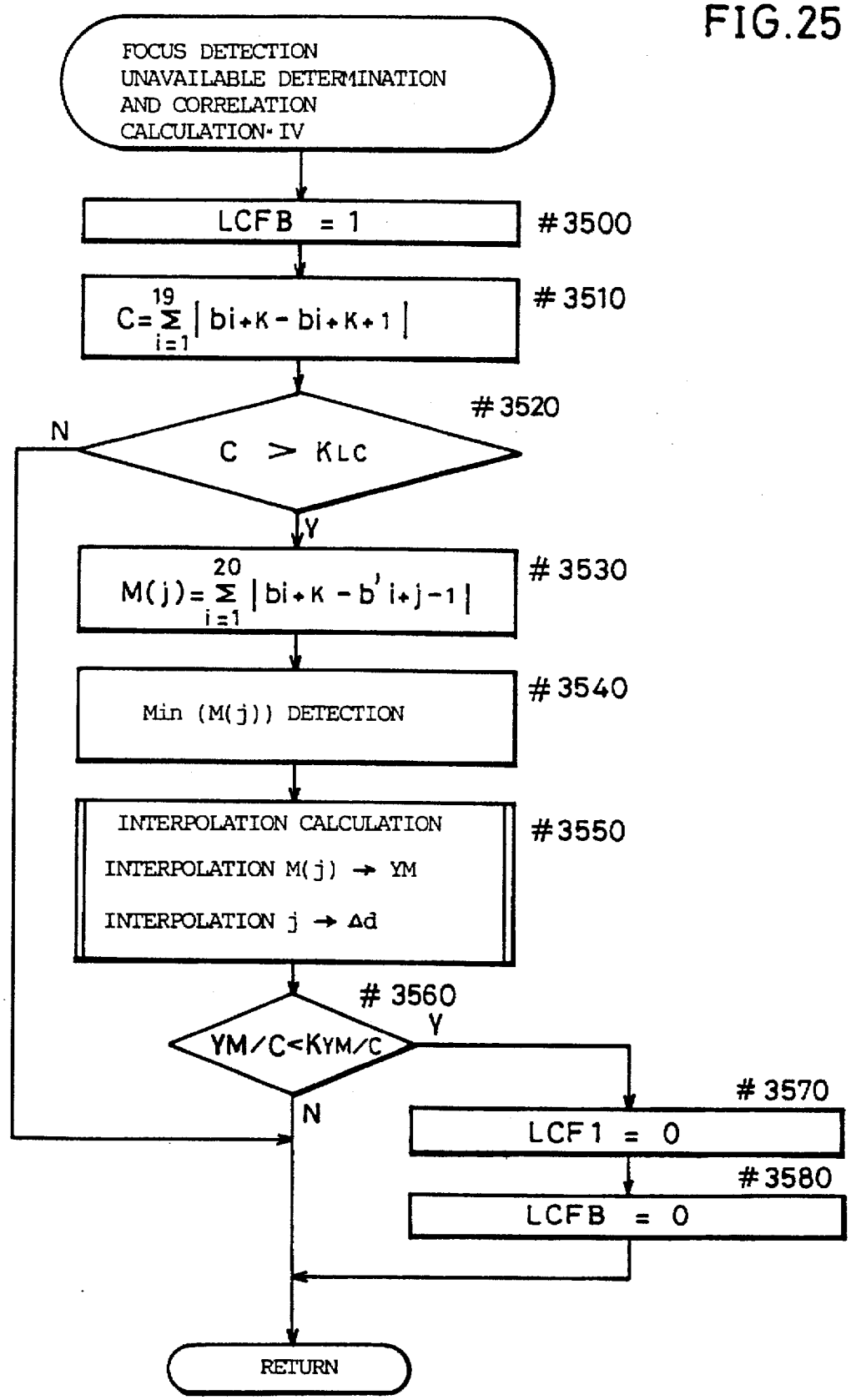
FIG. 25 is a flowchart showing detailed procedures of focus detection unavailable determination and correlation calculation IV in FIG. 24B.

The subroutine of this step 2370 will be described with reference to FIG. 25. First, in step 3500, the flag LCFB is set to indicate that focus detection is unavailable in the block in which calculation for focus detection is currently performed. In step 3510, the contrast value C is obtained from the block where correlation calculation in the basic region is currently performed, according to the below indicated equation.

$$C = \sum_{i=1}^{19} |b_{i+k} - b_{i+k+1}|$$

In step 3520, it is determined whether the contrast value C thus obtained is larger than the prescribed value $K_{LC}$ or not. If $C \leq K_{LC}$, the processing flow immediately returns. In this return, the flag LCFB is kept set. If $C > K_{LC}$, correlation calculation is performed in step 3530, according to the below indicated equation.

$$M(j) = \sum_{i=1}^{20} |b_{i+k} - b'_{i+j-1}|$$

In step 3540, the minimum value MIN(M(j)) of the correlation calculation value M(j) is obtained. Since this minimum value MIN(M(j)) and the shift number j at that time are obtained roughly by using the unit of one pitch, interpolation calculation is performed in 3550 in order to obtain a more precise value as the shift number j. The minimum value of the correlation calculation value obtained by the interpolation is represented as YM and the shift amount interpolated is represented as Δd. In step 3560, a value YM/C obtained by division of the minimum value YM of the correlation calculation value thus obtained by the interpolation by the contrast value C is compared with the prescribed value $K_{YM/C}$, so that reliability is determined. If $YM/C \geq K_{YM/C}$ is determined in step 3560, lack of reliability is determined and the flow returns. In this case also, the flag LCFB is kept set. If $YM/C < K_{YM/C}$ is determined in step 3560, the reliability is determined and since focus detection is available, the flag LCF1 indicating unavailable focus detection in the first island IS1 is reset in step 3570 and the flag LCFB indicating unavailable focus detection in the block where correlation calculation is performed is reset in step 3580, whereby the processing flow returns.

Referring again to FIG. 24B, it is determined in step 2380 whether the flag LCFB is reset or not in order to determine whether focus detection is unavailable in the block where correlation calculation has been performed. This flag LCFB is reset when focus detection is available in the block (the first block BL1) where correlation calculation has been performed (in step 3580). If it is determined in step 2380 that the flag LCFB is reset, a value obtained by subtraction of the in-focus position 6 from the shift number j obtained in step 3540 is substituted for the variable Δn1 indicating the deviation shift number in the block (the first block BL1) where the correlation calculation has been performed (in step 2382). In order to obtain a defocus amount Δd1 from the in-focus position in the block (the first block BL1) where the correlation calculation has been performed, the shift number j=6 at the in-focus position in the fist block BL1 is subtracted from the shift number Δd obtained by the interpolation calculation in step 3550 and the result is obtained as Δd1 (in step 2384). If it is determined in step 2380 that the flag LCFB is not reset, this means that focus detection was unavailable in the first block BL1, and accordingly the processing flow skips steps 2382 and 2384 and proceeds to step 2386. Then, correlation calculation in the second block BL2 is started through step 2386.

Figure 26A:
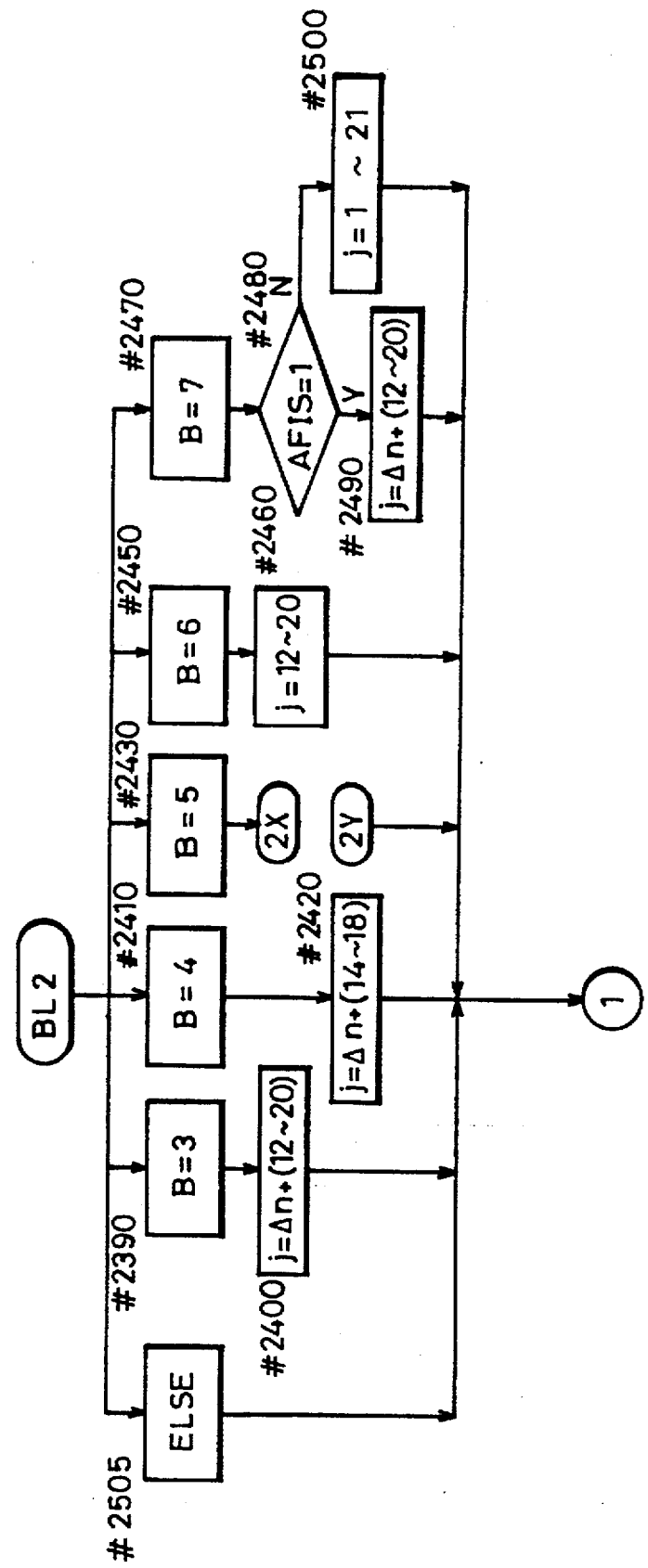
FIGS. 26A, 26B and 26C are flowcharts showing detailed procedures of correlation calculation of the second block in FIG. 24B.
Figure 26B:
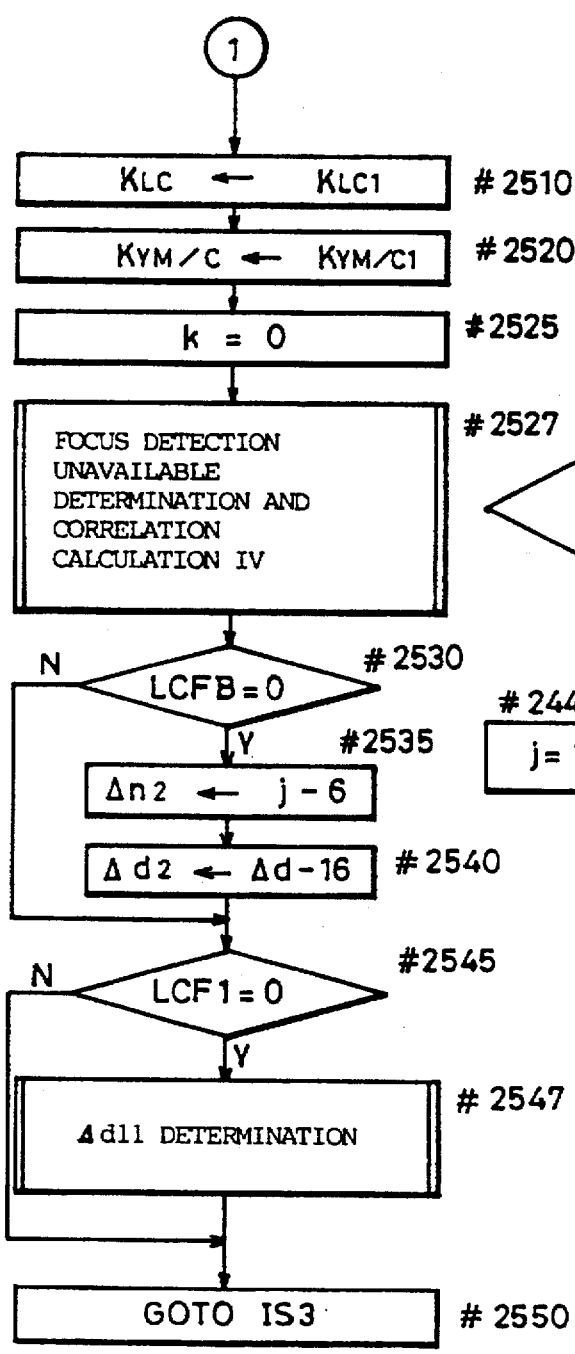
Figure 26C:
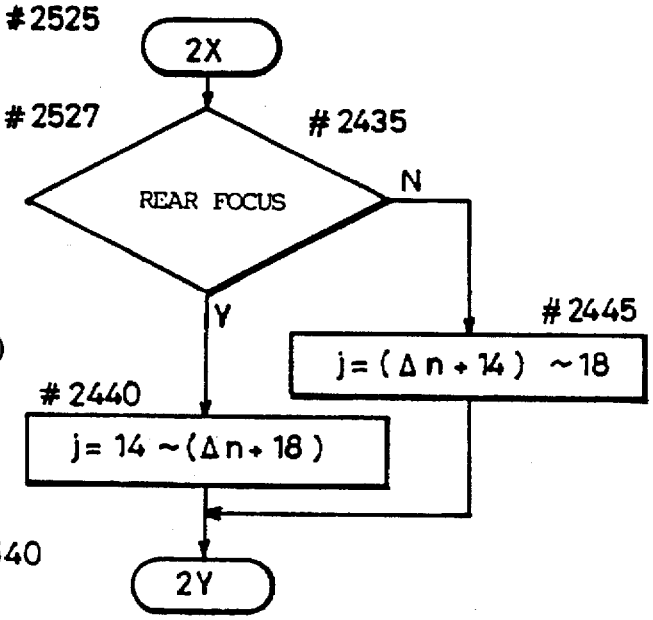

The correlation calculation processing in the second block BL2 will be described with reference to FIGS. 26A and 26B. If the variable B is 3, the processing flow proceeds to step 2390; if B=4, it proceeds to step 2410; if B=5, it proceeds to step 2430; if B=6, it proceeds to step 2450; if B=7, it proceeds to step 2470; and in other cases, it proceeds to step 2505. If the variable B is 3, the shift range is set to ±4 pitches from the present focus position. If the variable B is 6, the shift range is set to ±4 pitches from the in-focus position. Although the shift number at the in-focus condition in the first block BL1 is j=6 as described above, the shift number at the in-focus position in the second block BL2 is j=16 and accordingly ±4 pitches are given additionally to the present focus position (16+Δn) in the case of B=3 and to the in-focus position 16 in the case of B=6, whereby the range of the shift number j is set to Δn+(12 to 20) and 12 to 20 (in steps 2400 and 2460). If the variable B is 4, the shift range is set to ±2 pitches from the present focus position and the range of the shift number j is set to Δn+(14 to 18) by addition of ±2 pitches to the present focus position (16+Δn) (in step 2420). If the variable B is 5, it is determined in step 2435 whether a rear focus condition exists or not. If it is determined that the rear focus condition exists, the shift range is defined as a range from a rear focus (+2) two pitches away from the present focus position to a front focus (-2) two pitches away from the in-focus position 16 and accordingly the range of the shift number j is set to 14 to (Δn+18) (in step 2440). If it is determined that the rear focus condition does not exist, the shift range is defined as a range from a front focus (-2) two pitches away from the present focus position to a rear focus (+2) two pitches away from the in-focus position and accordingly the range of the shift number j is set to (Δn+14) to 18 (in step 2445). If the variable B is 7, it is determined in step 2480 whether the variable AFIS is 1 or not in order to determine whether the previously used island is the first island IS1 or not. If it is determined in step 2480 that the variable AFIS is 1, the shift range is set to ±4 pitches from the present focus position and accordingly ±4 pitches are given additionally to the present focus position (16+Δn), whereby the range of the shift number j is set to Δn+(12 to 20) (in step 2490). If it is determined in step 2480 that the variable AFIS is not 1, it is assumed that no limitation is imposed on the shift number, and the range of the shift number j is set to 1 to 21 (in step 2500). In other cases, the setting operation has been already done and there is no change to be added. Accordingly, new setting is not required.

The processing flow proceeds to step 2510 from any of the steps 2400, 2420, 2440, 2445, 2460, 2490, 2500 and 2505, so that the low contrast determination level $K_{LC}$ is set to the prescribed value $K_{LC1}$. In step 2520, the reliability determination level $K_{YM/C}$ is set to the prescribed value $K_{YM/C1}$. Thus, since the number of data in the second block BL2 is the same as that in the first block BL1, the determination levels are the same as those in the first block BL1. However, the start number k in the basic region for obtaining correlation in the second block BL2 is different from that in the first block BL1 and it is set to 10 in step 2525. In step 2527, determination of unavailable focus detection and correlation calculation IV are performed. Although this subroutine is the same as that called in the above described step 2370, the result of the calculation is different from that obtained in step 2370 since the range of the shift number j and the start number k in the second block BL2 are different from those in the first block BL1. After a return from the subroutine, it is determined in step 2530 whether the flag LCFB is reset or not. If it is determined in step 2530 that the flag LCFB is reset, focus detection is not unavailable in the second block BL2 and a value obtained by subtraction of the in-focus position 16 from the deviation shift number j before interpolation calculation indicating the maximum correlation is substituted for the variable $\Delta n2$ in step 2535. In step 2540, the shift number j=16 at the in-focus position is subtracted from the shift amount $\Delta d$ obtained after interpolation calculation, so that a defocus amount $\Delta d2$ in the second block BL2 is obtained as $\Delta d-16$. If it is determined in step 2530 that the flag LCFB is not reset, it is determined that focus detection is unavailable in the second block BL2, and the processing flow skips steps 2535 and 2540 and proceeds to step 2545.

In step 2545, it is determined whether the flag LCF1 is reset or not. If it is determined in step 2545 that the flag LCF1 is not reset, it is determined that focus detection is unavailable in the first island IS1, and the processing flow proceeds to correlation calculation processing in the third island IS3 through step 2550. If it is determined in step 2545 that the flag LCF1 is reset, focus detection is available in at least either the first block BL1 or the second block BL2. Accordingly, in step 2547, the subroutine for determining a defocus amount $\Delta d11$ from the in-focus position in the first island IS1 is called.

Figure 27:
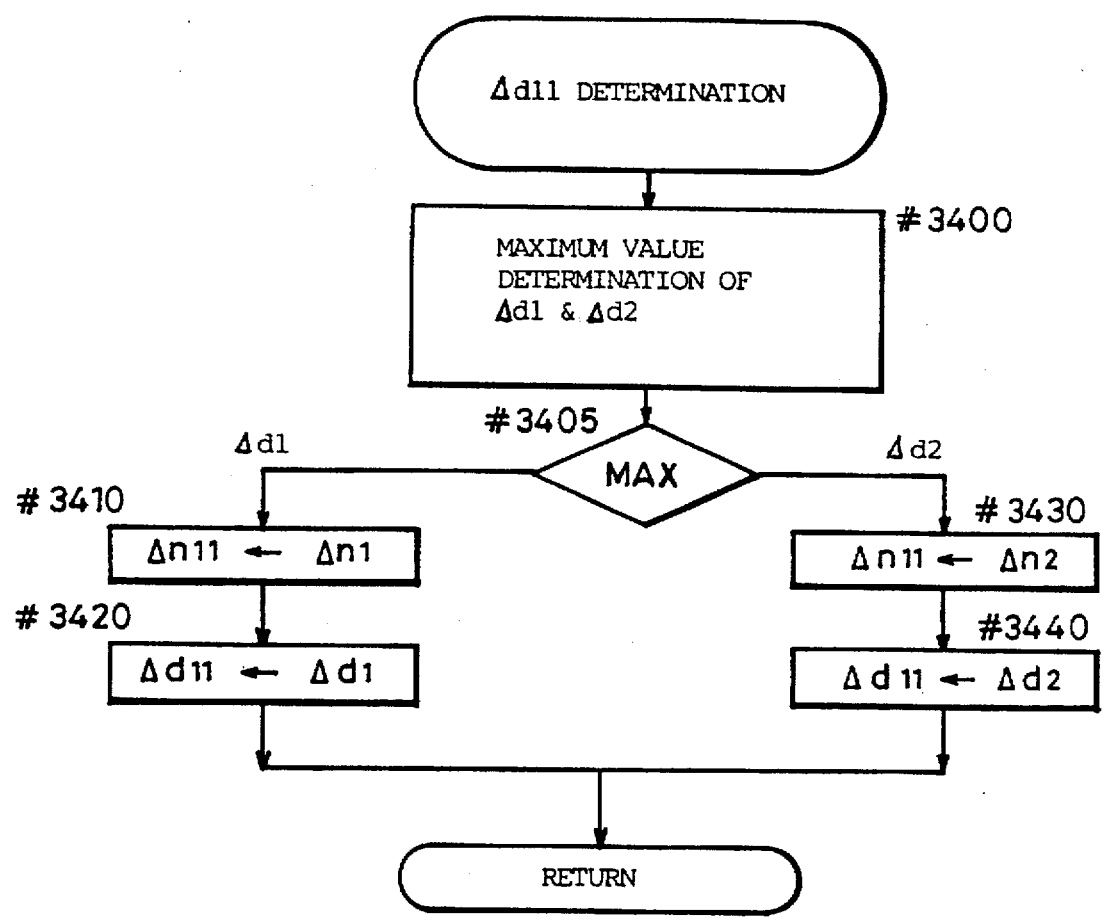
FIG. 27 is a flowchart showing detailed procedures of the subroutine for determining a defocus amount from the in-focus position of the first island in FIG. 26B.
Figure 28A:
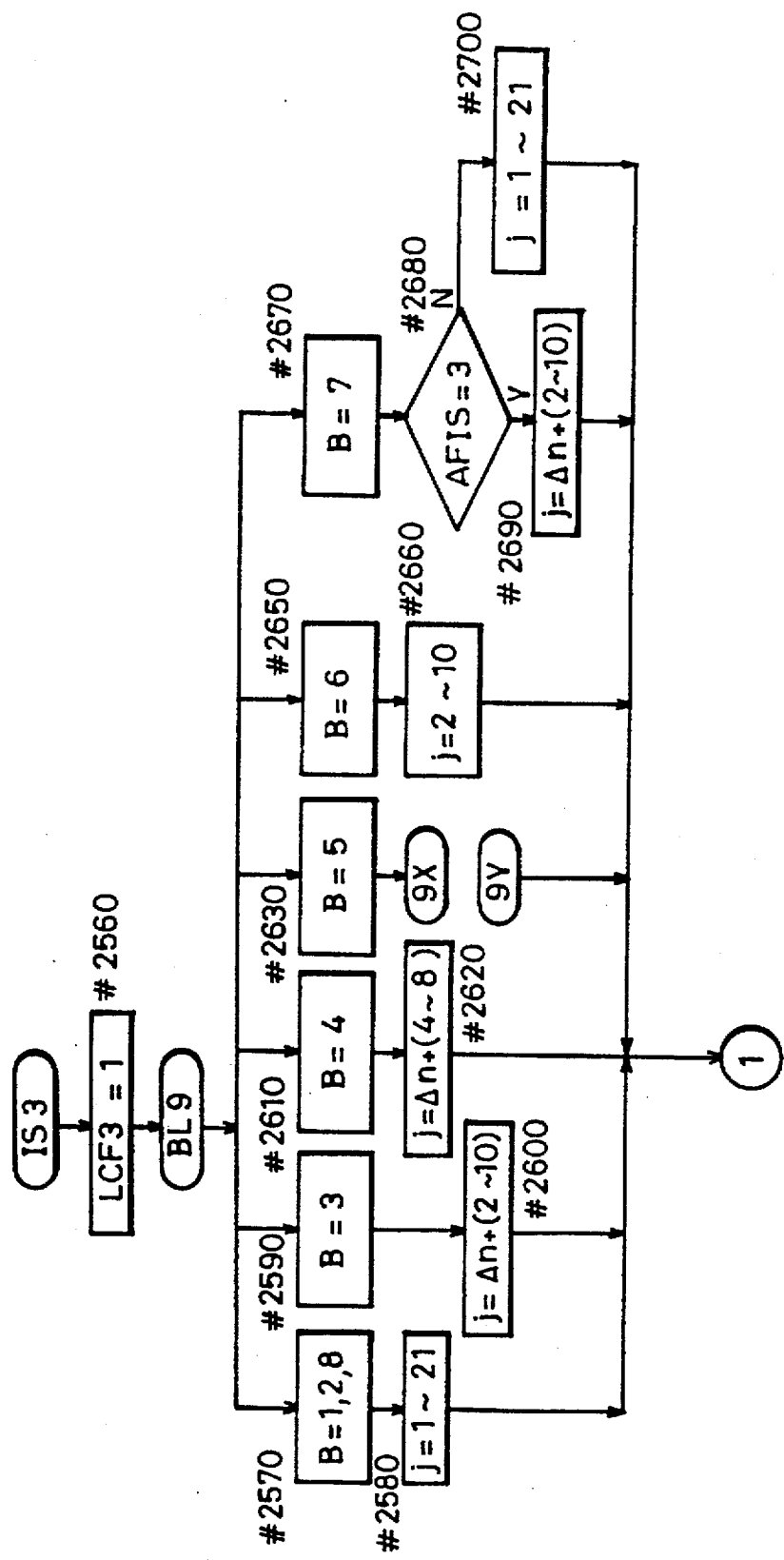
FIGS. 28A, 28B and 28C are flowcharts showing detailed procedures of correlation calculation of the third island in FIG. 26B.
Figure 28C:
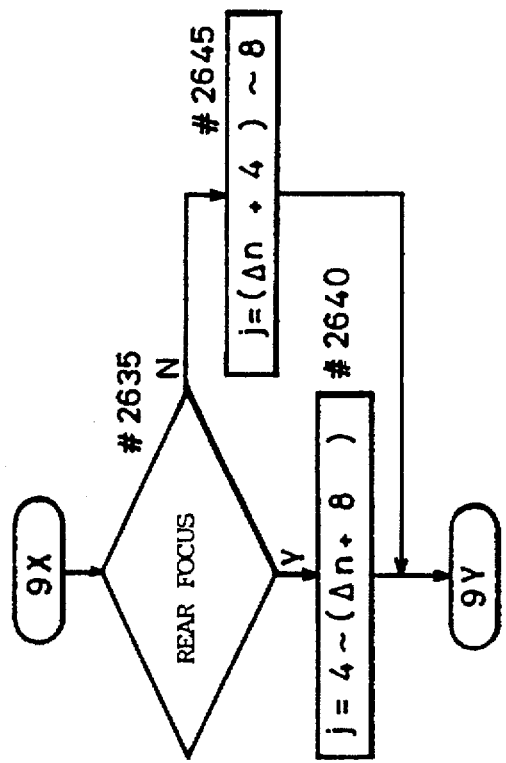
Figure 28B:
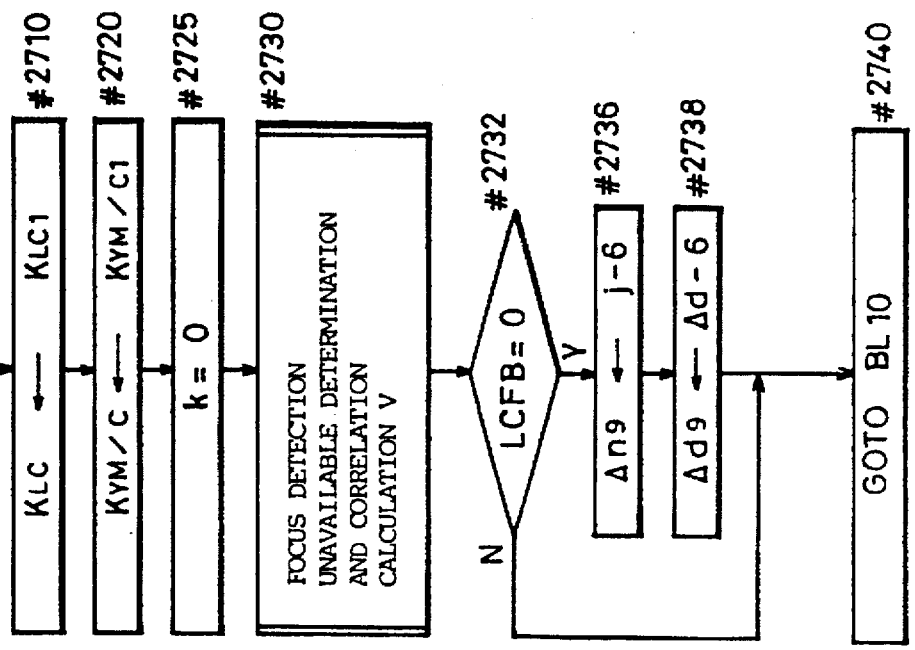
Figure 29:
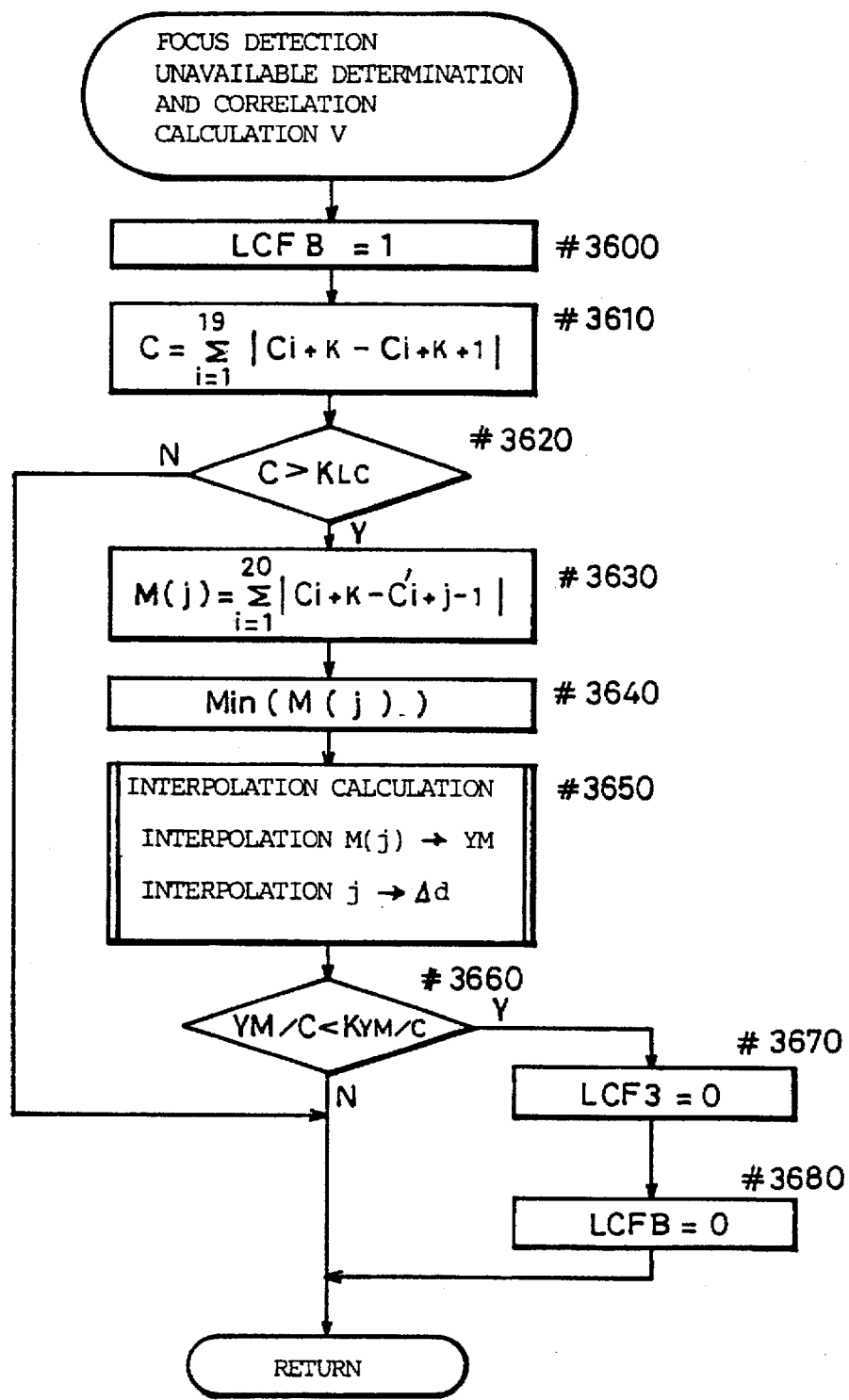
FIG. 29 is a flowchart showing detailed procedures of focus detection unavailable determination and correlation calculation V in FIG. 28B.
Figure 30A:
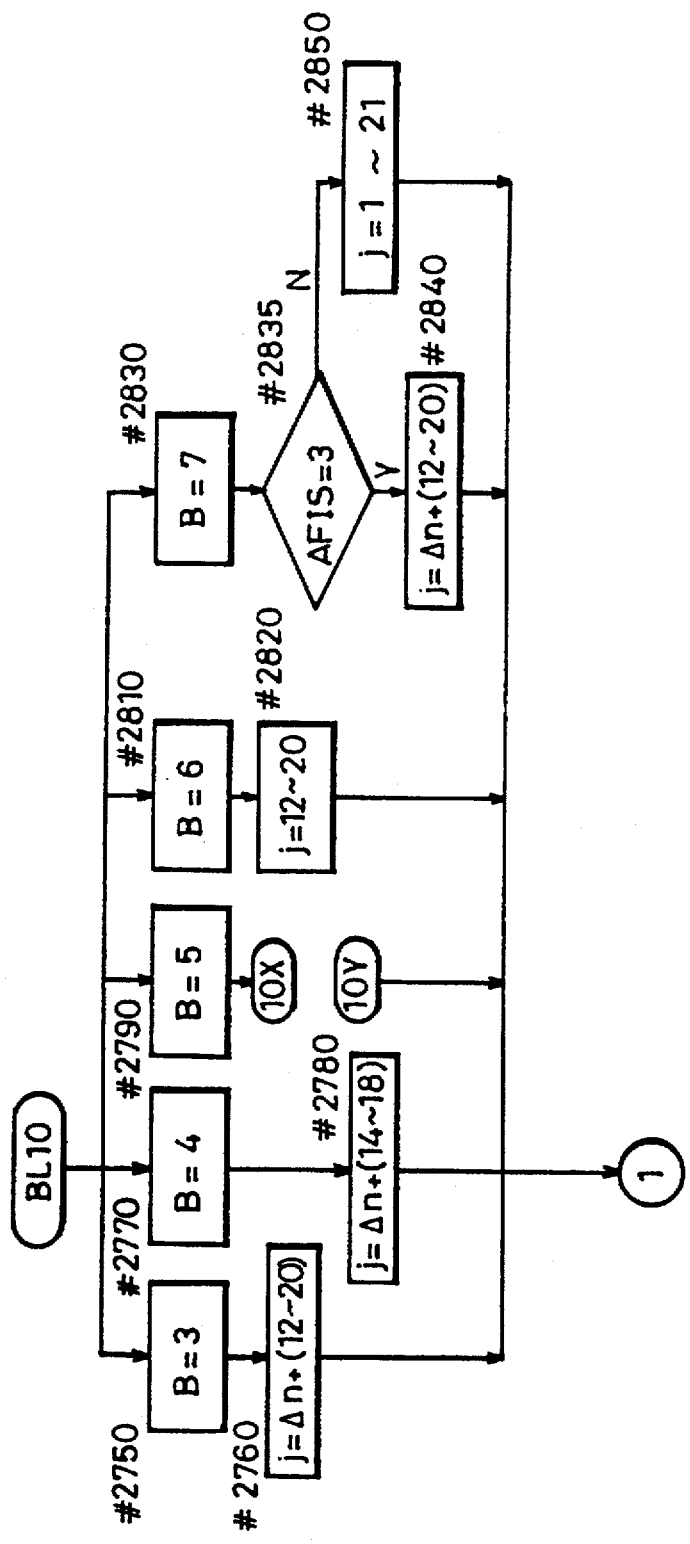
Figure 31:
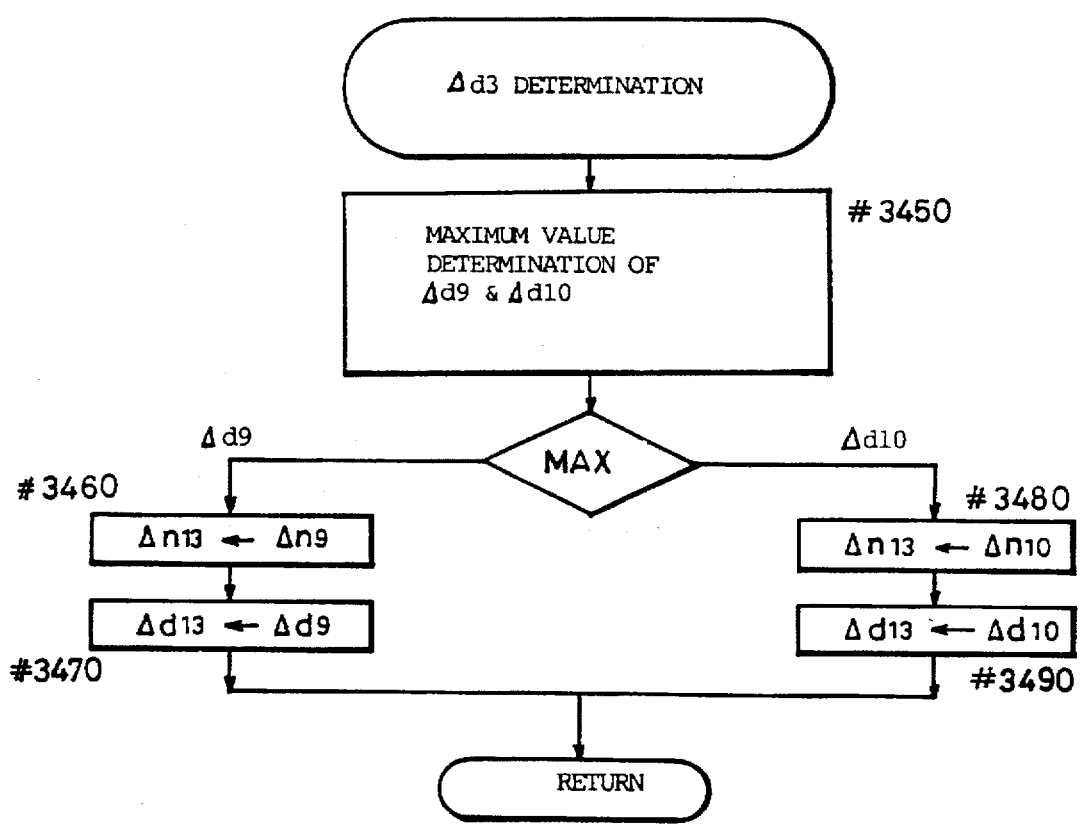
FIG. 31 is a flowchart showing detailed procedures of the subroutine for determining a defocus amount from the in-focus position in the third island.

This subroutine will be described with reference to FIG. 27. In step 3400, the maximum value out of the defocus amounts $\Delta d1$ and $\Delta d2$ in the first and second blocks BL1 and BL2 is detected. This means that an object at the rearmost focus position, namely, nearest the camera is detected.

If the maximum value is $\Delta d1$, the processing flow proceeds to step 3410 from step 3405, so that the shift number $\Delta n1$ in the first block BL1 is set as the shift number $\Delta n11$ in the first island IS1. Further, in step 3420, the defocus amount $\Delta d1$ from the in-focus position in the first block BL1 is set as the defocus amount $\Delta d11$ from the in-focus position in the first island IS1 and the flow returns.

If the maximum value is $\Delta d2$, the processing flow proceeds to step 3430 from step 3405, so that the shift number $\Delta n2$ in the second block BL2 is adapted as the shift number $\Delta n11$ in the first island IS1. Further, in step 3440, the defocus amount $\Delta d2$ from the in-focus position in the second block BL2 is adapted as the defocus amount $\Delta d11$ from the in-focus position in the first island IS1 and the flow returns.

After the return from the subroutine, correlation calculation processing in the third island IS3 is started through step 2550.

The correlation calculation processing in the third island IS3 is shown in FIGS. 28A and 28B to FIG. 31. The third island IS3 is symmetrical with respect to the first island IS1 and since the number of data in the third island IS3 is the same as that in the first island IS1, the processing is the same in principle. The different points are as follows. In the processing in the third island IS3, the ninth block BL9 is used in place of the first block BL1; the tenth block BL10 is used in place of the second block BL2; $\Delta n9$ is used in place of $\Delta n1$; $\Delta d9$ is used in place of $\Delta d1$; $\Delta n10$ is used in place of $\Delta n2$; $\Delta d10$ is used in place of $\Delta d2$; $\Delta n13$ is used in place of $\Delta n11$; $\Delta d13$ is used in place of $\Delta d11$; and the flag LCF3 is used in place of the flag LCF1. Determination as to AFIS=3 in place of AFIS=1 is effected. In addition, the processing in the third island IS3 is different from that in the first island IS1, since the equation for contrast value calculation in step 3610 and the equation for correlation calculation in step 3630 are as indicated below.

$$C = \sum_{i=1}^{19} |c_{i+k} - c_{i+k+1}|$$

$$M(j) = \sum_{i=1}^{20} |c_{i+k} - c'_{i+j-1}|$$

There is a further difference in that no limitation is imposed on the shift range in the third island IS3 even in the case of B=2 in steps 2570 and 2580. There is a further difference in that after the processing in the third island IS3 is completed, the processing flow returns without proceeding to correlation calculation in other islands.

Thus, the different points are only briefly stated and the description on the correlation calculation in the first island IS1 is cited for the description on the correlation calculation in the third island IS3. Thus, the processing for correlation calculation and determination of unavailable focus detection in each island has been described.

Figure 32:
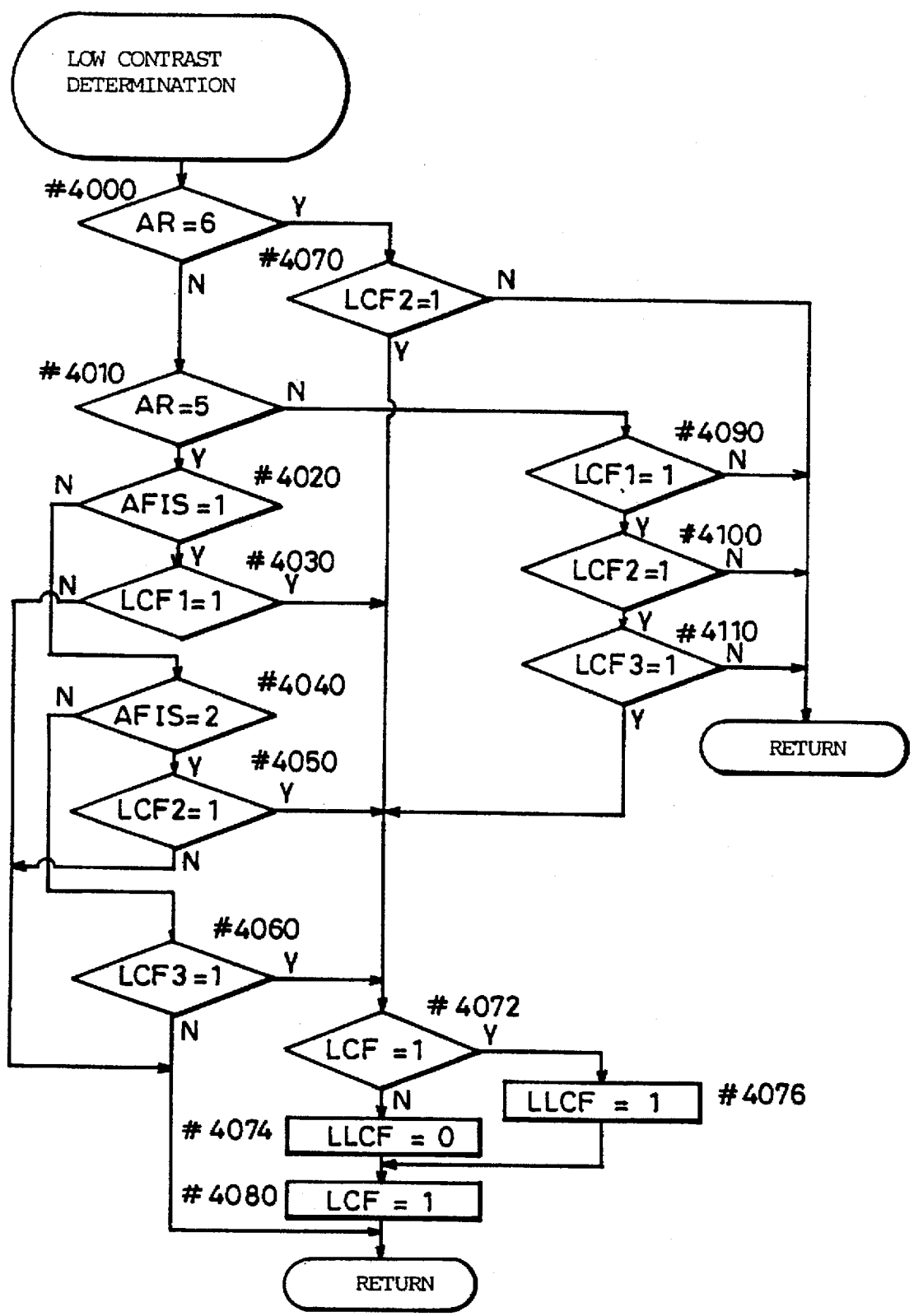
FIG. 32 is a flowchart showing detailed procedures of the subroutine of low contrast determination in FIG. 10.

After the correlation calculation in step 350 in FIG. 10, low contrast determination in step 360 is carried out. The procedures of this determination will be described with reference to FIG. 32. In step 4000, it is determined whether the algorithm is AR=6 (indicating the auxiliary light mode or the spot AF mode). If AR≠6 in step 4000, it is determined in step 4010 whether the algorithm is AR=5 (indicating the specified island algorithm). If AR=5 in step 4010, it is determined in step 4020 whether the variable AFIS is 1 or not in order to determine whether the specified island is the first island IS1 or not. If the variable AFIS is 1 in step 4020, it is determined that the specified island is the first island IS1, and in order to determine whether focus detection is unavailable in the first island IS1, it is determined in step 4030 whether the flag LCF1 is set or not. If the flag LCF1 is set in step 4030, it is determined that focus detection is unavailable in the first island IS1 and the processing flow proceeds to step 4072. If the flag LCF1 is not set in step 4030, it is determined that focus detection is available in the first island IS1 used according to the specified island algorithm and the flow returns. If the variable AFIS is not 1 in step 4020, it is determined in step 4040 whether the variable AFIS is 2 or not in order to determine whether the specified island is the second island IS2 or not.

If the variable AFIS is 2 in step 4040, it is determined that the specified island is the second island IS2 and in order to determine whether focus detection is unavailable in the second island IS2, it is determined in step 4050 whether flag LCF2 is set or not. If the flag LCF2 is set in step 4050, it is determined that focus detection is unavailable in the second island IS2 and the processing flow proceeds to step 4072. If the flag LCF2 is not set in step 4050, it is determined that focus detection is available in the second island IS2 used in the specified island algorithm and the processing flow returns.

If the variable AFIS is not 2 in step 4040, it is determined that the specified island is the third island IS3 and in order to determine whether focus detection is unavailable in the third island IS3, it is determined in step 4060 whether the flag LCF3 is set or not. If the flag LCF3 is set in step 4060, it is determined that focus detection is unavailable in the third island IS3 and the processing flow proceeds to step 4072. If the flag LCF3 is not set in step 4060, it is determined that focus detection is not unavailable in the third island IS3 used in the specified island algorithm and the processing flow returns.

If AR=6 in step 4000, it is determined that the auxiliary light mode or the spot AF mode is selected and in order to determine whether focus detection is unavailable in the second island IS2 used in the auxiliary light mode or the spot AF mode, it is determined in step 4070 whether the flag LCF2 is set or not. If the flag LCF2 is not set in step 4070, it is determined that focus detection is available in the second island IS2 used in the auxiliary light mode or the spot AF mode and the processing flow returns. If the flag LCF2 is set in step 4070, it is determined in step 4072 whether the flag LCF is set or not in order to determine whether the result of the previous focus detection indicates unavailable focus detection or not. If the flag LCF is not set in step 4072, it is determined that the result of the previous focus detection does not indicate unavailable focus detection, and the flag LLCF is reset in step 4074, whereby the flow proceeds to step 4080. If the flag LCF is set in step 4072, it is determined that the previous focus detection was unavailable, and the flag LLCF is set in step 4076 and, then, the flow proceeds to step 4080. In step 4080, the flag LCF is set to indicate that the result of the present focus detection indicates unavailable focus detection in all the islands IS1 to IS3 and the processing flow returns.

If the algorithm AR is not 5 (the specified island algorithm) in step 4010, it is determined in steps 4090, 4100, 4110 whether the flags LCF1, LCF2 and LCF3 are set, respectively, in order to determine whether focus detection is unavailable in each island. If the flag LCF1 is not set in step 4090, it is determined that focus detection is not unavailable in the first island IS1 and the flow returns. If the flag LCF2 is not set in step 4100, it is determined that focus detection is not unavailable in the second island IS2 and the flow returns. If the flag LCF3 is not set in step 4110, it is determined that focus detection is not unavailable in the third island IS3 and the flow returns. If all the flags LCF1 to LCF3 are set in steps 4090 to 4110, it is determined that focus detection is unavailable in all of the first to third islands IS1 to IS3 and the flow proceeds to step 4072.

Referring to FIG. 10, after the return from the subroutine of the low contrast determination (in step 360), it is determined in step 370 whether the flag LCF is set or not in order to determine whether focus detection is unavailable. If the flag LCF is not set in step 370, it is determined that focus detection is available and an algorithm is determined in step 380 so that the defocus amount is determined according to this algorithm. After that, the flow proceeds to step 390 so as to automatically select the one-shot AF mode and the continuous AF mode and then the flow returns. Normally, after the in-focus condition is obtained, the one-shot AF mode in which AF operation is not effected is preferentially selected and only in the case in which the object is a moving object, upon detection of the movement of the object, the predicting AF mode (including the continuous AF mode) which follows up the movement of the moving object is selected. If unavailable focus detection (LCF=1) is determined in step 370, the flow also proceeds to step 390. However, if the prediction mode is not selected, control in the case of unavailable focus detection is effected and this control is included in the processing of step 390.

The subroutine for algorithm determination and defocus amount determination will be described with reference to FIGS. 33 et seq. In step 4200, a magnification $\beta_N$ of the object nearest to the camera is calculated. Firstly, a general method of calculating a magnification $\beta$ will be described.

General Calculation of the Magnification $\beta$

Assuming that a moving amount of the lens from the infinite focusing position to the present lens position is $DF_0$, that a photographing distance at the present lens position is d, and that the focal length of the lens is f, an approximate relation as described below is obtained.

$$d = f^2/DF_0$$

The value (N) of the pulse counter which monitors moving of the lens from the innermost position (i.e., the infinite focusing position) to the present lens position is generally proportional to the moving amount ($DF_0$) and the below described equation is obtained.

$$N = K_{LR} \times DF_0 \qquad (K_{LR} \text{ being a constant})$$

Consequently, the photographing distance at the present lens position of the lens is represented as follows.

$$d = f^2 K_{LR}/N$$

Logarithms are obtained from both sides of the above equation as follows:

$$\log_2 d = \log_2 f^2 K_{LR} - \log_2 N$$

$$\log_2 d^2 = D_{V\infty} - 2\log_2 N$$

(where $D_{V\infty} = 2\log_2 f^2 K_{LR}$)

Assuming that the photographing distance is represented by the APEX system as $D_V = \log_2 d^2$, the following equation is obtained.

$$D_V = D_{V\infty} - 2\log_2 N \qquad (*)$$

Calculation operations in the camera are performed according to the APEX system and if $D_{V\infty}$ in the equation (*) is obtained as information of the lens in the APEX system and the number of pulses N corresponding to the movement of the lens is calculated by conversion into the APEX system, the photographing distance $D_V$ is obtained in the APEX system.

The method of converting the moving amount N into the APEX system will be described below. First, $\log_2 N = D_{VN}/2$ is obtained. As is understood from this equation, in the case of N=1, that is, in the case of movement for one pulse, $D_{VN}/2 = 0$ and the distance $D_V$ at this time is $D_{V\infty}$ from the equation (*).

If the number of pulses N corresponding to forward movement of the lens is 2 or more, the digit number N of the bit $b_N$ where 1 is set, counted from the maximum bit of the above mentioned counter is regarded as an integer value N and the less significant four digits are regarded as a decimal part equivalent to ½, ¼, ⅛ and ¹⁄₁₆, respectively, with further less significant digits being disregarded. For example, if . . . $b_9 b_8 b_7 b_6 b_5$ . . . = . . . 10111 . . . (the bits of the higher order than $b_{10}$ being 0), (9+7/16) is obtained. If . . . $b_{12} b_{11} b_{10} b_9 b_8$ . . . = . . . 11010 . . . (the bits of the higher order than $b_{13}$ being 0), (12+10/16) is obtained. The value thus obtained is represented as $\log_2 N$. This value is doubled and $2\log_2 N$ is obtained. In the above mentioned examples, if (9+7/16) is doubled, (18+7/8) is obtained and if (12+10/16) is doubled, (24+10/8)=(25+2/8) is obtained. Then, according to $D_V = D_{V\infty} - 2\log_2 N$ of the equation (*), the value of $D_V$ is obtained. In this case, there is a small error ($0.1 D_V$) in the value of $D_V$ but this error can be disregarded. The value of $D_{V\infty}$ can be obtained by addition of 2 to the value of $D_V$ corresponding to a lens position when the pulse number N for movement of the lens is 2, that is, 1 is set at the bit $b_1$.

The value $D_V$ of the photographing distance thus obtained represents information as to a photographing distance (d) with respect to the present lens position. A distance (x) to the object having a defocus amount (DF) with respect to the present lens position can be obtained by using the equation $N = N + \Delta N$ where N is the number of the counter indicating the present lens position and ΔN indicates a lens drive amount obtained by $\Delta_N = K_{LR} \times DF$. A photographing distance at the object position of the lens (an object distance) is represented as follow:

$$x = f^2 K_{LR}/(N+\Delta N)$$

Logarithms for both sides of the above equation are obtained as follows:

$$\log_2 x = \log_2 f^2 K_{LR} - \log_2 (N+\Delta N)$$

$$D_V = D_{V\infty} - 2 \log_2 (N+\Delta N)$$

where $D_V = \log_2 X^2$ and $D_{V\infty} = 2\log_2 f^2 K_{LR}$.

The magnification at the object position is β=f/x and the following equations are obtained.

$$\log_2 \beta = \log_2 f - \log_2 x$$

$$2 \log_2 \beta = 2 \log_2 f - D_V$$

Accordingly, $2\log_2 f$ of the APEX system is stored as the focal length data.

Calculation of the Magnification $\beta_N$ of the Nearest Object

Figure 34:
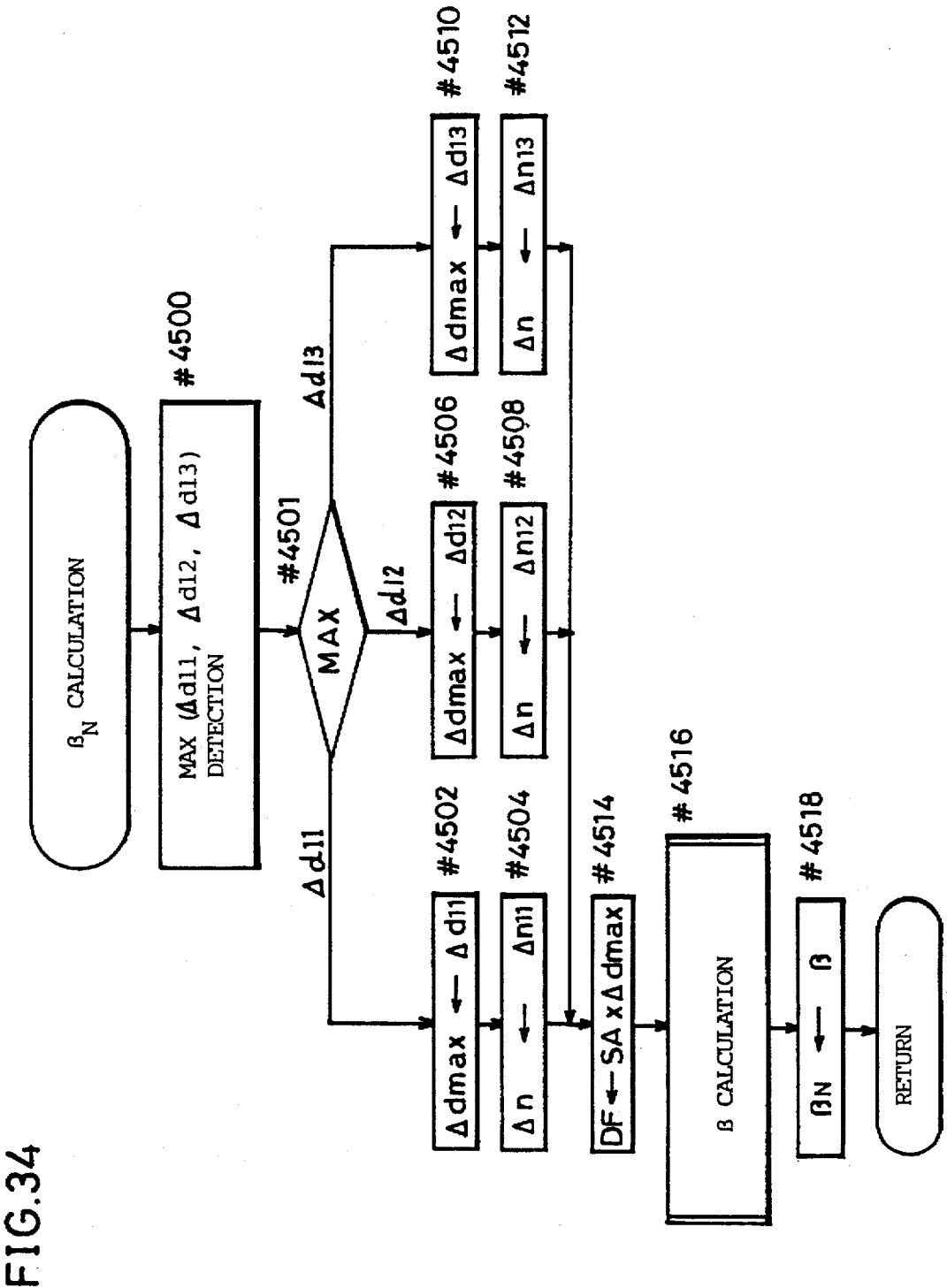
FIG. 34 is a flowchart showing a method of calculating a magnification for an object nearest to a camera in FIG. 33.

The method of calculation of the magnification $\beta_N$ of the object nearest to the camera will be described with reference FIGS. 34. In step 4500, the maximum value is obtained among the defocus amounts Δd11 to Δd13 from the in-focus positions of the respective islands. If the maximum value is Δd11, the flow proceeds to step 4502 from step 4501, so that Δd11 is substituted for the maximum defocus amount Δdmax. In step 4504, the shift number Δn11 of the first island IS1 is substituted for the shift number Δn and the flow proceeds to step 4514. If the maximum value is Δd12, the flow proceeds to step 4506 from step 4501, so that Δd12 is substituted for the maximum defocus amount Δdmax. In step 4508, the shift number Δn12 of the second island IS2 is substituted for the shift number Δn and the flow proceeds to step 4514. If the maximum value is Δd13, the flow proceeds to step 4510 from step 4501, so that Δd13 is substituted for the maximum defocus amount Δdmax. In step 4512, the shift number Δn13 of the third island IS3 is substituted for the shift number Δn and the flow proceeds to step 4514.

In step 4514, the maximum defocus amount Δdmax is multiplied by a defocus amount SA for one pitch, so that a defocus amount DF is obtained. By using the defocus amount DF, the magnification β is obtained in the subroutine of step 4516 and the magnification β thus obtained is substituted for the magnification $\beta_N$ of the nearest object in step 4518. Then, the flow returns.

Figure 35:
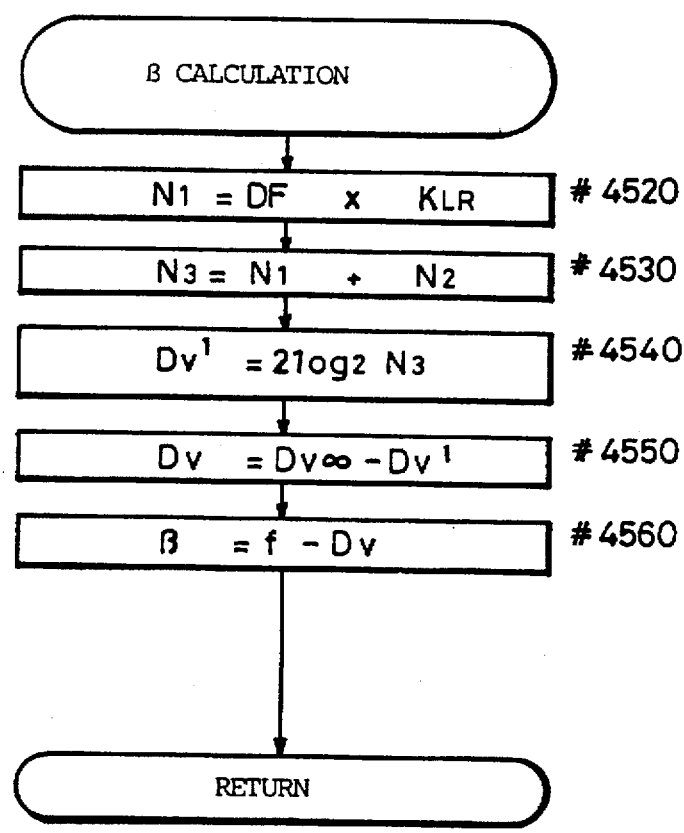
FIG. 35 is a flowchart showing detailed procedures of the subroutine for calculation of the magnification $\beta$ in FIG. 34.

The subroutine for calculation of the magnification β will be described with reference to FIG. 35. According to this subroutine, the magnification β is calculated by using the defocus amount DF as an argument and then the flow returns. In step 4520, the defocus amount DF is multiplied by the lens drive amount conversion coefficient $K_{LR}$, so that a lens drive amount N1 (the number of revolutions of the AF motor) is obtained. In step 4530, the above mentioned lens drive amount N1 is added to the present lens moving amount N2, so that a desired lens moving amount N3 at the in-focus position is obtained. In step 4540, the above mentioned lens moving amount N3 is converted into the APEX system, so that $D_V' = 2\log_2 N3$ is obtained. In step 4550, the photographing distance $D_V = D_{V\infty} - D_V'$ is obtained as a difference from the information $D_{V\infty}$ of the lens. In step 4560, the photographing distance $D_V$ of the APEX system is subtracted from the focal length f of the APEX system and the magnification β of the APEX system is obtained. Then, the flow returns.

Thus, although the magnification β can be obtained from the lens forward moving amount, the magnification β may be calculated by other methods, for example, as a ratio between the photographing distance x obtained from the distance detecting apparatus and the focal length f, namely, β=f/x (in a non-APEX system).

Figure 33:
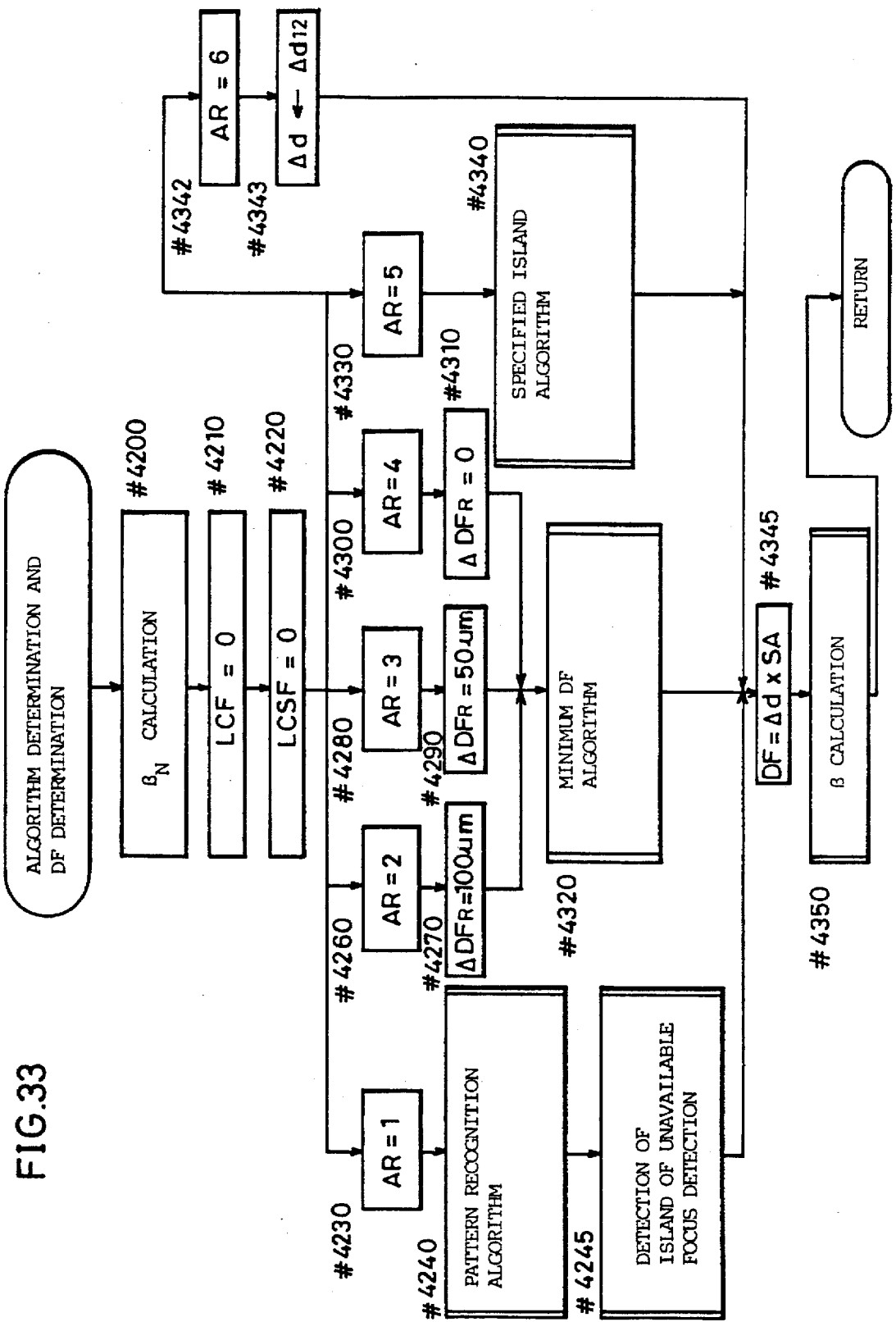
FIG. 33 is a flowchart showing detailed procedures of the subroutine for determining an algorithm and DF in FIG. 10.

Referring again to the flow chart of FIG. 33, in step 4210, the flag LCF indicating unavailable focus detection is reset. In step 4220, the flag LCSF indicating the low contrast search is reset.

If the variable for selection of an algorithm is AR=1, the flow proceeds to step 4230; if AR=2, it proceeds to step 4260; if AR=3, it proceeds to step 4280; if AR=4, it proceeds to step 4300; and if AR=5, it proceeds to step 4330. If AR=6, the defocus amount Δd12 of the second island IS2 is substituted for the defocus amount d and the flow proceeds to step 4345.

First, if the variable AR is 1, the pattern recognition algorithm is executed in step 4240. This will be described with reference to FIG. 36. In step 4600, a flag PA1PF is set to indicate that the pattern recognition algorithm was applied. In step 4610, it is determined based on the state of the switch $S_{AF/M}$ whether the manual focus mode (FA: Focus Aid) is selected or not. If the manual focus mode is selected in step 1610, it is determined by the state of the flag LCF2 whether focus detection is unavailable in the second island IS2 selected preferentially in this mode. If the flag LCF2 is not set in step 4620, focus detection is available in the second island IS2 and, in step 4630, the defocus amount Δd12 of the second island IS2 is substituted for the defocus amount Δd for determination of the in-focus condition. Then, the flow returns. Those procedures take into consideration the fact that the object is usually positioned at the center of the image area (namely, the second island IS2) in manual focus adjustment. This is because in many cases the photographer adjusts the focus by observing an image through a split prism conventionally provided at the center of the finder. If the flag LCF2 is set in step 4620, it is determined that focus detection is unavailable in the second island IS2, and the defocus amount Δd11 in the first island IS1 is compared with the defocus amount Δd13 in the third island IS3 in step 4640. If Δd11<Δd13 in step 4640, it is determined that the object in the third island IS3 is nearer to the camera and the defocus amount Δd13 is substituted for the defocus amount Δd for in-focus determination, whereby the flow returns. If Δd11≧Δd13 in step 4640, it is determined that the object in the first island IS1 is nearer to the camera and the defocus amount Δd11 of the first island iS is substituted for the defocus amount Δd for in-focus determination and, then, the flow returns.

If the manual focus mode is not selected in step 4610, it is determined that the auto focus mode is selected and the flow proceeds to step 4670, so that it is determined whether the focal length f of the exchangeable lens is less than 35 mm. If the focal length f is less than 35 mm in step 4670, it is determined that a wide angle lens is mounted. The defocus amount Δdmax of the object nearest to the camera is adopted as the defocus amount Δd for lens drive and then the flow returns. Those procedures are executed because a wide angle lens is often used in cases of taking landscape pictures or souvenir pictures on the background of a landscape and the object nearest to the camera is mostly the main object in such cases.

If the focal length f is 35 mm or more in step 4670, it is determined in step 4690 based on the state of the flag LCF2 whether focus detection is unavailable in the second island IS2. If the flag LCF2 is set in step 4690, it is determined that focus detection is unavailable in the second island IS2. In this case, pattern recognition cannot be effected and the flow proceeds to step 4680 for temporary focusing on the object nearest to the camera.

Figure 37:
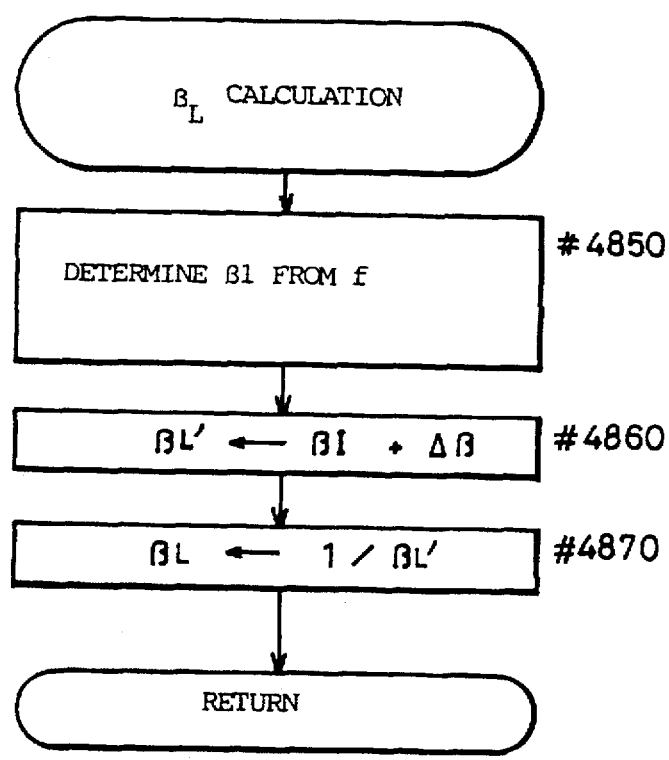
FIG. 37 is a flowchart showing detailed procedures of the calculation of the determination level $\beta_L$ in FIG. 36.

If the flag LCF2 is not set in step 4690, it is determined that focus detection is available in the second island IS2 and a smaller determination level $\beta_L$ for the magnification is calculated. This calculation will be described with reference to FIG. 37. In step 4850, a denominator value $\beta 1$ of the magnification ($1/\beta 1$) according to the focal length f read from the exchangeable lens is read from a ROM table in the microcomputer. In step 4860, $\Delta\beta$ is added to $\beta 1$ so that $\beta_L'$ is obtained. The value $\Delta\beta$ will be described afterwards. In step 4870, a reciprocal of $\beta_L'$ is obtained and the determination level $\beta_L$ is calculated. Then, the flow returns.

The reason that the smaller determination level $\beta_L$ for the magnification is changed according to the focal length f of the exchangeable lens will be described. The determination level $\beta_L$ becomes large according to decrease of the focal length f. If the determination level $\beta_L$ is smaller than the magnification, the island for the nearest object is used. The depth of field becomes large according to decrease of the focal length f and if focus adjustment is effected in the island where the nearest object with a determined magnification (for example, f=35 mm, $\beta=1/50$) exists, and the probability of focusing on the background becomes high. Conversely, according to increase of the focal length f, the depth of field becomes small and if focus adjustment is effected on the nearest object with the same magnification as mentioned above, the focusing range becomes small and there would be a problem in focusing on the nearest object. This is confirmed by real photographing. Accordingly, taking account of the depth of field, the determination level $\beta_L$ is decreased according to increase of the focal length and the probability of using the algorithm for selecting the island indicating the nearest object is decreased compared with the cases of small focal lengths.

TABLE 1

| f [mm] | $\beta 1$ | $\beta_L'$ |
|---|---|---|
| 35 | 50 | 65 ⟵⟶ 90 |
| 50 | 55 | 70 ⟵⟶ 95 |
| 100 | 70 | 85 ⟵⟶ 110 |
| 200 | 90 | 105 ⟵⟶ 130 |
| 300 | 100 | 115 ⟵⟶ 140 |

An example of the ROM table used in step 4850 is shown in Table 1.

Referring again to FIG. 36, control for determining an island selected according to the magnification is performed in steps starting from the subsequent step 4710. According to the present embodiment, the magnification to be used is determined by using the result of focus detection in the island where the object nearest to the camera is detected out of the three islands. If the magnification $\beta_N$ is large, focus adjustment is effected by using the result of focus detection in the second island IS2. This is because if the magnification $\beta_N$ is a large value, the object is considered to have a large size and it is considered that the second island IS2 is always included irrespective of the island where the magnification $\beta_N$ is obtained. If the magnification $\beta_N$ is a medium value, the same applies to this case in principle. However, if the second island IS2 is the most distant from the camera, there may be a case where main object does not exist in the second island IS2. In this case, an island having an intermediate defocus amount in the distance distribution is used. If focus detection is unavailable in one of the islands other than the second island IS2, the island where the object nearest to the camera exists is used. If the magnification $\beta_N$ is a small value, this case is regarded as the case of taking a landscape picture or a portrait picture on the background of a landscape and the island nearest to the camera is used.

Those procedures will be described with reference to the flow chart. In step 4710, it is determined that the magnification $\beta_N$ is larger than the larger determination level $\beta_H$ or not. If $\beta_N>\beta_H$ in step 4710, the larger determination level $\beta_H$ is set to $1/50$ in step 4800 so that a hysteresis is applied. Thus, the frequency of selections of algorithms according to the magnification is decreased and a change in the defocus amount for each focus detection is made small so that stable focus detection operation can be performed. If data $\beta_N>\beta_H'$ the object is relatively large and it is determined that only the second island IS2 may be used. Accordingly, in step 4810, the defocus amount $\Delta d12$ in the second island IS2 is substituted for the defocus amount $\Delta d$ for lens drive and, in step 4815, the shift number $\Delta n12$ in the second island IS2 is substituted for the shift number n. Then, the flow returns.

If $\beta_N\leq\beta_H$ in step 4710, the determination level $\beta_H$ is set to $1/40$ in step 4720 and it is determined in step 4730 whether a condition $\beta_H\geq\beta_N\geq\beta_L$ is satisfied or not. If $\beta_N<\beta_L$ in step 4730, $\Delta\beta$ is set to 40 in step 4740 so that a hysteresis is applied to $\beta_L$ in the same manner as described above. The hysteresis is applied by changing the value $\beta$. In step 4750, the maximum defocus amount dmax is substituted for the defocus amount $\Delta d$ for lens drive. This is because if $\beta_N<\beta_L'$ there is a high probability that landscape pictures or souvenir pictures on the background of a landscape are often taken and that the main object exists at a position nearest to the camera.

Figure 38:
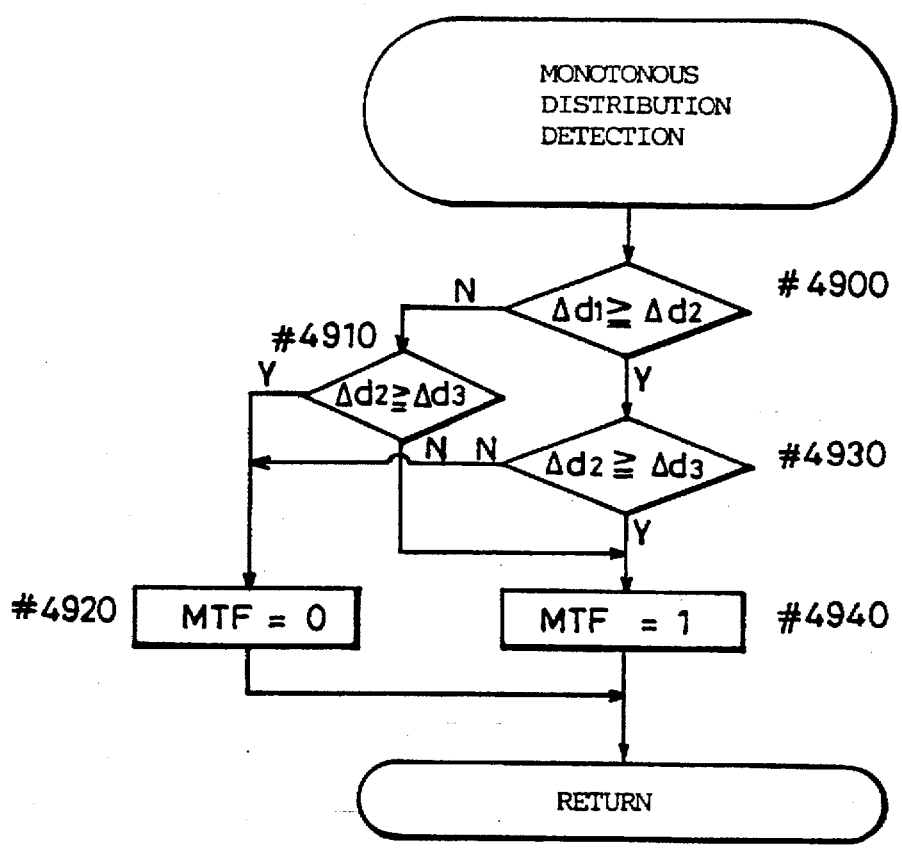
FIG. 38 is a flowchart showing detailed procedures of the monotone distribution detection in FIG. 36.

If $\beta_H\geq\beta_N\geq\beta_L$ in step 4730, $\Delta\beta$ is set to 15 as the initial value in step 4760. In step 4770, it is determined whether distribution of objects is a monotonous distribution or not. This subroutine will be described with reference to FIG. 38. In step 4900, the defocus amounts $\Delta d1$ and $\Delta d2$ in the first and second islands IS1 and IS2 are compared. If $\Delta d1<\Delta d2$, the processing flow proceeds to step 4910 and if $\Delta d1\geq\Delta d2$, it proceeds to step 4930. In step 4910, the defocus amounts $\Delta d2$ and $\Delta d3$ in the second and third islands IS2 and IS3 are compared. If $\Delta d2\geq\Delta d3$, the flow proceeds to step 4920 and if $\Delta d2<\Delta d3$, it proceeds to step 4940. In step 4930, the defocus amount $\Delta d2$ and $\Delta d3$ in the second and third islands IS2 and IS3 are compared. If $\Delta d2<\Delta d3$, the flow proceeds to step 4920 and if $\Delta d2\geq\Delta d3$, the flow proceeds to step 4940. In step 4920, the monotone flag MTF indicating monotonous distribution of objects is reset and the flow returns. In step 4940, the monotone flag MTF indicating monotonous distribution of objects is set and the flow returns.

Thus, the defocus amount $\Delta d1$ to $\Delta d3$ in the first to third islands IS1 to IS3 are compared in steps 4900, 4910 and 4930 and according to the results, the monotone flag MTF is reset in step 4920 or set in step 4940. More specifically, if $\Delta d1\geq\Delta d2\geq\Delta d3$, the processing flow proceeds to steps 4900, 4930 and 4940 to set the monotone flag MTF. If $\Delta d1<\Delta d2<\Delta d3$, the processing flow proceeds to steps 4900, 4910 and 4940 to set the monotone flag MTF. If $\Delta d1\geq\Delta d2$ and $\Delta d2<\Delta d3$, the flow proceeds to steps 4900, 4930 and 4920 to reset the monotone flag MTF. If $\Delta d1<\Delta d2$ and $\Delta d2\geq\Delta d3$, the flow proceeds to steps 4900, 4910 and 4920 to reset the monotone flag MTF.

Figure 36:
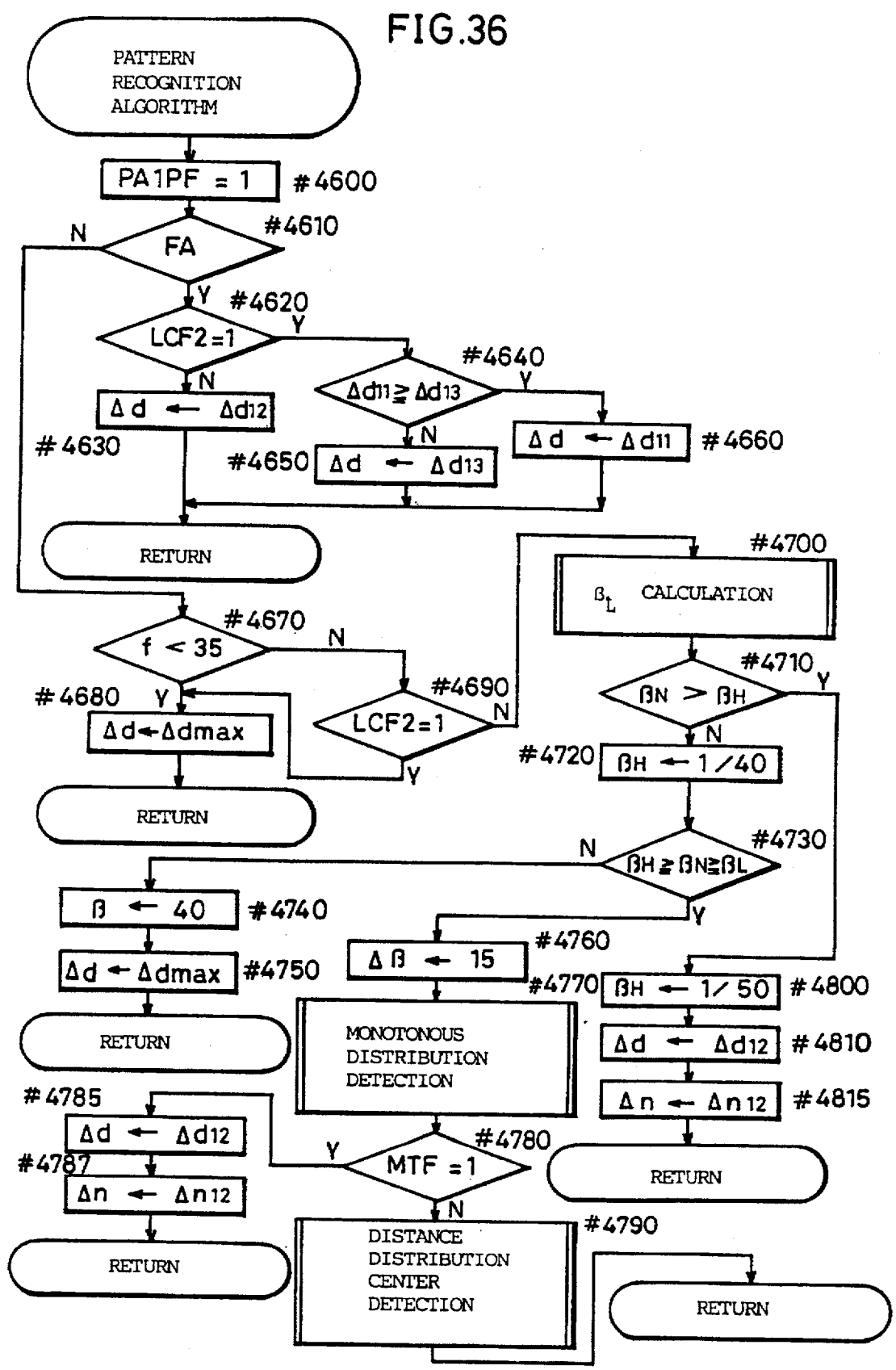
FIG. 36 is a flowchart showing detailed procedures of the pattern recognition algorithm in FIG. 33.
Figure 39:
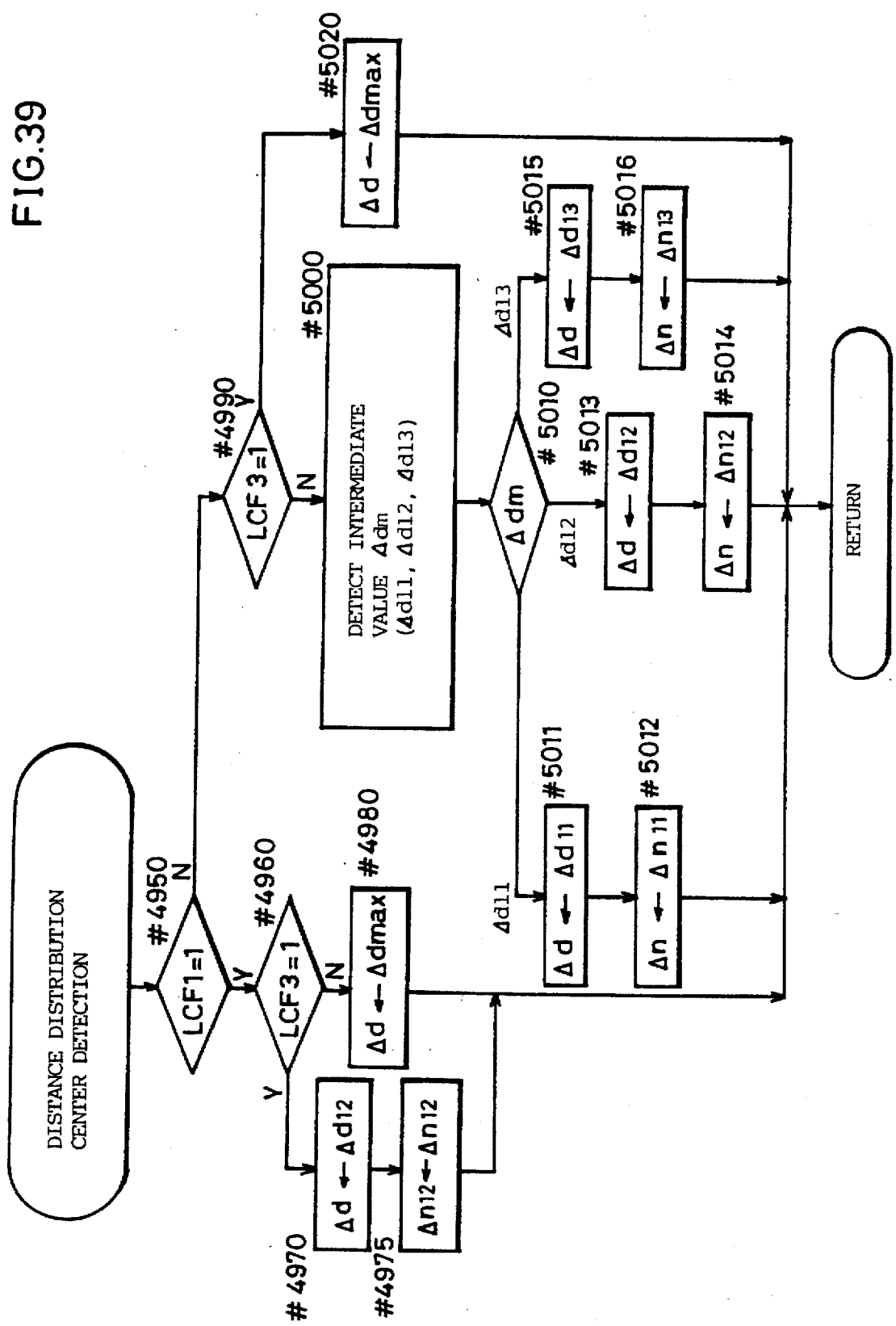
FIG. 39 is a flowchart showing detailed procedures of the center detection from the distance distribution in FIG. 36.

Referring again to the flow chart of FIG. 36, it is determined in step 4780 whether the monotone flag MTF is set or not. If the monotone flag MTF is set in step 4780, this means that the second island IS2 exists at the center of the distance distribution. Accordingly, the defocus amount $\Delta d12$ in the second island IS2 is substituted for the defocus amount Δd for lens drive in step 4785 and the shift number Δn12 in the second island IS2 is substituted for the shift number Δn in step 4787. Then, the flow returns. If the monotone flag MTF is not set in step 4780, the central island in the distance distribution is detected in step 4790 and the defocus amount and the shift number in this island are used as the defocus amount and the shift number for lens drive and, then, the flow returns. The subroutine for detection of the center of the distance distribution will be described with reference to FIG. 39.

In step 4950, it is determined whether the flag LCF1 is set to determine whether focus detection is unavailable in the first island IS1. Then, it is determined in step 4960 if the flag LCF1 is set in step 4950, or in step 4990 if it is not set, whether focus detection is unavailable in the third island IS3.

If the flag LCF1 is set in step 4950 and the flag LCF3 is also set in step 4960, it is determined that focus detection is unavailable in both of the first and third islands IS1 and IS3. In step 4970, the defocus amount Δd12 in the second island IS2 is substituted for the defocus amount Δd for lens drive and in step 4975, the shift number Δn12 in the second island IS2 is substituted for the shift number Δn. Then, the flow returns.

If the flag LCF1 is set in step 4950 and the flag LCF3 is not set in step 4960, it is determined that focus detection is unavailable in the first island IS1 and that focus detection is available in the third island IS3. In step 4980, the maximum value Δdmax out of the defocus amounts Δd12 and Δd13 in the second and third islands IS2 and IS3 is substituted for the defocus amount Δd for lens drive. This means that the island where the object nearer to the camera is selected out of the second and third islands IS2 and IS3.

If the flag LCF1 is not set in step 4950 and the flag LCF3 is not set in the step 4990, it is determined that focus detection is available in both of the first and third islands IS1 to IS3. In step 5000, an intermediate value Δdm out of the defocus amounts Δd11, Δd12 and Δd13 in the first to third islands IS1 to IS3 is detected. If the intermediate value Δdm is Δd11, the flow proceeds to step 5011 from step 5010. In step 5011, the defocus amount Δd11 in the first island is substituted for the defocus amount Δd for lens drive and, in step 5012, the shift number Δn11 in the first island IS1 is substituted for the shift number Δn, whereby the flow returns. If the intermediate value Δdm is Δd12, the flow proceeds to step 5013 from step 5010. In step 5013, the defocus amount Δd12 in the second island IS2 is substituted for the defocus amount Δd for lens drive and, in step 5014, the shift number Δn12 in the second island IS2 is substituted for the shift number Δn in step 5014 and, then, the flow returns. If the intermediate value Δdm is Δd13, the flow proceeds from step 5010 to step 5015. In step 5015, the defocus amount Δd13 in the third island IS3 is substituted for the defocus amount Δd for lens drive and, in step 5016, the shift number Δn13 in the third island IS3 is substituted for the shift number Δn. Then, the flow returns.

If the flag LCF1 is not set in step 4950 and the flag LCF3 is set in step 4990, it is determined that focus detection is available in the first island IS1 and that focus detection is unavailable in the third island IS3. In step 5020, the maximum value Δdmax out of the defocus amounts Δd12 and Δd11 in the second and first islands IS1 and IS2, respectively, is substituted for the defocus amount Δd for lens drive. This means that the island where the object nearer to the camera is selected out of the second and first islands IS1 and IS2.

A modification may be applied in the below described manner. If a difference between the defocus amounts Δd12 and Δd13 in the second and third islands IS2 and IS3 is less than a prescribed value defined by the depth of focal point, an average value (Δd12+Δd13)/2 of the defocus amounts in both islands is substituted for the defocus amounts Δd for lens drive and if the difference is larger than the prescribed value, the larger defocus amount Δdmax is substituted for the defocus amount Δd for lens drive, so that in-focus condition may be set on the objects of the two islands. Similarly, a variant of the step 5020 may be applied in the same manner as in the variant of the step 4980, by using the first island IS1 in place of the third island IS3 and the value Δd11 in place of the value Δd13.

Figure 40:
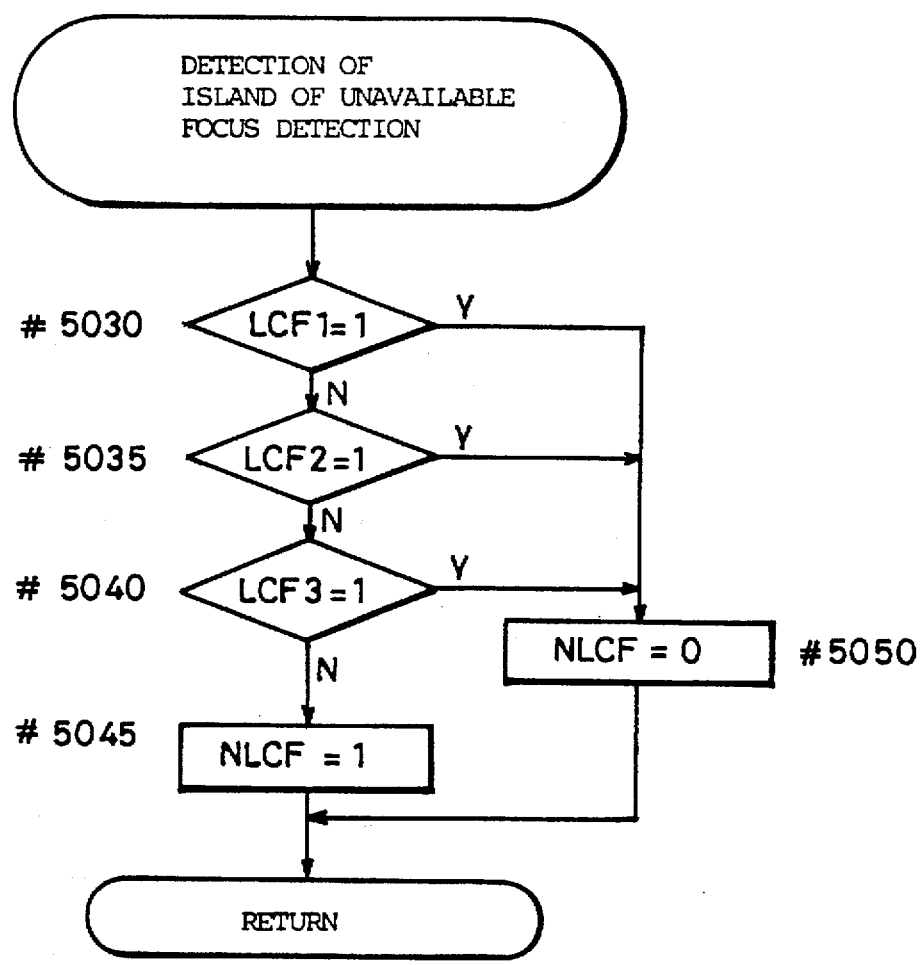
FIG. 40 is a flowchart showing detailed procedures of the detection of an island where focus detection is unavailable in FIG. 33.

Thus, when the pattern recognition algorithm is terminated, the processing flow returns to the flow in FIG. 33. In step 4245, it is determined whether there exist an island where focus detection was unavailable. This subroutine will be described with reference to FIG. 40. In steps 5030 to 5040, it is determined based on the states of the flags LCF1 to LCF3 whether focus detection was unavailable in the first to third islands IS1 to IS3. If all the flags LCF1 to LCF3 are reset, the flow proceeds to steps 5030, 5035, 5040 and 5045 to set the flag NLCF indicating that focus detection is available in all of the islands. Then, the flow returns. If any one of the flags LCF1 to LCF3 is set, the flow proceeds to step 5050 from any of the steps 5030, 5035 and 5040 to reset the flag NLCF. Then, the flow returns.

Returning to the flow chart of FIG. 33, if AR=2 (indicating the minimum defocus algorithm), the processing flow proceeds from step 4260 to step 4270 to set the offset amount to $\Delta DF_R$=100 μm. If AR=3, the flow proceeds from step 4280 to step 4290 to set the offset amount to $\Delta DF_R$=50 μm. If AR=4, the flow proceeds from step 4300 to step 4310 to set the offset amount to $\Delta DF_R$=0. Then, the flow proceeds to step 4320 from steps 4270, 4290 and 4310, so that the minimum defocus amount algorithm is executed to determine the defocus amount.

Figure 41:
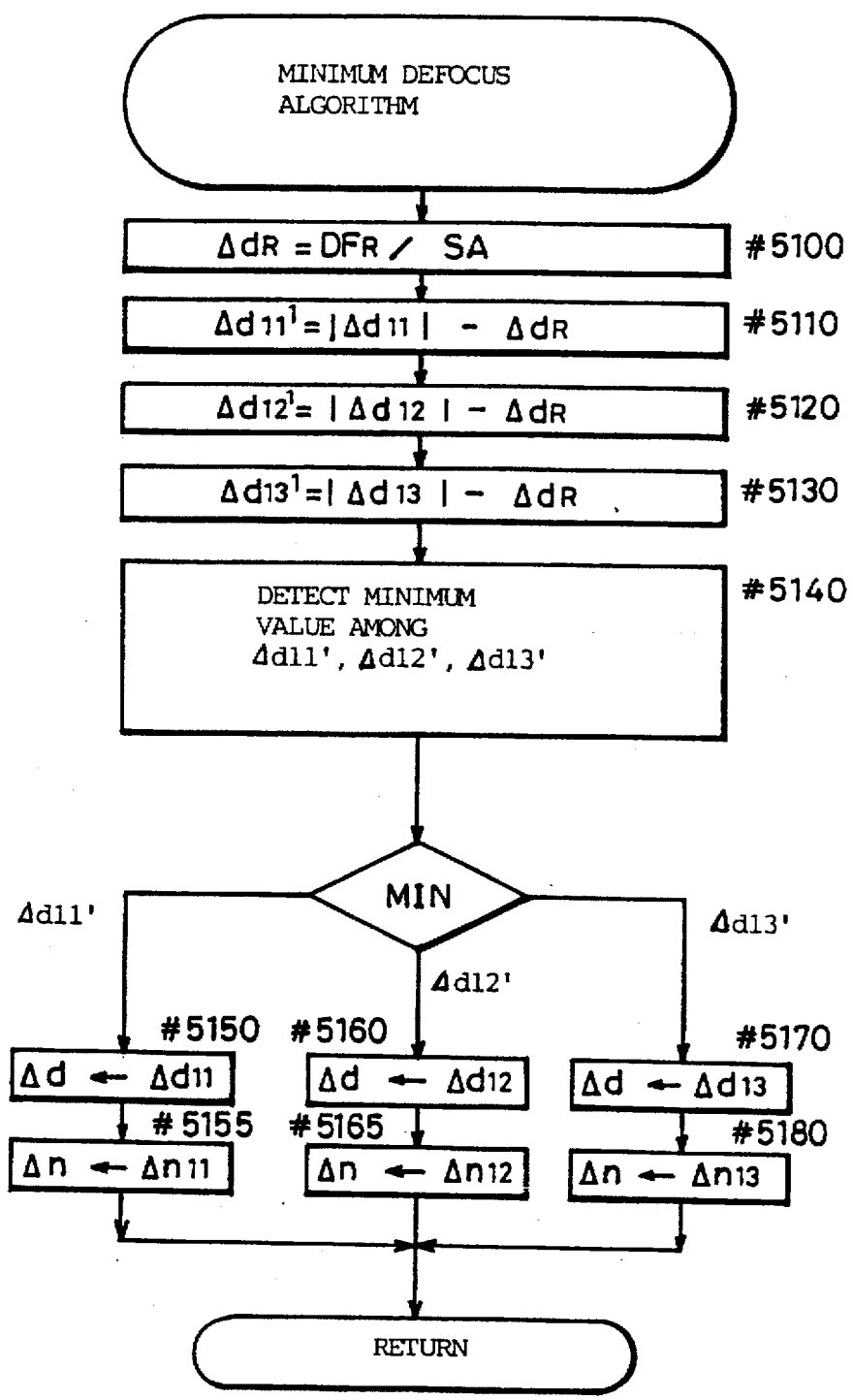
FIG. 41 is a flowchart showing detailed procedures of the algorithm of the minimum DF in FIG. 33.

This processing will be described with reference to FIG. 41. In step 5100, the offset amount $DF_R$ is divided by a defocus amount SA for one pitch, so that a pitch of the offset amount $DF_R$ is obtained as $\Delta d_R$. In steps 5100 to 5140, the pitch $\Delta d_R$ of the offset amount is subtracted from the absolute values of the defocus amounts (Δd11, Δd12 and Δd13) in the respective islands so that Δd11', Δd12' and Δd13' are obtained respectively. In step 5140, the minimum value is obtained out of the thus obtained Δd11' Δd12' and Δd13'. This means that the values of the object nearest to the present focus position are obtained. If the minimum value is Δd11', it is determined that the defocus amount in the first island is the minimum defocus amount and the flow proceeds from step 5145 to step 5150. Then, the defocus amount Δd11 in the first island IS1 is substituted for the defocus amount Δd for lens drive and the shift number Δn11 in the first island is substituted for the shift number Δn in step 5155. Then, the flow returns. If the minimum value is Δd12', it is determined that the defocus amount in the second island is the minimum defocus amount and the flow proceeds from step 5145 to step 5160. Then, the defocus amount Δd12 in the second island IS2 is substituted for the defocus amount Δd for lens drive and the shift number Δn12 in the second island IS2 is substituted for the shift number Δn in the step 5165, and then the flow returns. If the minimum value is Δd13', it is determined that the defocus amount in the third island is the minimum defocus amount and the flow proceeds from step 5145 to step 5170. The defocus amount Δd13 in the third island IS3 is substituted for the defocus amount Δd for lens drive and the shift number Δn13 in the third island IS3 is substituted for the shift number Δn in step 5180, and then the flow returns.

Figure 42:
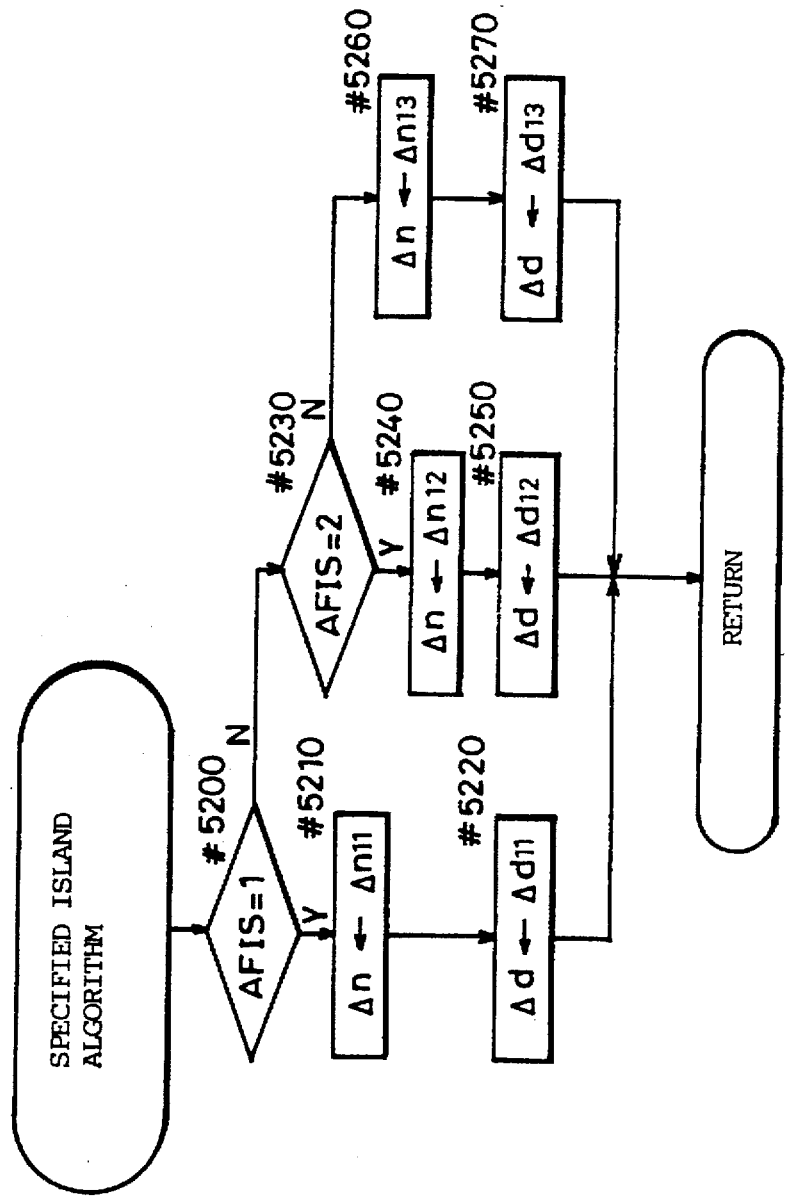
FIG. 42 is a flowchart showing detailed procedures of the specified island algorithm in FIG. 33.

Referring again to the flow chart of FIG. 33, if AR=5 (indicating the specified island algorithm), the flow proceeds to step 4340 from step 4330, so that the specified island algorithm is executed. This algorithm will be described in the following with reference to FIG. 42.

In step 5200, it is determined whether the variable AFIS is 1 or not in order to determine whether the specified island is the first island IS1 or not. If AFIS is 1 in step 5200, it is determined that the specified island is the first island IS1. The shift number Δn11 in the first island IS1 is substituted for the shift number Δn for lens drive in step 5210 and the defocus amount Δd11 in the first island IS1 is substituted for the defocus amount Δd for lens drive in step 5220, and then the flow returns. If the variable AFIS is not 1 in step 5200, the flow proceeds to step 5230.

In step 5230, it is determined whether the variable AFIS is 2 or not in order to determine whether the specified island is the second island IS2 or not. If the variable AFIS is 2 in step 5230, it is determined that the specified island is the second island IS2. The shift number Δn12 in the second island IS2 is substituted for the shift number Δn for lens drive in step 5240 and the defocus amount Δd12 in the second island IS2 is substituted for the defocus amount Δd for lens drive in step 5250. Then, the flow returns.

If the variable AFIS is not 2 in step 5230, it is determined that the specified island is the third island IS3 and, in step 5260, the shift number Δn13 in the third island IS3 is substituted for the shift number Δn for lens drive. In step 5270, the defocus amount Δd13 in the third island IS3 is substituted for the defocus amount Δd for lens drive and the flow returns.

Referring again to the flow chart of FIG. 33, the flow proceeds to the step 4345 from any one of the steps 4245, 4320, 4340 and 4343, so that the defocus amount DF=Δd× SA is obtained by multiplication of the defocus amount Δd for lens drive by the defocus amount SA for one pitch. In step 4350, the defocus amount DF thus obtained is used as an argument and the subroutine for magnification β calculation is called so that the magnification in the island of the object detected is calculated. This procedure is executed by calling the subroutine shown in FIG. 35 and therefore the description is not given. After the execution of the subroutine, the flow returns.

Figure 43A:
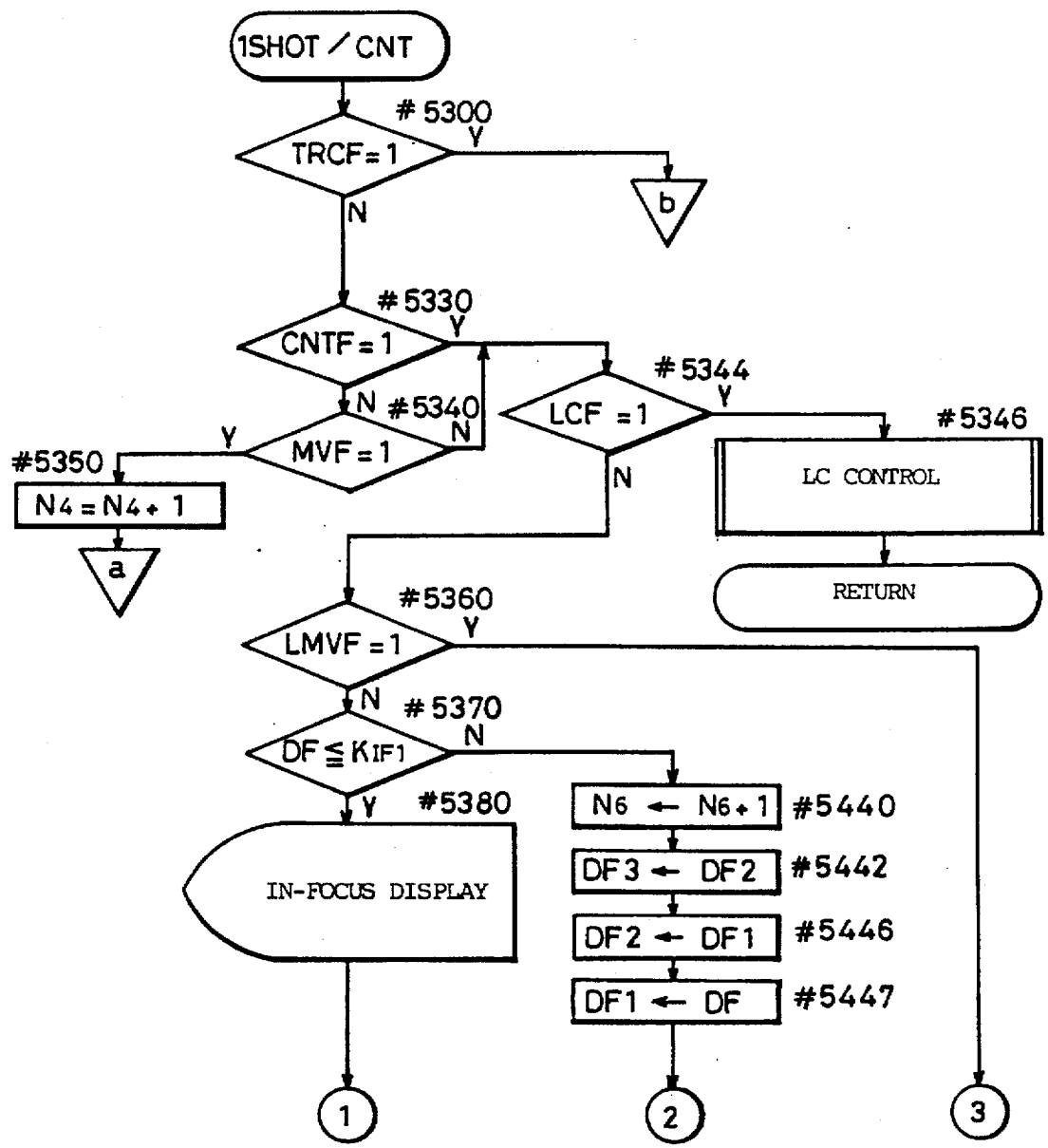
FIGS. 43A and 43B are flowcharts showing detailed procedures of the automatic selection routine of one shot AF/continuous AF in FIG. 10.
Figure 43B:
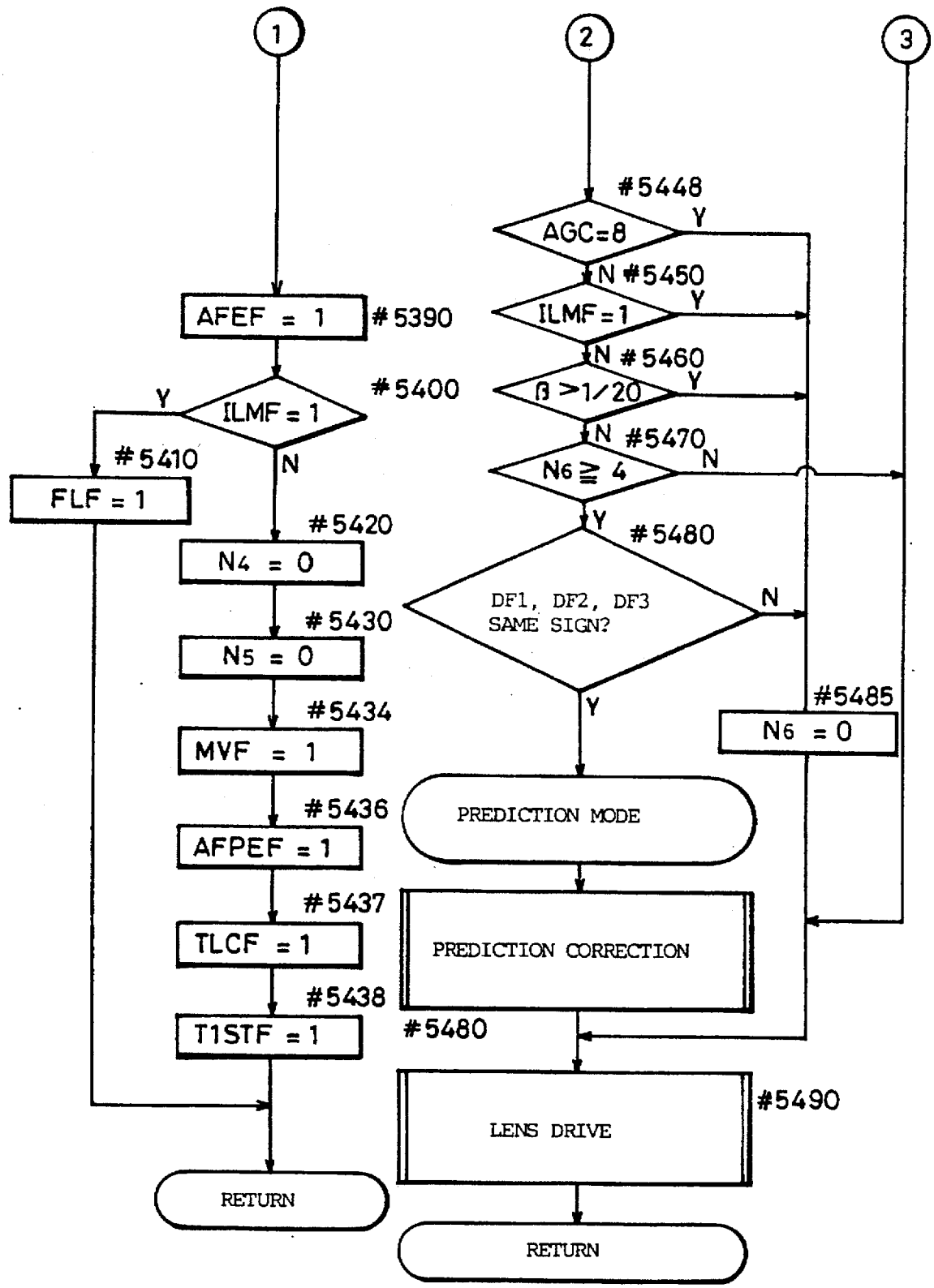

In the following, the flow chart of the automatic selection routine for one-shot AF/continuous AF called in step 390 in FIG. 10 will be described with reference to FIGS. 43A and 43B. In step 5300, the prediction mode flag TRCF is set or not in order to determine whether the prediction mode is selected or not. If the prediction mode is set in step 5300, the flow proceeds to step 7500 (as shown in FIG. 54). If the prediction mode flag TRCF is not set in step 5300, it is determined in step 5330 whether the flag CNTF is set or not in order to determine whether the continuous AF mode is selected or not. The continuous AF mode is a mode in which the lens is driven according to the defocus amount even after the in-focus condition is obtained. If the flag CNTF is set in step 5330, it is determined that the continuous AF mode is selected and it is determined in step 5344 whether the flag LCF is set or not in order to determine whether focus detection is unavailable. If the flag LCF is set in step 5344, it is determined that focus detection is unavailable and, in step 5346, the subroutine for low contrast control, namely, control in the case of unavailable focus detection is called and then the flow returns.

Figure 44:
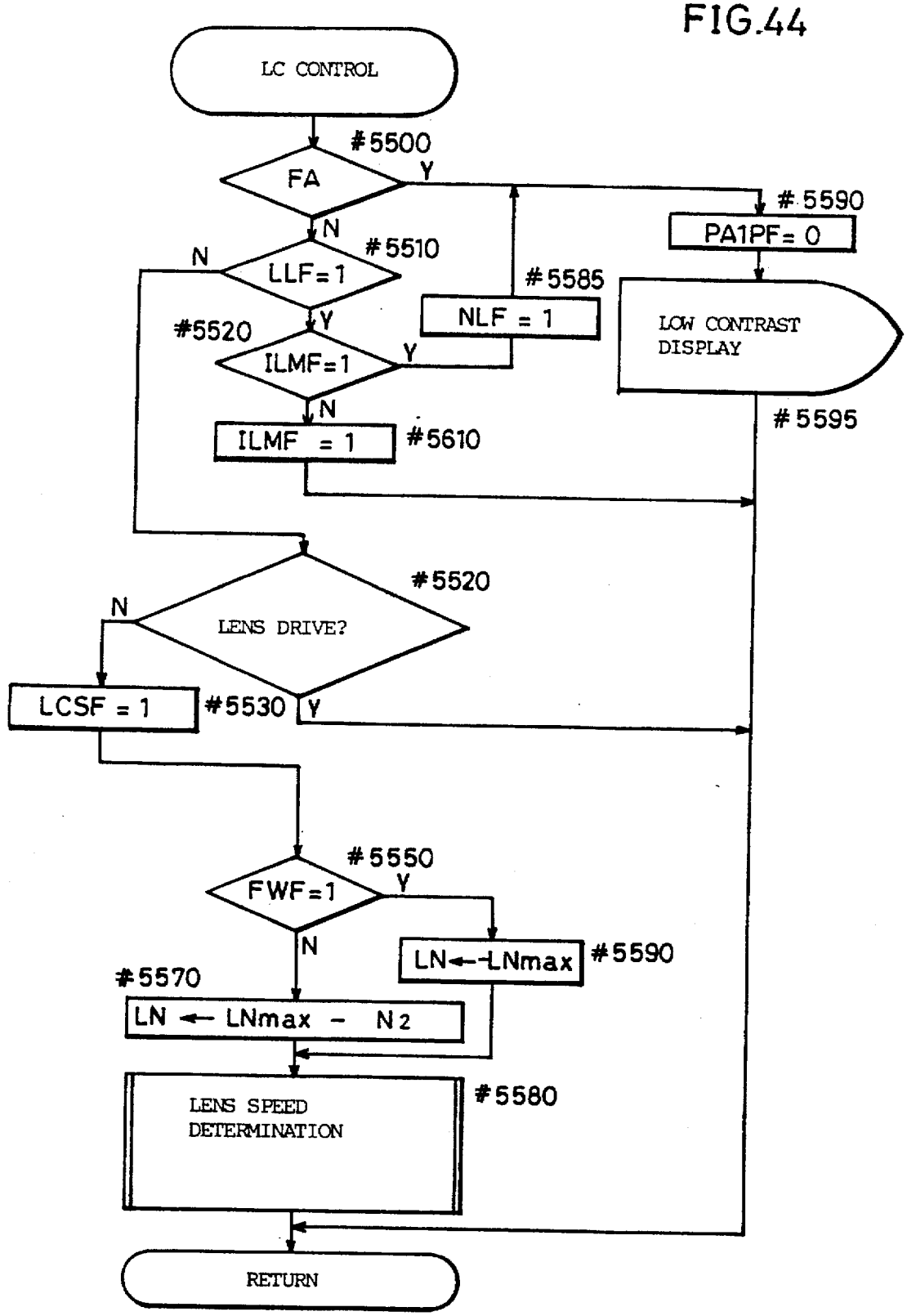
FIG. 44 is a flowchart showing detailed procedures of the subroutine of low contrast control in FIG. 43A.

The subroutine for low contrast control will be described with reference to FIG. 44. When this subroutine is called, it is first determined by the state of the switch $S_{AF/M}$ whether the manual focus mode is selected or not. If the manual focus mode is selected in step 5500, the flag PA1PF indicating that the pattern recognition algorithm has been executed once is reset and an unavailable focus detection display (low contrast display) is given in step 5595 and then the flow returns. If the manual focus mode is not selected in step 5500, it is determined in step 5510 whether the low luminance flag LLF is set or not in order to determine whether the object has a low luminance or not. If the low luminance flag LLF is set in step 5510, it is determined in step 5520 whether the auxiliary light flag ILMF is set or not in order to determine whether the auxiliary light mode is selected. If the auxiliary light flag ILMF is set in step 5520, it is determined that the auxiliary light mode is selected. In this case, focus detection is unavailable in the auxiliary light mode, and accordingly it is useless to emit auxiliary light. Therefore, in order to forbid emission of the auxiliary light, the auxiliary light forbidding flag NLF is set in step 5585 and the flow proceeds to step 5630 in the same manner as in the case of the manual focus mode. If the auxiliary light flag ILMF is not set in step 5520, it is determined that the auxiliary light mode is not selected. Then, the auxiliary light flag ILMF is set in order to effect focus detection in the auxiliary light mode and the flow returns.

If the low luminance flag LLF is not set in step 5510, it is determined that the reason for unavailable focus detection is not the low luminance and, in step 5520, it is determined whether the lens is being driven or not. If the lens is being driven in step 5520, the flow returns so that the lens is driven based on the defocus amount obtained by the previous focus detection. If the lens is not being driven in step 5520, the low contrast scanning flag LCSF is set in step 5530 to perform low contrast scanning operation for searching for a lens position enabling focus detection and the flow proceeds to step 5550. In step 5550, it is determined whether the flag FWF is set or not in order to determine whether the direction of the previous scanning is the forward moving direction or not. If the flag FWF is not set in step 5550, it is determined that the lens was stopped in the previous cycle and the lens drive amount LN is obtained by subtraction of the present lens moving position N2 from the maximum moving amount LN max in step 5570. In step 5580, the lens moving speed is determined and then the flow returns. If the flag FWF is set in step 5550, it is determined that the direction of the previous scanning is the forward moving direction and, in step 5590, the lens drive amount LN is set to (−LNmax) taking account of the maximum forward moving amount of the lens and the direction thereof. In step 5580, the lens moving speed is determined and then the flow returns.

Figure 45:
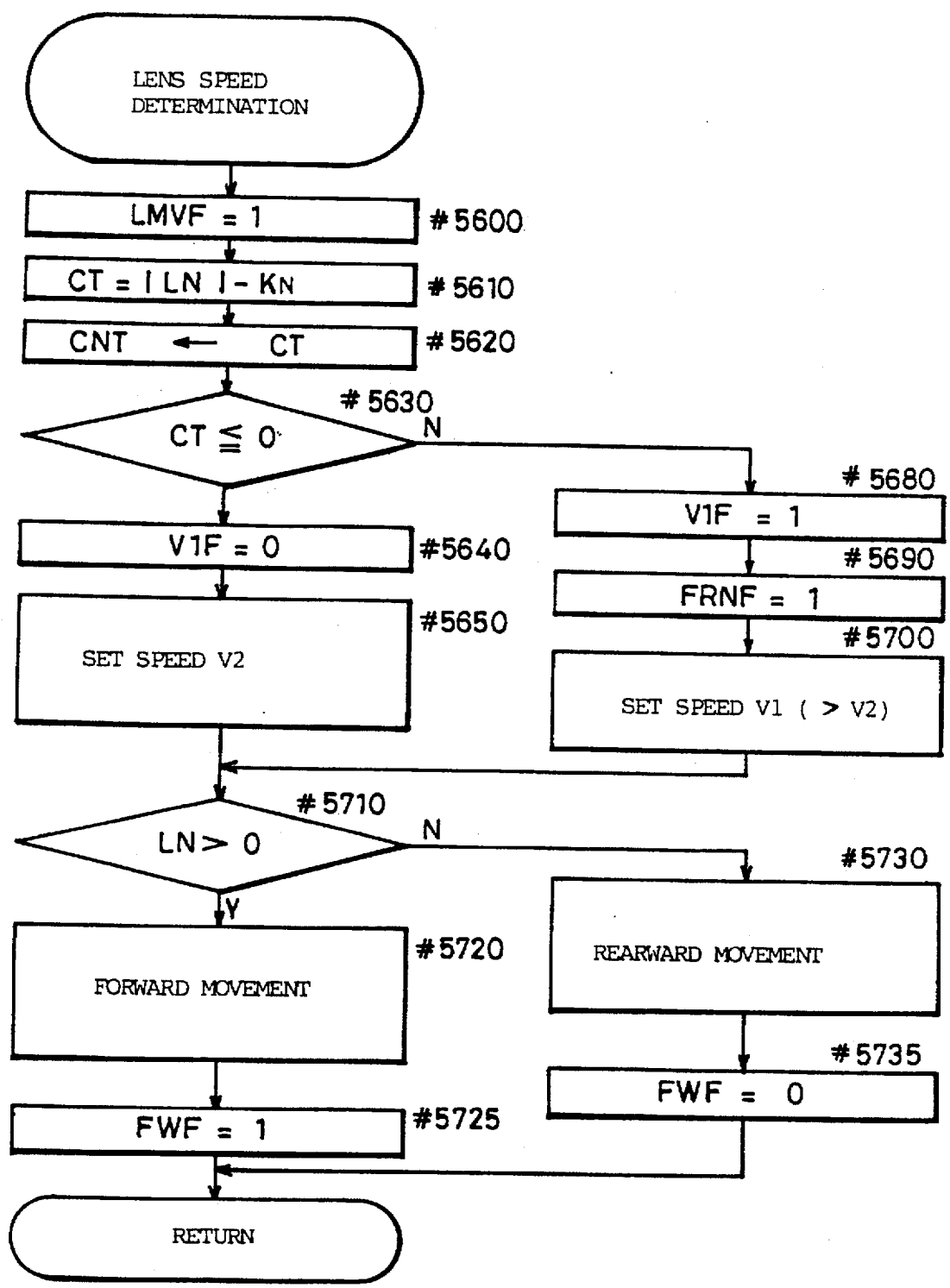
FIG. 45 is a flowchart showing detailed procedures of the lens speed determination in FIG. 44.

In step 5580, the lens moving speed is determined according to the lens drive amount LN obtained in step 5570 or step 5590. This subroutine will be described with reference to FIG. 45. First, in step 5600, the flag LMVF indicating that the lens is being driven is set. In order to drive the lens, it is necessary to execute this step at least once. In step 5610, a prescribed value $K_N$ (>0) is subtracted from the absolute value |LN| of the lens drive amount, so that a variable CT for defining the lens moving speed is obtained. The prescribed value $K_N$ is a value for determining whether the lens moving speed is to be set to a high speed with respect to the remaining drive amount of the lens. In step 5620, this variable CT is substituted for the number of the counter CNT used for counter interruption. In step 5630, it is determined whether the above mentioned variable CT is 0 or less. If CT≦0 in step 5630, the flag V1F indicating that the lens moving speed is in a high speed mode is reset in step 5640 and the lens moving speed is set to a low speed V2 (<V1) in step 5650, and then the flow proceeds to step 5710. If CT>0 in step 5630, the flag V1F indicating the high speed mode of the lens moving speed is set in step 5680 and the flag FRNF indicating the free run condition is set in step 5690. In step 5700, the lens moving speed is set to a high speed V1 (>V2) and the flow proceeds to 5710.

In step 5710, it is determined whether the lens drive amount LN is a positive value or not. If LN>0 in step 5710, the lens is driven in the forward moving direction in step 5720 and the flag FWF indicating the lens drive in the forward moving direction is set in step 5725. Then, the flow returns. If LN≦0 in step 5710, the lens is driven in the rearward moving direction in step 5730 and the flag FWF indicating the lens drive in the forward moving direction is reset in step 5735. Then, the flow returns.

Figure 46:
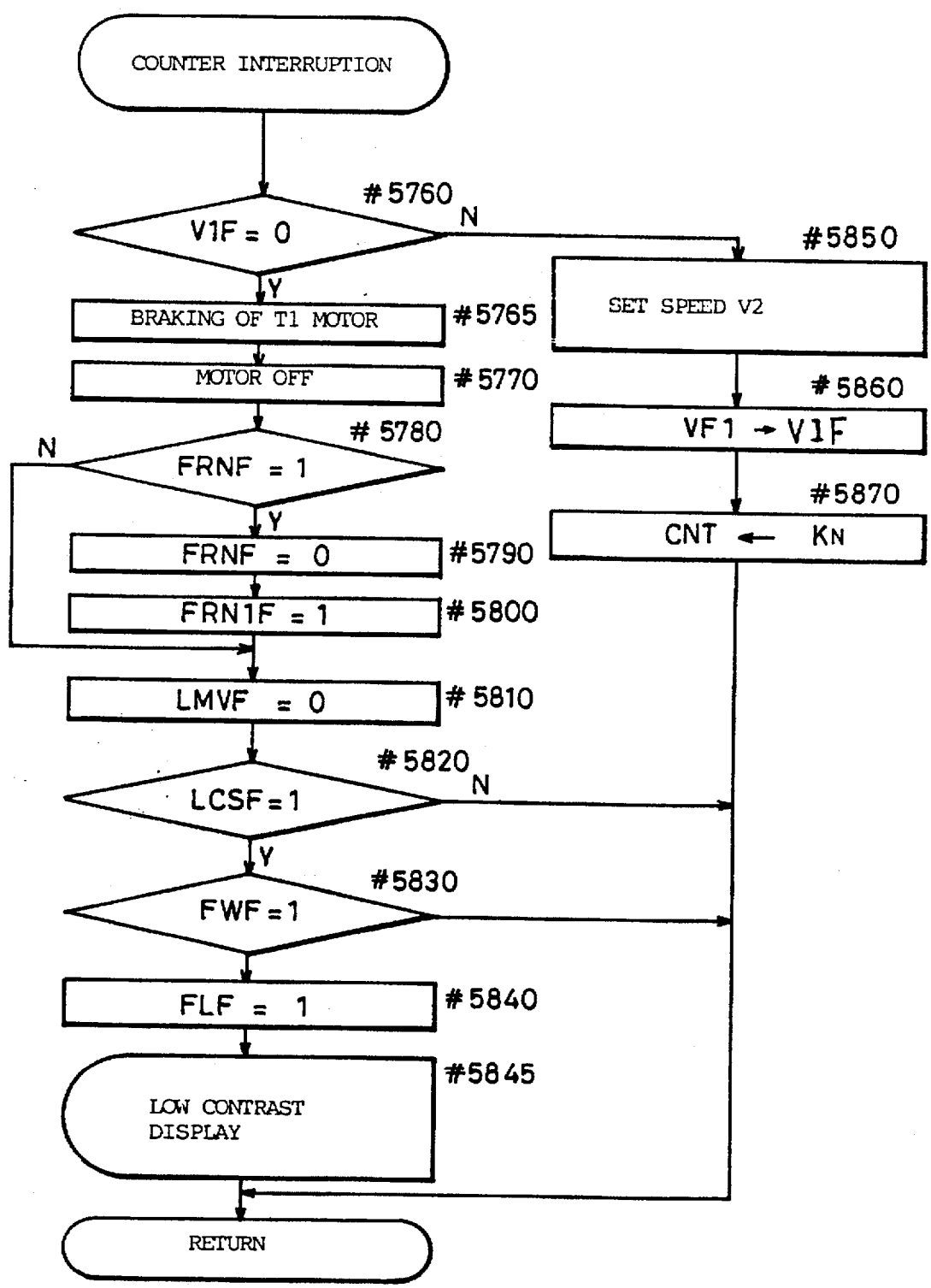
FIG. 46 is a flowchart showing detailed procedures of the counter interruption subroutine executed when the value of the counter CNT becomes zero in the flowchart of FIG. 45.

The subroutine for the above mentioned counter interruption will be described with reference to FIG. 46. This counter interruption subroutine is executed when the value of the counter CNT is 0. The value of the counter CNT is decremented each time a pulse outputted from the encoder ENC which monitors drive of the lens is supplied to the microcomputer μC when the lens is driven. In step 5760, it is determined whether the flag V1F is reset or not in order to determine whether the lens moving speed is a low speed or not when counter interruption occurs. If the flag V1F is set in step 5760, it is determined that the lens is driven at the high speed when the counter interruption occurs, and in order to change the lens moving speed, the lens moving speed is set to the low speed V2 (<V1) in step 5850. In step 5860, the flag V1F indicating that the lens moving speed is the high speed is reset. In step 5870, the remaining drive amount $K_N$ is set in the counter CNT and the flow returns to the step in which interruption occurred.

If the flag V1F is reset in step 5760, it is determined that the lens moving speed was the low speed when counter interruption occurred. Then, in step 5765, braking for a prescribed time T1 is applied to the motor for lens drive since the remaining drive amount $K_N$ set in the above mentioned step 5870 is regarded as coming to an end. After that, the motor turns off in step 5770. Then, in step 5780, it is determined whether the flag FRNF is set or not in order to determine whether the free run condition has been set or not. If the flag FRNF is set in step 5780, it is determined that the lens is at a stop after the free run condition has been set and the flag FRNF is reset in step 5790. At the same time, the flag FRN1F is set in step 5800 to indicate that the lens has just stopped after the free run and then the flow proceeds to step 5810. If the flag FRNF is not set in step 5780, the flow skips steps 5790 and 5800 and proceeds to step 5810.

In step 5810, the flag LMVF indicating that the lens is being driven is reset. Then, in step 5820, it is determined whether the low contrast scanning flag LCSF is set or not in order to determine whether low contrast scanning is being effected or not. If the low contrast scanning flag LCSF is not set in step 5820, the flow, returns. If the low contrast scanning flag LCSF is set in step 5820, it is determined that low contrast scanning is being effected and in order to determine whether the lens was driven in the forward moving direction before the stop of the lens, it is determined in step 5830 whether the forward moving direction flag FWF is reset or not. If the forward moving direction flag FWF is set in step 5830, it is determined that the low contrast scanning was effected in the forward moving direction, and the flow returns. If the forward moving direction flag FWF is reset in step 5830, it is determined that the low contrast scanning was effected in the rearward moving direction and it is determined that focus detection could not be effected even by low contrast scanning in the forward and rearward directions. Consequently, in order to forbid focus detection operation from the next time, the focus lock flag FLF is set in step 5840. Then, the unavailable focus detection display (the low contrast display) turns on in step 5845 and the flow returns.

Referring again to FIG. 43, if the flag CNTF is not set in step 5330, it is determined that the continuous AF mode is not selected and, in step 5340, it is determined whether the moving object determination flag MVF is set or not in order to determine whether moving object determination is being effected or not. If the moving object determination flag MVF is not set in step 5340, it is determined that moving object determination is not effected, and, in order to determine whether focus detection is unavailable, it is determined in step 5344 whether the flag LCF is set or not. If the moving object determination flag MVF is set in step 5340, the variable N4 is incremented by one in step 5350 and the flow proceeds to step 6300 (as shown in FIG. 50).

If the flag LCF is not set in step 5344, it is determined that focus detection is available, and, in order to determine whether the lens is being driven, it is determined in step 5360 whether the flag LMVF is set or not. If the flag LMVF is set in step 5360, it is determined that the lens is being driven and the subroutine for lens drive is called in step 5490. Then, the flow returns. If the flag LMVF is not set in step 5360, it is determined that the lens is not being driven and, in step 5370, it is detetermined whether or not the defocus amount DF is equal to or less than a prescribed value $K_{IF1}$ indicating an in-focus range. If DF≦$K_{IF1}$ in step 5370, it is determined that the in-focus condition is obtained. In step 5380, the in-focus display turns on and, in step 5390, the flag AFET indicating the in-focus condition is obtained. Then, in step 5400, it is determined whether the auxiliary light flag ILMF is set or not in order to determine whether the auxiliary light mode is selected or not. If the auxiliary light flag ILMF is set in step 5400, it is determined that the auxiliary light mode is selected, and the focus lock flag FLF is set in step 5410 so that neither the next focus detection operation nor the prediction determination is effected. Then, the flow returns. If the auxiliary light flag ILMF is not set in step 5400, it is determined that the auxiliary light mode is not selected and the variables N4 and N5 are reset in steps 5420 and 5430, respectively. In step 5434, the flag MVF indicating the moving object determination is set. Thus, moving object determination is effected next time and thereafter. In step 5436, the flag AEPEF indicating that an in-focus condition has once occurred is set and the flag TLCF indicating unavailable focus detection during moving object determination is set in 5437. In step 5438, the flag T1STF indicating the first change to the moving determination mode is set and then the flow returns.

If DF>$K_{IF1}$ in step 5370, it is determined that an in-focus condition does not occur and processing for determining a moving object for which an in-focus condition has not occurred is performed. In this processing, it is assumed that in-focus condition cannot be obtained only by normal focus detection because of a high moving speed of the object. The control in this case will be described with reference to the flow chart as follows.

In step 5440, the variable N6 is incremented by one. This variable N6 indicates the number of applications of this step. In steps 5442, 5446 and 5447, the values DF2, DF1 and DF are substituted for DF3, DF2 and DF1, respectively, so that the newest three focus detection data DF3, DF2 and DF1 are stored. In step 5448, it is determined whether the automatic gain control data AGC is 8 or not in order to determine whether the brightness of the object is low or not. If AGC is 8 in step 5448, the low luminance is determined. In such a case, there might be various disadvantageous phenomena such as increase of noise in the data from the CCD, deterioration of the focus detection precision and an unstable pickup of images caused by movement of an object due to a long accumulation time. Therefore, the variable N6 is reset to 0 in step 485 without executing the moving object determination and the flow proceeds to lens drive in step 5490.

If AGC is not 8 in step 5448, it is determined in step 5450 whether the auxiliary light flag ILMF is set or not in order to determine whether the auxiliary light mode is selected or not. If the auxiliary light flag ILFLF is set in step 5450, it is determined that the auxiliary light mode is selected and the variable N6 is reset to 0 in step 5485 without executing the moving object determination for the same reasons as described above. Then, the flow proceeds to lens drive in step 5490. If the auxiliary light flag ILMF is not set in step 5450, it is determined that the auxiliary light mode is not selected, and the flow proceeds to step 5460. In step 5460, it is determined whether the magnification $\beta$ in the island where the defocus amount has been obtained is larger than 1/20 or not. If $\beta > 1/20$ in step 5460, it is determined that the object cannot be followed up because a small movement of the object causes a large change on the focal plane, and the variable N6 is reset to 0 in step 5485 without executing the moving object determination, so that the flow proceeds to lens drive in step 5490. If $\beta \geq 1/20$ in step 5460, it is determined in step 5470 whether or not the variable N6 is 4 or more so as to determine whether or not the number of lens driving operations (in step 5490) is three or more, that is, the step 5440 has been executed for four times or more. If N6<4 in step 5470, it is determined that the number of lens driving operations is less than three and the flow proceeds to lens drive in step 5490 since data is regarded as being insufficient for obtaining the speed of the object. If N6$\geq$4 in step 5470, it is determined that the number of lens driving operations is three or more and it is determined in step 5480 whether the newest three defocus amounts DF1, DF2 and DF3 have the same positive or negative sign (indicating the defocus amounts in the same direction). If the newest three defocus amounts DF1, DF2 and DF3 do not have the same sign in step 5480, it is determined that follow-up is not enabled, and the variable N6 is reset to 0 in step 5485, so that the flow proceeds to lens drive in step 5490. In this case, the determination for start of the prediction mode is newly effected from the beginning. If the newest three defocus amounts DF1, DF2 and DF3 have the same sign in step 5480, the prediction mode is started and a defocus amount is newly obtained by prediction correction in step 5486. Then, the subroutine for lens drive in step 5490 is executed and the flow returns. Thus, if the moving speed of the object is fast and the object is moving in the same direction, the prediction mode starts to be applied so that prediction correction can be effected immediately based on the results of the focus detections. If the lens drive at the free run or at the low speed continues for a long period, it may happen that four or more focus detections are made.

Figure 47:
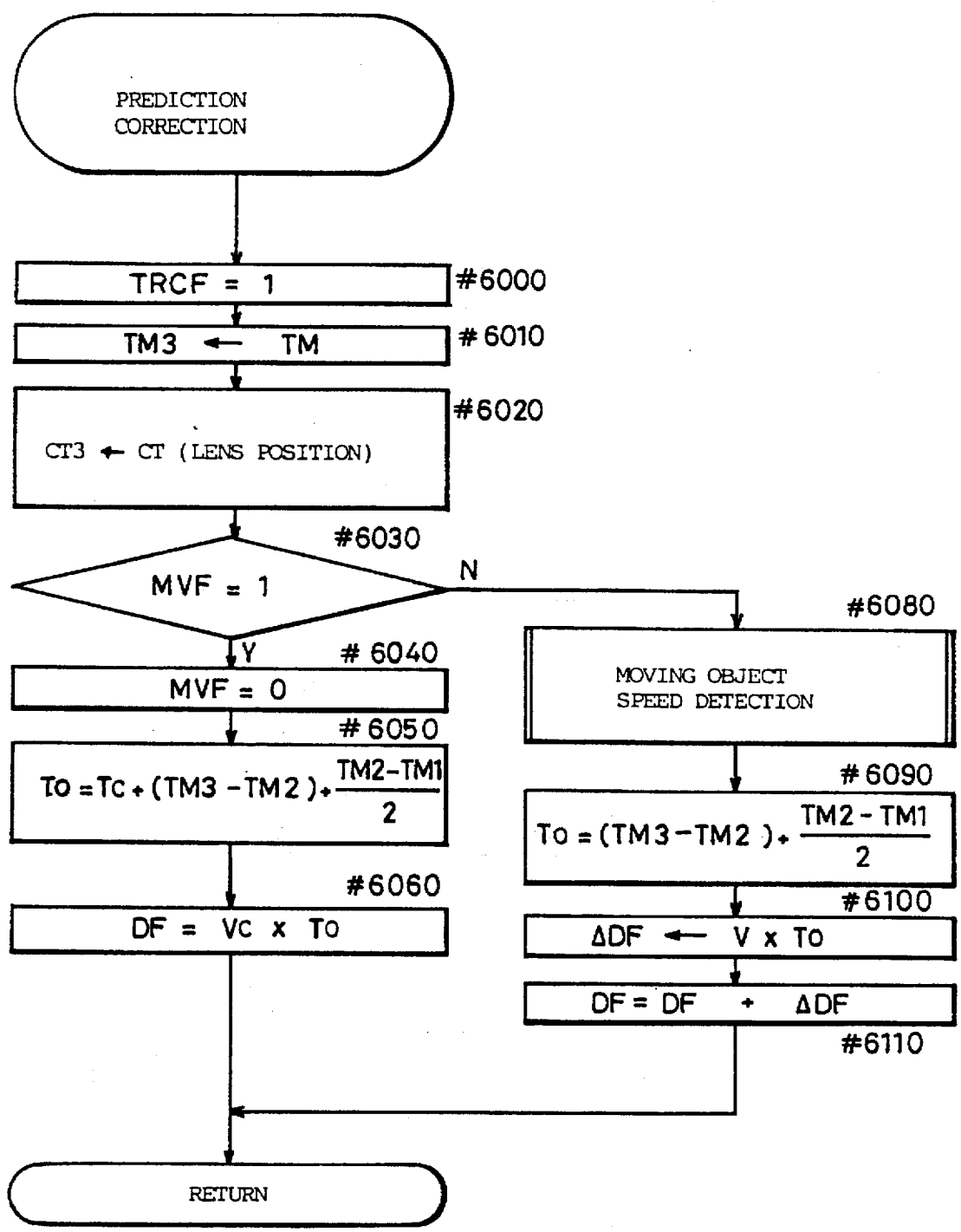
FIG. 47 is a flowchart showing detailed procedures of the prediction correction subroutine in FIG. 43B.

The prediction correction subroutine will be described with reference to FIG. 47. In step 6000, the flag TRCF indicating the prediction mode is set. In step 6010, the time of the free timer TM is read and stored as TM3. In step 6020, the forward moving amount of the lens is read from the lens position counter CT and it is stored as CT3. In step 6030, it is determined whether the flag MVF is set or not in order to determine whether moving object determination is being effected or not. If the flag MVF is set in step 6030, it is determined that moving object determination is being effected, and the flow proceeds to processing (as described afterward) in steps 6040 to 6060. If the flag MVF is not set in step 6030, it is determined that moving object determination is not effected and the moving speed is detected in step 6080.

Figure 8:
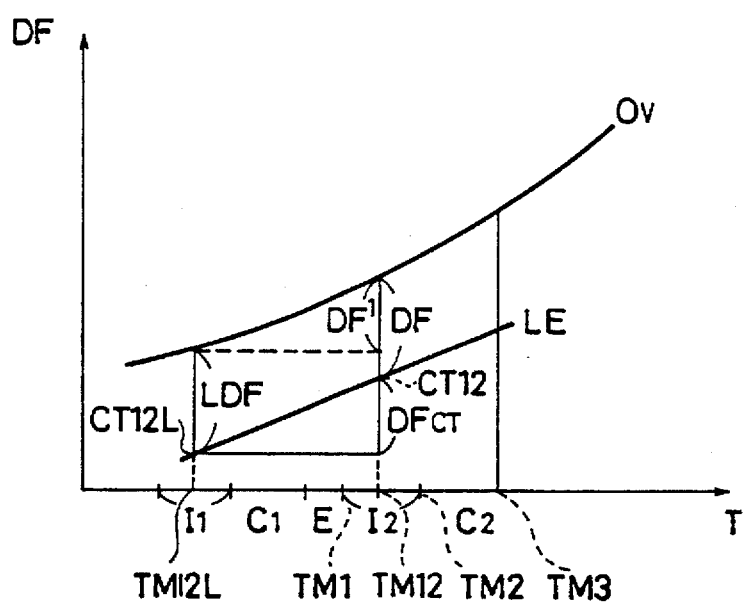
Figure 48:
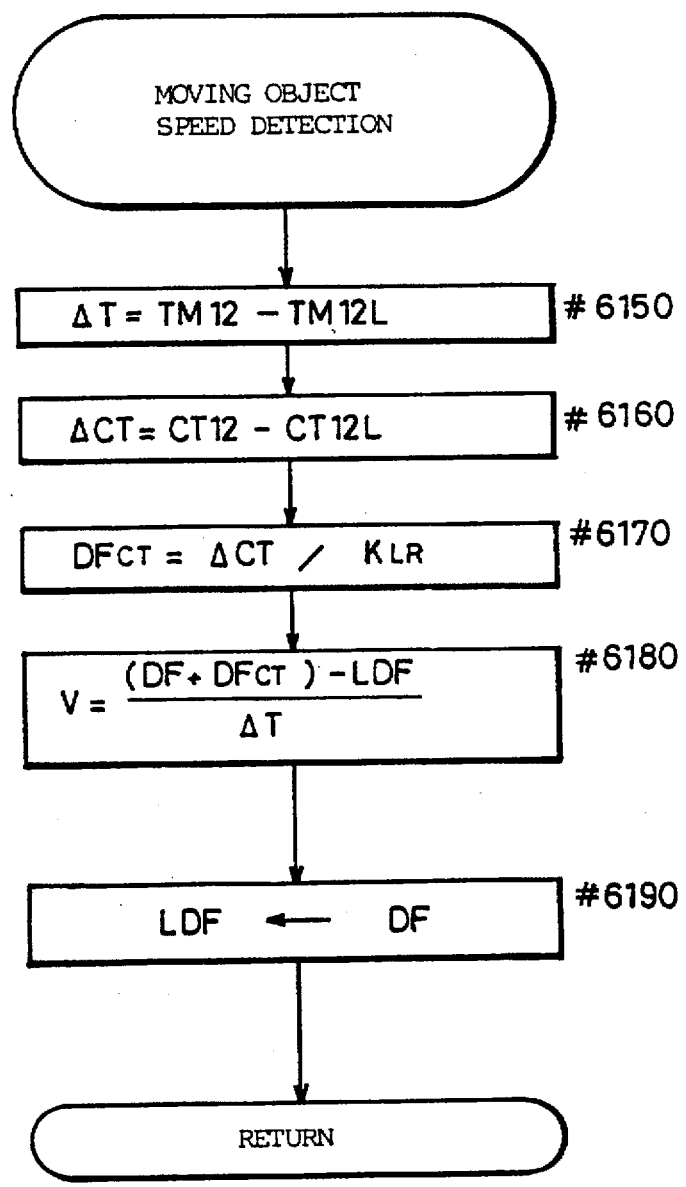
FIG. 48 is a flowchart showing detailed procedures of the moving object speed detection subroutine in FIG. 47.

The method of the moving speed detection is shown in FIG. 8 and the flow chart of the microcomputer µC using this method is shown in FIG. 48. Referring to FIG. 8, $I_1$ represents a period of the previous accumulation; $C_1$ represents a period required for the previous focus detection calculation; $I_2$ represents a period of the present accumulation; $C_2$ represents a period required for the present focus detection calculation; and E represents a period required after the end of the previous focus detection calculation to the start of the present accumulation, including a time for exposure calculation and the like. TM1 represents an accumulation start time; TM2 represents an accumulation end time; TM12 represents an intermediate point of the accumulation period; and TM3 represents a calculation end time. $O_V$ represents a defocus amount according to movement of the moving object and $L_E$ represents a value obtained by conversion of the lens drive amount to a defocus amount. The speed of the moving object is represented as a change in the defocus amount for a unit period and it is obtained in a manner in which the previous defocus amount LDF is subtracted from the present defocus amount DF and the result is divided by a period $\Delta T$ (=TM12–TM12L) taken from the previous focus detection to the present focus detection. However, if the lens is moving at this time, it is necessary to take account of this movement. More specifically, an amount DF' obtained by subtraction of the previous defocus amount LDF from the sum of the lens drive amount $DF_{CT}$ and the present defocus amount DF is divided by the period required for one focus detection. The time when the defocus amount LDF or DF is obtained is the time of end of calculation. On the other hand, the defocus amount is obtained at the intermediate point of accumulation (the intermediate point of the accumulation time). Accordingly, the time has passed by a predetermined period from the intermediate point of accumulation. Therefore, the moving amount $DF_{CT}$ obtained during this period is added to the obtained defocus amount DF.

Referring to FIG. 48, first, in step 6150, a period $\Delta T$ required for one detection is obtained by the below indicated equation.

$$\Delta T = TM12 - TM12L$$

In step 6160, a moving amount $\Delta CT$ of the lens during this period $\Delta T$ is obtained by the below indicated equation.

$$\Delta CT = CT12 - CT12L$$

In step 6170, the moving amount µCT of the lens is converted to a defocus amount $DF_{CT}$ by the below indicated equation.

$$DF_{CT} = \Delta CT / K_{LR}$$

In step 6180, the defocus amount $DF_{CT}$ caused by the movement of the lens is added to the present defocus amount DF, and the previous defocus amount LDF is subtracted from the result of the addition. Then, the result thus obtained is divided by the period $\Delta T$ and thus the speed of the moving object is obtained by the below indicated equation.

$$V=\{(DF+DF_{CT})-LDF\}/\Delta T$$

Referring again to FIG. 47, a time To from the intermediate point TM12 of the accumulation time to the calculation end point TM3 is calculated in step 6090.

$$To=(TM3-TM2)+(TM2-TM1)/2$$

In step 6100, the defocus amount ΔDF of the object moving during the above mentioned time To is obtained by the below indicated equation.

$$DF=V\times To$$

In step 6110, the defocus amount ΔDF caused by the movement of the object is added to the obtained defocus amount DF as indicated below.

$$DF=DF+\Delta DF$$

The result thus obtained is regarded as a real defocus amount and the flow returns.

Figure 49:
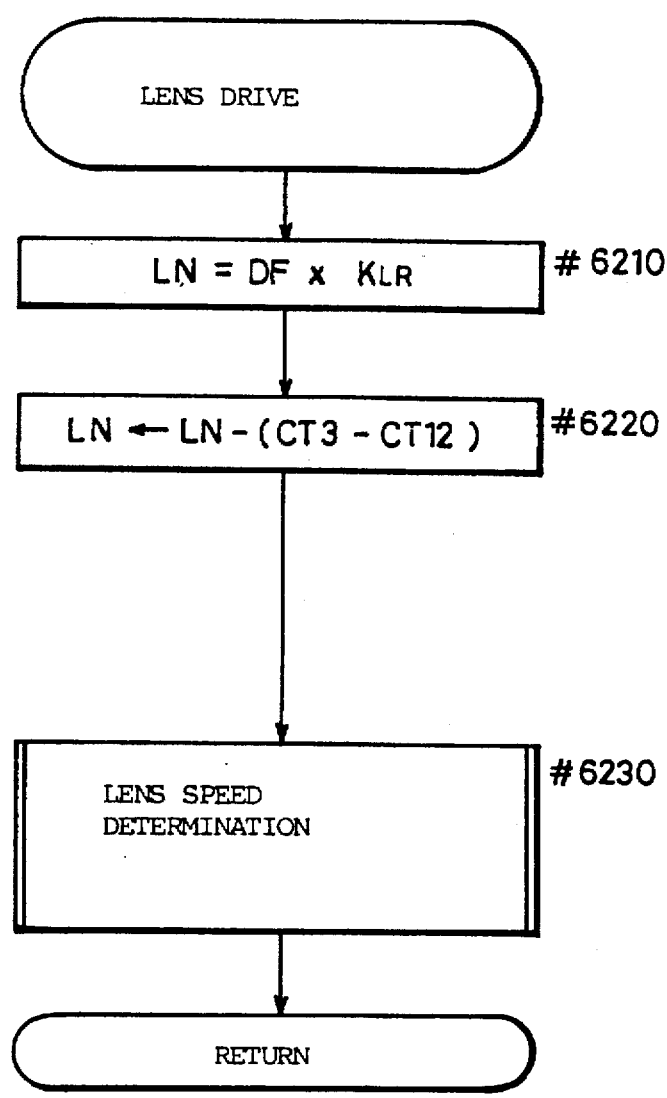
FIG. 49 is a flowchart showing detailed procedures of the lens drive subroutine in FIG. 43B.

Now, the lens drive subroutine will be described with reference to FIG. 49. In step 6210, a lens drive amount LN is obtained by multiplication of the obtained defocus amount DF by the lens drive amount conversion coefficient $K_{LR}$. In step 6220, the lens drive amount (CT3–CT12) from the intermediate point TM12 of the accumulation time to the calculation end point TM3 is subtracted from the above mentioned lens drive amount LN, so that a necessary lens drive amount LN is obtained as LN–(CT3–CT12). if the lens is stopped, CT3=CT12. In step 6230, the subroutine for lens speed determination is executed and then the flow returns.

Referring again to the flow chart of FIG. 43, if the flag MVF is set in step 5340, it is determined that moving object determination is being effected, and the flow proceeds to step 5350. In this case, an object which moves at a relatively slow speed in a direction approaching the camera (in the rear focus direction) is detected so that correction is made. In the other case of an object moving at a fast speed, the prediction mode starts to be applied from step 5480. In the case of an object moving at a relatively low speed in the direction distant from the camera, a slower change is caused on the focal plane and correction is not considered to be required. Thus, it becomes possible to reduce the number of steps in the microcomputer μC. In step 5350, the variable indicating the number of focus detections executed for obtaining an average defocus amount (to be described afterwards) is incremented by one and the flow proceeds to step 6300 (as shown in FIG. 50A).

Figure 50A:
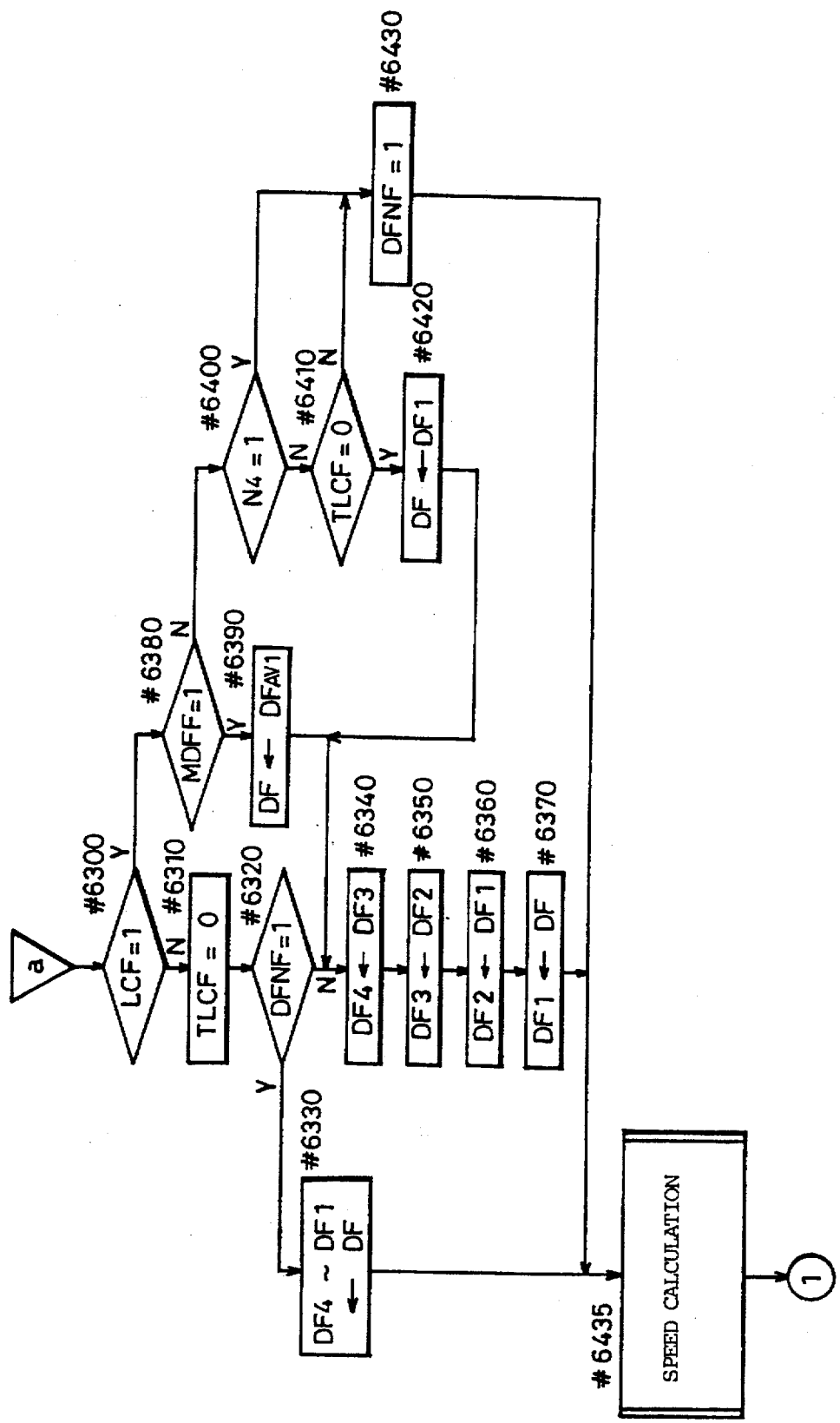
FIGS. 50A to 50C are flowcharts showing detailed procedures of the processing subsequent to the step 5350 in FIG. 43A.
Figure 50B:
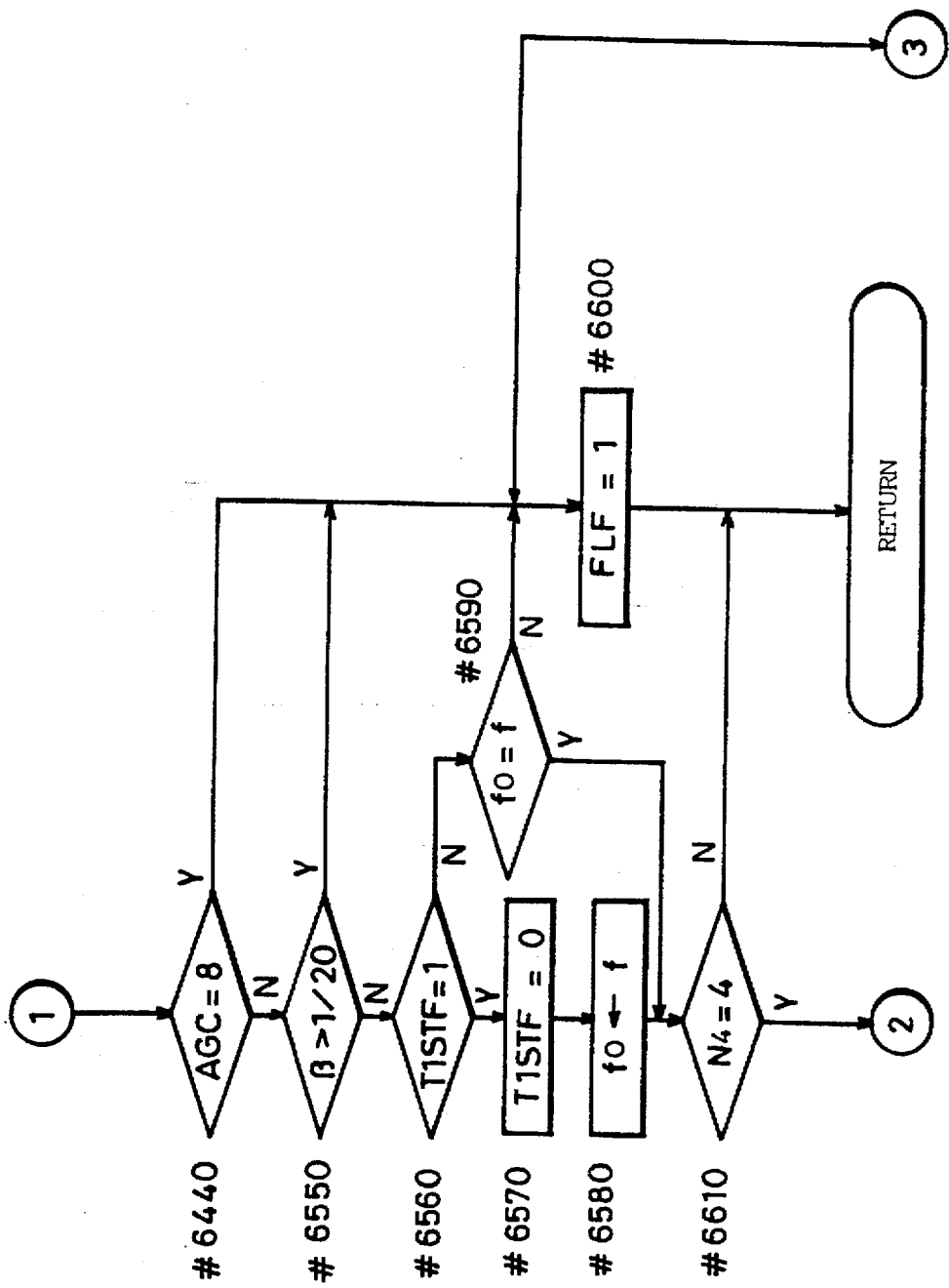
Figure 50C:
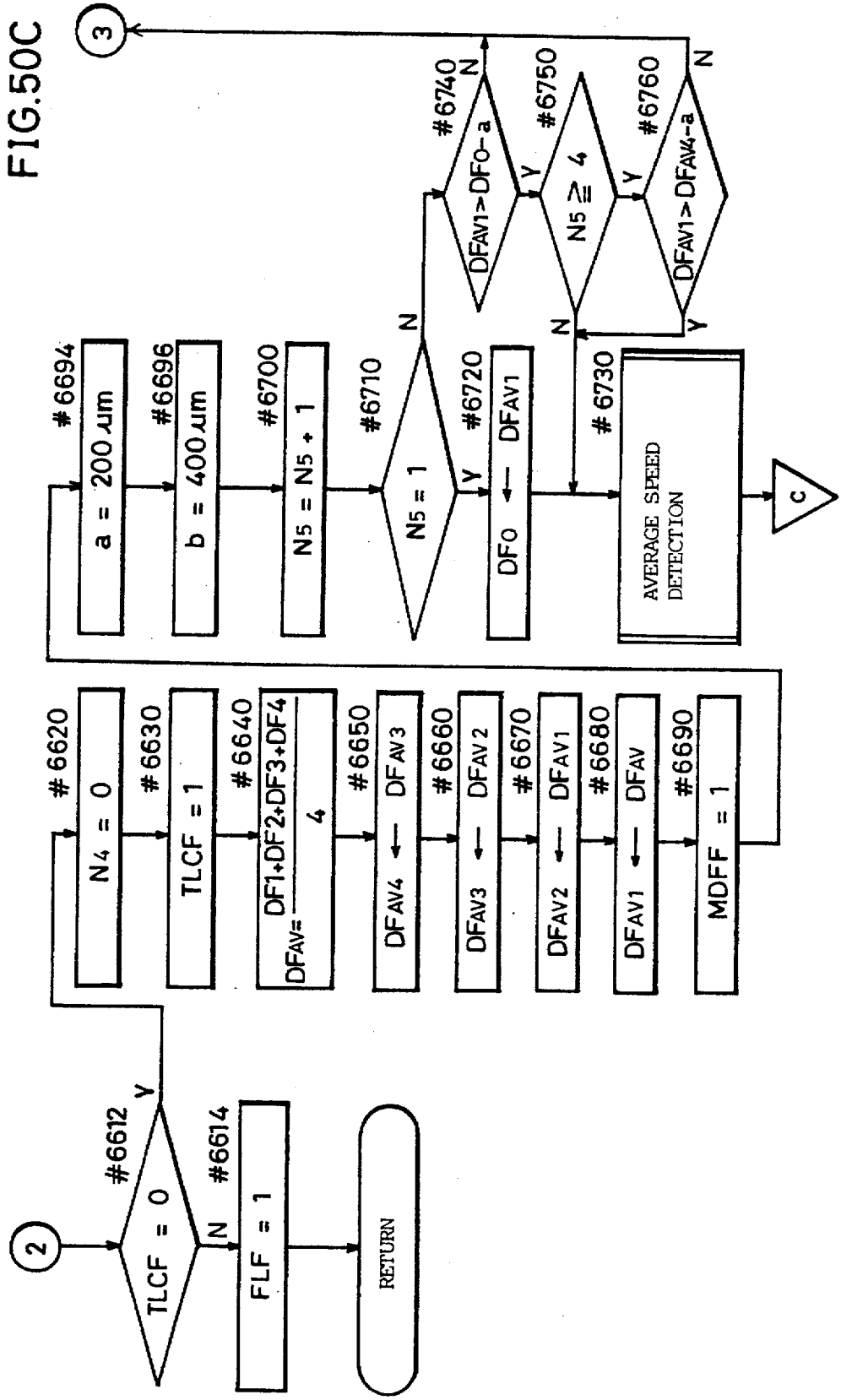

The flow proceeds to the processing shown in FIGS. 50A to 50C. In step 6300, it is determined whether the low contrast flag LCF is set or not in order to determine whether the result of the present focus detection indicates unavailable focus detection or not. If the low contrast flag LCF is not set in step 6300, it is determined that the result of the present focus detection does not indicate unavailable focus detection and, in step 6310, the flag TLCF indicating unavailable focus detection during moving object determination is reset. Then, in step 6320, it is determined whether the flag DFNF is set or not in order to determine whether focus detections for obtaining one average defocus amount are all unavailable. If the flag DFNF is set in step 6320, it is determined that the focus detections effected so far are all unavailable, and the present defocus amount DF is substituted for DF4 to DF1 indicating the four defocus amounts, whereby the flow proceeds to step 6435. If the flag DFNF is not set in step 6320, it is determined that focus detection was available at least once to obtain the average defocus amount. In steps 6340 to 6370, DF3, DF2, DF1 and DF are substituted for DF4, DF3, DF2 and DF1, respectively, so that the newest four defocus amounts are updated. Then, the flow proceeds to step 6435.

If the low contrast flag LCF is set in step 6300, it is determined that the result of the present focus detection indicates unavailable focus detection, and it is determined in step 6380 whether the flag MDFF is set or not in order to determine whether an average defocus amount has been obtained or not. If the flag MDFF is set in step 6380, it is determined that the average defocus amount has been obtained, and the previously obtained average defocus amount $DF_{AV1}$ is used as the present defocus amount DF in step 6390, and then, the flow proceeds to step 6340. The reason for using the previous average defocus amount $DF_{AV1}$, not the previous defocus amount DF1 is that the average defocus amount $DF_{AV1}$ is considered to be more stable and reliable. If the flag MDFF is not set in step 6380, it is determined that an average defocus amount has not been obtained, and it is determined in step 6400, whether the value of the variable N4 is 1 or not in order to determine whether the focus detection is the first focus detection for obtaining an average defocus amount. If N4 is not 1 in step 6400, it is determined that the focus detection is not the first focus detection, and it is determined in step 6410 whether the flag TLCF is reset or not in order to determine whether a defocus amount was obtained previously to calculate an average defocus amount. If the flag TLCF is reset in step 6420, it is determined that the defocus amount was obtained previously and, in step 6420, the previous defocus amount DF1 is used as the present defocus amount DF, whereby the flow proceeds to step 6340. If the flag TLCF is not reset in step 6410, it is determined that the defocus amount was not obtained previously, and the flow proceeds to step 6430. If N4=1 in step 6400, it is determined that the focus detection is the first focus detection, and the flow proceeds to step 6430. In step 6430, the flag DFNF Is set to indicate that all the focus detections so far were unavailable. Then, the flow proceeds to step 6435.

Figure 51:
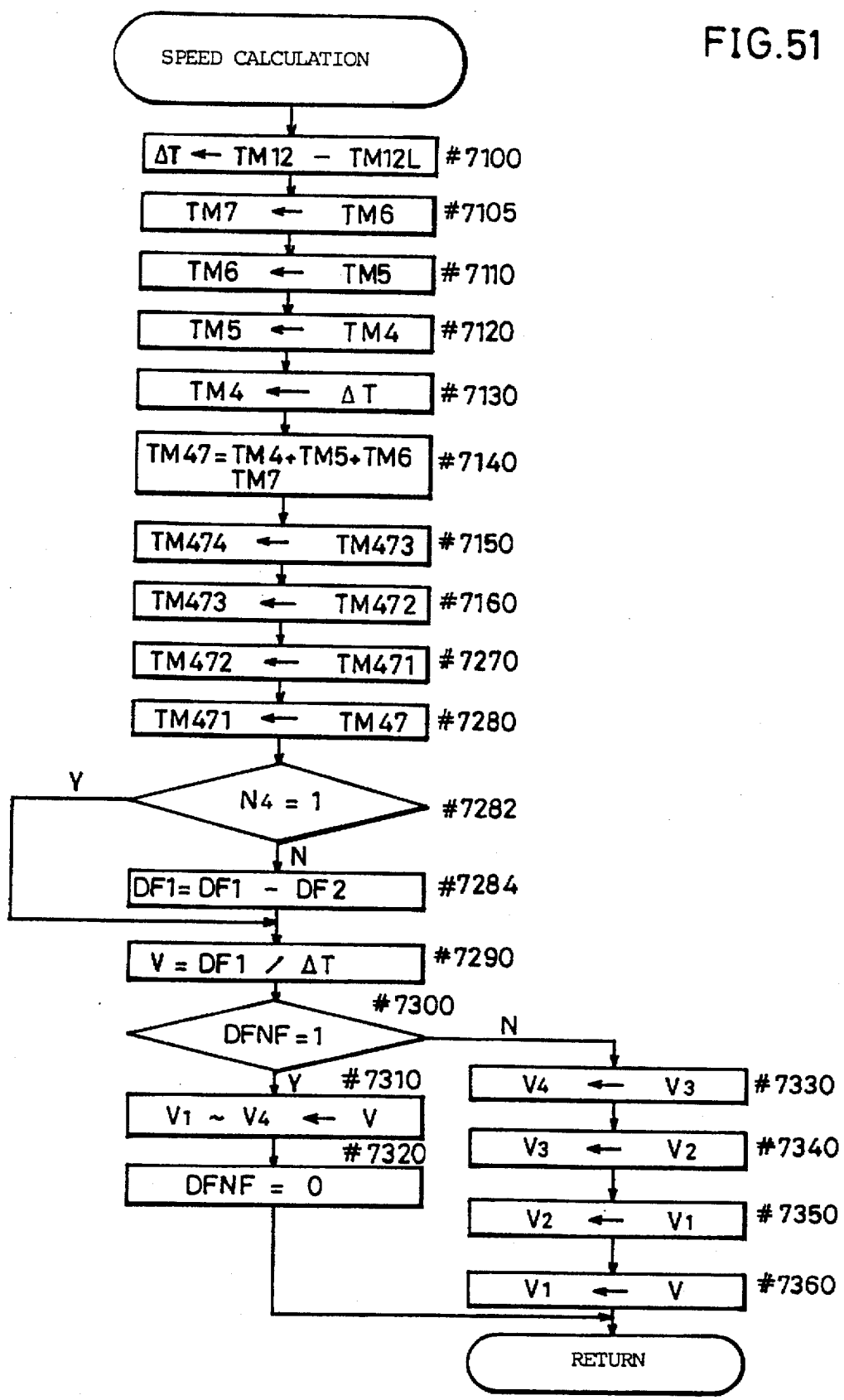
FIG. 51 is a flowchart showing detailed procedures of the speed calculation subroutine in FIG. 50A.

In step 6435, the subroutine for calculating a speed obtained for one focus detection is executed and the flow proceeds to step 6440. This subroutine is shown in FIG. 51. In step 7100, the time ΔT required for one focus detection is calculated by the below indicated equation.

$$\Delta T=TM12-TM12L$$

In the above equation, TM12 represents the intermediate point of the period of the present accumulation and TM12L represents the intermediate point of the period of the previous accumulation. In steps 7105 to 7130, TM6, TM5, TM4 and ΔT are substituted for TM7, TM6, TM5 and TM4, respectively, so that the above mentioned time T is updated by one. In step 7140, the sum TM47 of the periods required for the previous four focus detections is obtained as (TM4+ TM5+TM6+TM7). In steps 7150, 7160, 7270 and 7280, TM473 is substituted for TM474; TM472 is substituted for TM473; TM471 is substituted for TM472; and TM47 is substituted for TM471, so that the above mentioned time TM47 is updated by one. Then, in order to determine whether the focus detection for obtaining an average defocus amount is the first focus detection or not, it is determined in step 7282 whether the variable N4 is 1 or not. If the variable N4 is not 1 in step 7282, it is determined that the focus detection is not the first focus detection. Then, the previous defocus amount DF2 is subtracted from the present defocus amount DF1 so that the defocus amount DF1 caused by one focus detection is obtained as (DF1–DF2), and then the flow proceeds to step 7290. If the variable N4 is 1 in step 7282, the flow skips step 7284 and proceeds to step 7290. In step 7290, the speed V is obtained by the below indicated equation.

$$V=DF1/\Delta T$$

In step 7300, it is determined whether the flag DFNF is set or not in order to determine whether the results of the previous focus detections for obtaining an average defocus amount all indicate unavailable focus detections or not. If the flag DFNF is set in step 7300, it is determined that all the focus detections were unavailable. Then, in step 7310, the speed V is substituted for the speeds V1 to V4 and, in step 7320, the above mentioned flag DFNF is reset, whereby the flow returns. If the flag DFNF is not set in step 7300, it is determined that the focus detections were available. In steps 7330 to 7360, the speed V3 is substituted for the speed V4; the speed V2 is substituted for the speed V3; the speed V1 is substituted for the speed V2; and the speed V is substituted for the speed V1, respectively, and the speed V corresponding to the four detections is incremented by one. Then, the flow returns.

Referring again to FIG. 50B, it is determined in step 6440 whether the automatice gain control data AGC is 8 or not in order to determine whether the object has a low luminance or not. If AGC is 8 in step 6440, the data obtained by the focus detection has a low reliability and it is difficult to determine the moving object. Accordingly, the focus lock flag FLF is set in step 6600 and the flow returns. If the automatic gain control data AGC is not 8 in step 6440, it is determined in step 6550 whether the magnification β is larger than 1/20 or not. If β>1/20 in step 6550, it is difficult to determine the moving object. Accordingly, the focus lock flag FLF is set in step 6600 and the flow returns.

If β≦1/20 in step 6550, it is determined in step 6560 whether the flag T1STF is set or not in order to determine whether the moving object determination to be executed is the first determination or not. If the flag T1STF is set in step 6560, it is determined that it is the first moving object determination. Then, the flag T1STF is reset in step 6570 and, in step 6580, f is substituted for fo so that the focal length f of the lens at this determination is used as the focal length fo of the lens at the time of the first moving object determination. Then, the flow proceeds to step 6610. If the flag T1STF is not set in step 6560, it is determined in step 6590 whether the focal length f of the lens at this time is equal to the focal length fo of the lens at the time of the first moving object determination. If fo≠f in step 6590, it is determined that the focal length is changed during the moving object determination and, in step 6600, the focus lock flag FLF is set and then the flow returns. Those procedures are executed because if the focal length is changed during the moving object determination, the size of the image on the CCD for focus detection is changed and sometimes a correct defocus amount cannot be obtained, resulting in an erroneous speed of the moving object obtained by using such incorrect data. If fo=f in step 6590, the flow proceeds to step 6610.

In step 6610, it is determined whether the variable N4 is 4 or not in order to determine whether four focus detections were carried out to obtain one average defocus amount. If the variable N4 is not 4 in step 6610, the flow returns. If N4=4 in step 6610, it is determined in step 6612 whether the flag TLCF is reset or not in order to determine whether the four focus detections during the moving object determination are all unavailable or not. If the flag TLCF is not reset in step 6612, it is determined that the focus detections are unavailable and, in step 6614, the focus lock flag FLF is set, and then the flow returns. If the flag TLCF is reset in step 6612, it is determined that the focus detections are available. Then, the variable N4 is reset to 0 in step 6620 and the flag TLCF indicating unavailable focus detection during the moving object determination is set again in step 6630. In step 6640, an average value $DF_{AV}$ of the obtained four defocus amounts DF1, DF2, DF3 and DF4 is obtained as (DF1+DF2+DF3+DF4)/4. In steps 6650 to 6680, $DF_{AV3}$ is substituted for $DF_{AV4}$; $DF_{AV2}$ is substituted for $DF_{AV3}$; $DF_{AV1}$ is substituted for $DF_{AV2}$; and $DF_{AF}$ is substituted for $DF_{AF1}$, respectively, whereby the value of the average defocus amount for the four defocus amounts is updated. In step 6690, the flag MDFF is set to indicate that the average defocus amount is obtained.

Then, in steps 6694 and 6696, constants a and b to be described afterwards are set to 200 μm and 400 μm, respectively. In step 6700, the variable N5 indicating the number of average defocus amounts obtained is incremented by one. In step 6710, it is determined whether the variable N5 is 1 or not. If N5=1 in step 6710, it is determined that the first average defocus amount is obtained and the obtained average defocus amount $DF_{AV1}$ is stored as the first average defocus amount $DF_0$ in step 6720. Then, the flow proceeds to step 6730.

If the variable N5 is not 1 in step 6710, it is determined that the present average defocus amount $DF_{AV1}$ is larger than a value obtained by subtraction of the constant a from the first average defocus amount $DF_0$. The subtraction of the constant a (200 μm) is made so as to determine that the camera is directed in a different direction after obtainment of the in-focus condition to another object. Since the positive value a (>0) is subtracted, it is determined that the camera is directed toward a distant object. If DF>0, a rear focus condition occurs and if DF<0, a front focus condition occurs. If $DF_0$ and $DF_{AV1}$ are in the same rear focus direction, a relation of $DF_{AV1}>DF_0-a$ is obtained. In this case, the speed of the moving object is considered to be almost constant. If $DF_{AV1} \leq DF_0-a$, it is considered that another distant object is caught by the camera, and accordingly a focus lock is set in step 6600. According to this embodiment, an object moving in the rear focus direction with a relatively fast speed is not detected. In the case of an object moving in the front focus direction with a relatively fast speed, the condition of $DF_{AV1}<DF_0-a$ is immediately obtained after a start of the moving object determination mode and since the object moves away fast from the camera, such an object is not detected according to this embodiment. Thus, in such a case, the focus lock condition is regarded as being set and the flow proceeds to step 6600. In addition, in the case of an object moving in the front focus direction with a very slow speed, the defocus amount becomes large in the negative direction if the detection time becomes long, and accordingly the flow proceeds to the focus lock operation in step 6600. According to this embodiment, moving object determination after obtainment of the in-focus condition is effected by using an average defocus amount obtained from the results of four focus detections, so that an error in one focus detection is corrected. Thus, if an object moving in the front focus direction is determined due to such an error, the focus lock operation is not immediately started.

If $DF_{AV1}>DF_0-a$ in step 6740, it is determined in step 6750 whether the condition of N5≧4 exists in order to determine whether four or more average defocus amounts are obtained. If N5<4 in step 6750, the flow proceeds to step 6730. If N5≧4 in step 6750, it is determined in step 6760 whether the present average defocus amount $DF_{AV1}$ is larger than a value obtained by subtraction of the predetermined value a from the average defocus amount $DF_{AV4}$ which is the third one from the newest one. Thus, information on the object moving in the four focus detection periods is obtained. In this step, the speed of the object moving in the front focus direction is detected in the periods of the four focus detections. According to this embodiment, since an object moving away from the camera is not detected, if the condition of the $DF_{AV1} \leq DF_{AV4}$–a is determined in step 6760, the flow proceeds to the focus lock processing (in step 6600). If $DF_{AF1} > DF_{AV4}$–a in step 6760, the flow proceeds to step 6730. In step 6730, an average speed of the moving object is detected and the flow proceeds to step 6770 (as shown in FIG. 53A).

Figure 52:
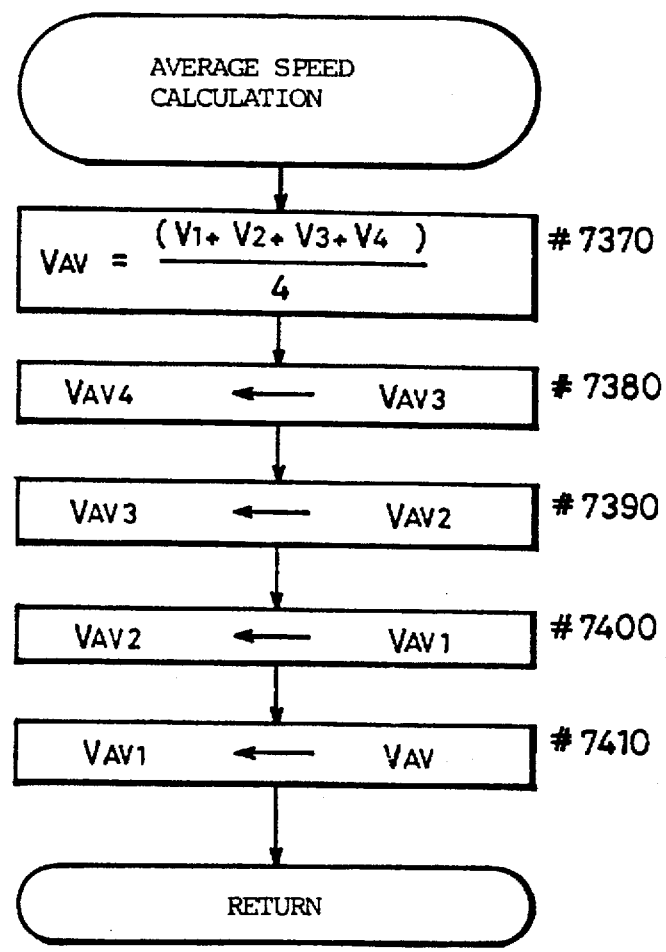
FIG. 52 is a flowchart showing detailed procedures of the average speed calculation subroutine in FIG. 50C.

The subroutine for detection of an average speed of a moving object in step 6730 will be described with reference to FIG. 52. In step 7370, an average speed $V_{AV}=(V1+V2+V3+V4)/4$ is calculated. In steps 7380 to 7410, $V_{AV3}$ is substituted for $V_{AF4}$; $V_{AV2}$ is substituted for $V_{AF3}$; $V_{AV1}$ is substituted for $V_{AV2}$; and $V_{AV}$ is substituted for $V_{AV1}$, respectively, so that the average speed for the four detections is updated. Then, the flow returns.

Figure 53A:
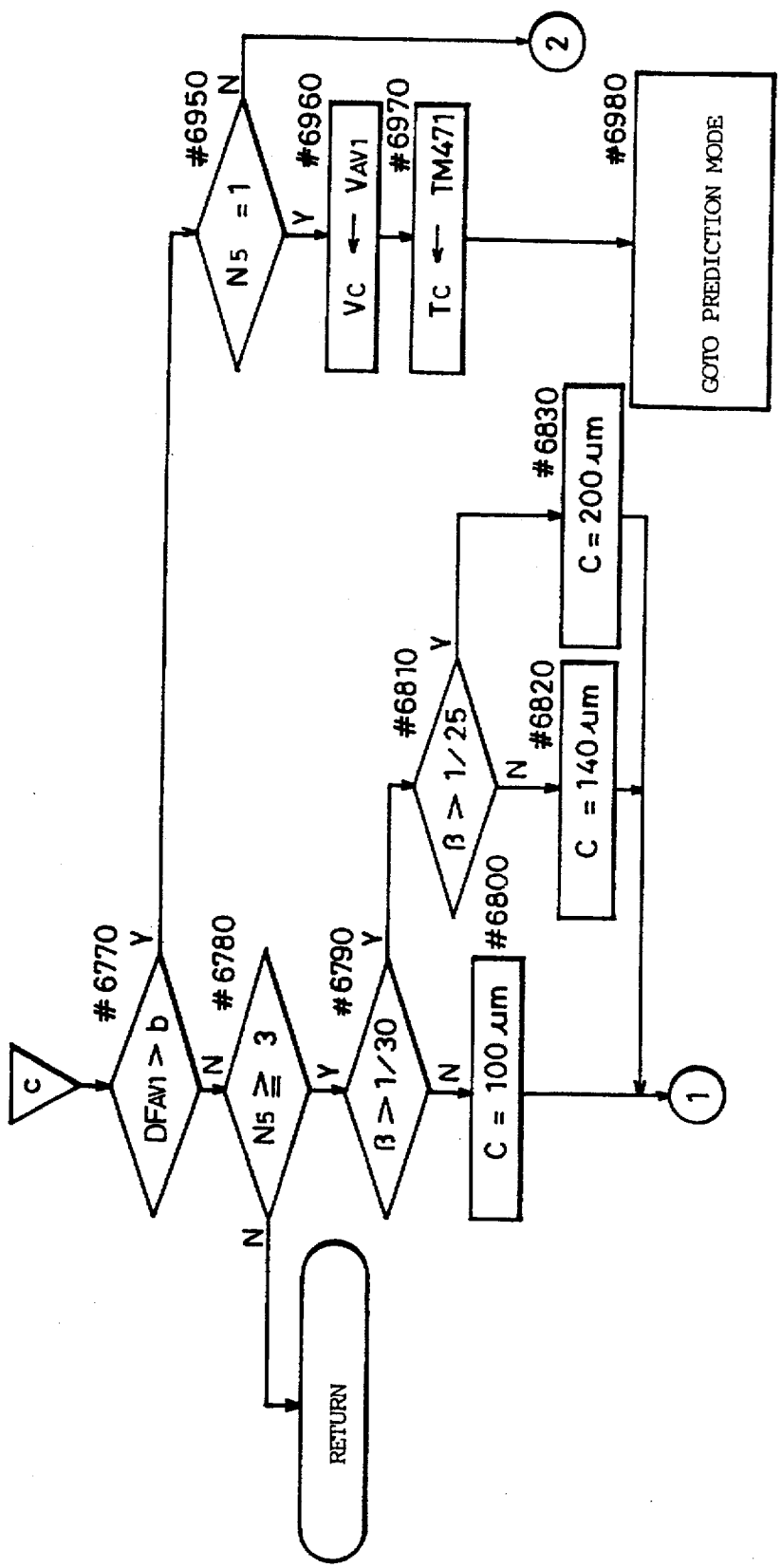
FIGS. 53A, 53B and 53C are flowcharts showing detailed procedures subsequent to the step 6730 in FIG. 50C.
Figure 53C:
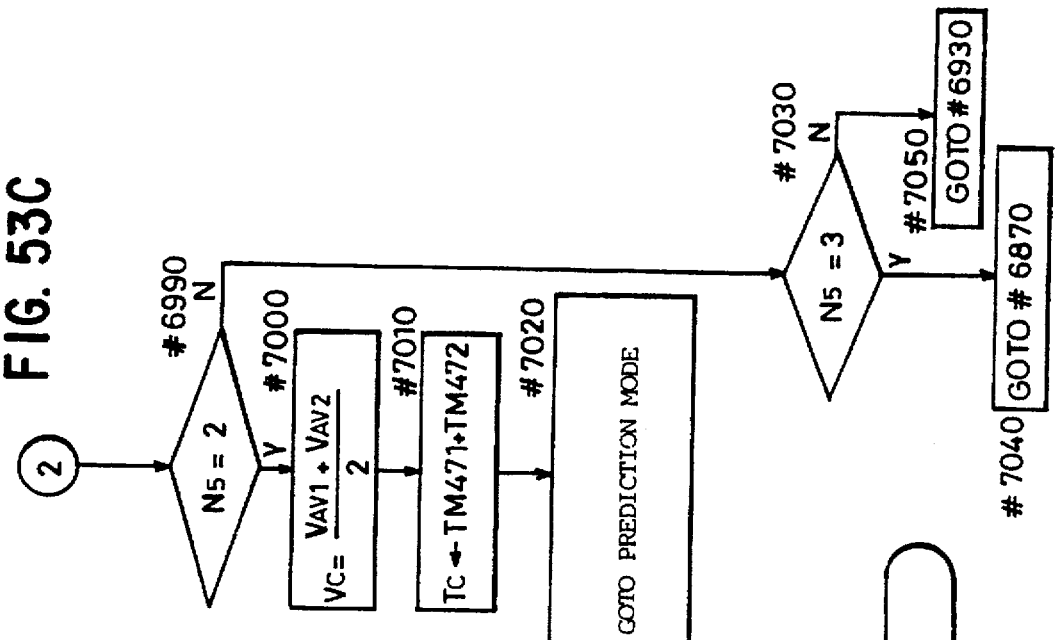
Figure 53B:
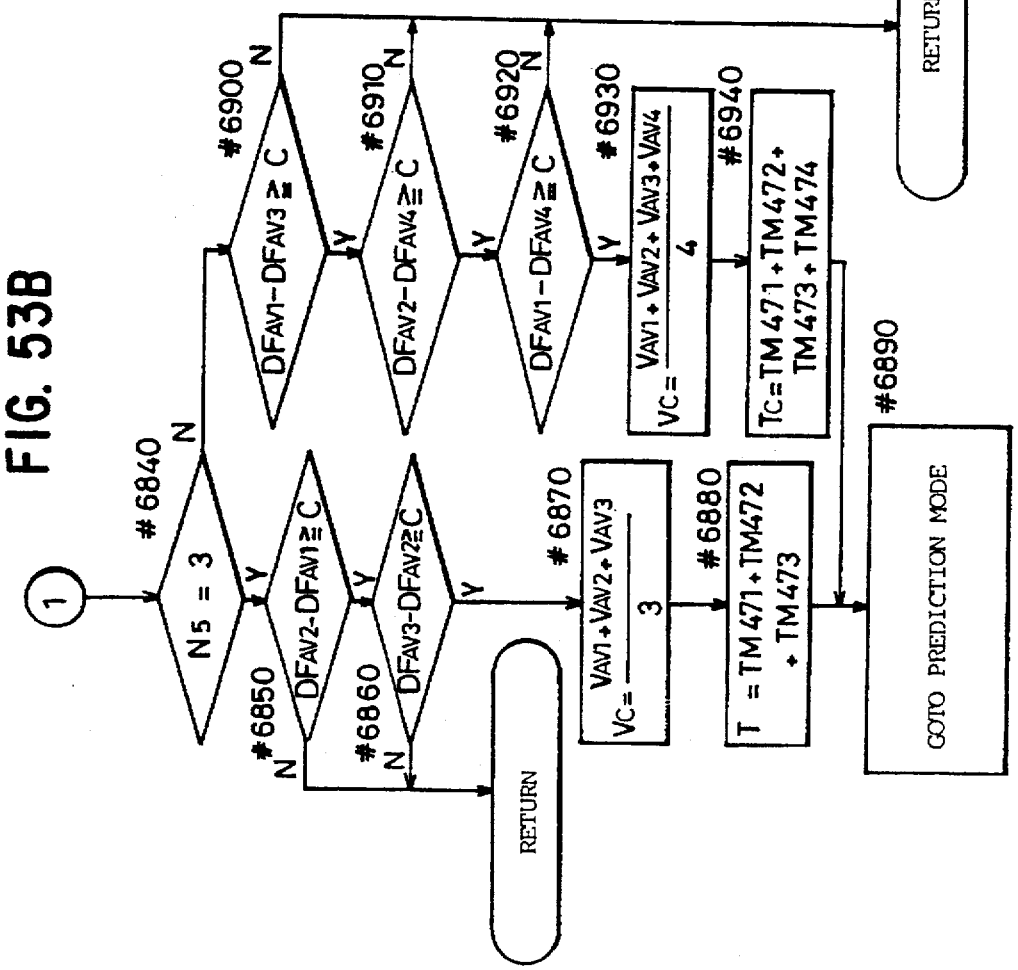

After the average speed detection (in step 6730), the flow proceeds to step 6770 shown in FIG. 53A. In step 6770, it is determined whether the present average defocus mount $DF_{AV1}$ is equal to or larger than the prescribed value b (400 µm) or not, so that it is determined whether a speed of an object approaching the camera is large or not.

If $DF_{AV1} \leq b$ in step 6770, the flow proceeds to step 6780 and it is determined whether the variable N5 is 3 or more, in order to determine whether three or more average defocus amounts are obtained or not. If the condition of N5≧3 is not determined in step 6780, it is determined that three or more average defocus amounts are not obtained. Then, the flow returns. If N5≧3 in step 6780, it is determined that three or more average defocus amounts are obtained and it is determined in step 6790 whether the magnification β is larger than 1/30 or not. If β≦1/30 in step 6790, a prescribed value c is set to 100 µm in step 6800 and the flow proceeds to step 6840. If β>1/30 in step 6790, it is determined in step 6810 whether the magnification β is larger than 1/25 or not. If β≦1/25 in step 6810, the prescribed value c is set to 140 µm in step 6820 and the flow proceeds to step 6840. If β>1/25 in step 6810, the prescribed value c is set to 200 µm in step 6830 and the flow proceeds to step 6840. The prescribed value c is a reference value for determining whether the object is a moving object or not and since the defocus amount on the focal plane becomes large with respect to movement of the object according to increase of the magnification β, the set value of the prescribed value c becomes large as the magnification β increases.

In step 6840 it is determined whether the variable N5 is 3 or not in order to determine whether three average defocus amounts are obtained. If N5=3 in step 6840, it is determined in steps 6850 and 6860 whether respective differences $(DF_{AV2}-DF_{AV1})$ and $(DF_{AV3}-DF_{AV2})$ of the continuous two average defocus amounts are larger than the above mentioned prescribed value c or not. If either of those differences is less than the prescribed value c, the flow returns. If both of the differences are equal to or larger than the prescribed value c in steps 6850 and 6860, an average value $(V_{AV1}+V_{AV2}+V_{AV3})/3$ of the three average speeds is obtained as the speed Vc of the object in step 6870. The required time Tc is calculated as TM471+TM472+TM473 in step 6880 and the prediction mode starts to be applied from the step 6890. If the variable N5 is not 3 in step 6840, it is determined that four or more average defocus amounts are obtained and it is determined in steps 6900 and 6910 whether differences $(DF_{AV1}-DF_{AV3})$ and $(DF_{AV2}-DF_{AV4})$ of the alternate average defocus amounts are equal to or larger than the prescribed value c or not. If either of those differences is less than the prescribed value c, the flow returns. Compared with the above described steps 6850 and 6860 using the three average defocus amounts, the differences of the alternate average defocus amounts are compared with the prescribed value c in these steps 6900 and 6910, because a moving object is to be detected by the averaged alternate differences so that an object moving fast can be followed up as rapidly as possible and that an object moving slow can be detected as correctly as possible. Thus, a small change in the moving speed of the object can be disregarded. If both of the differences are equal to or larger than the prescribed value c in steps 6900 and 6910, it is determined in steps 6920 whether a difference $(DF_{AF1}-DF_{AV4})$ of the defocus amounts apart from each other by two amounts is equal to or larger than the prescribed value c or not. Thus, an object moving slow can be detected accurately by the determination of the defocus amount according to an averaged movement of an object. If the above mentioned difference is smaller than the prescribed value c in step 6920, the flow returns. In step 6930, an average value $(V_{AV1}+V_{AV2}+V_{AV3}+V_{AV4})/4$ of the four average speeds is obtained as the speed Vc of the object. Further, the required time Tc is calculated as TM471+TM472+TM473+TM474 in step 6940 and the prediction mode starts to be applied from step 6890.

If $DF_{AV1} > b$ in step 6770, prediction correction is effected so that the object can be followed up. First, in order to determine whether the average defocus amount is the first defocus amount or not, it is determined in step 6950 whether the variable N5 is 1 or not. If N5=1 in step 6950, it is determined that the average defocus amount is obtained for the first time, and in step 6960, $V_{AV1}$ is substituted for the speed Vc of the object for control. In step 6970, TM471 is substituted for the time Tc required for this detection. Then, the prediction mode starts to be applied from step 6980.

The prediction correction during moving object determination shown in FIG. 47 will be described. When the prediction mode starts to be applied, the prediction correction is executed. The steps 6000 to 6030 are executed as described previously. If the flag MVF is set in step 6030, it is determined that moving object determination is being effected. Then, since the flow exits from the moving object determination, the flag MVF is reset in step 6040. The period required from the intermediate point of the present accumulation to the present moment (TM3), that is, (TM3–TM2)+(TM2–TM1)/2 is added to the time Tc required for the moving object determination, so that the time To is obtained. In step 6060, the speed Vc is multiplied by the time To, so that the defocus amount DF is obtained. Then, the flow returns.

Referring again to FIG. 53A, if the variable N5 is not 1 in step 6950, it is determined that the average defocus amount is not the first average defocus amount. Then, in order to determine whether the average defocus amount is the second one or not, it is determined in step 6990 whether the variable N5 is 2 or not. If N5=2 in step 6990, it is determined that the average defocus amount is the second one and, in step 7000, the speed Vc of the object is obtained as $(V_{AV1}+V_{AV2})/2$. In step 7010, the time Tc required in this case is calculated as TM471+TM472. Then, the prediction mode starts to be applied from step 7020.

If the variable N5 is not 2 in step 6990, it is determined that the average defocus amount is not the second one and, in order to determine whether the average defocus amount is the third one or not, it is determined in step 7030 whether the variable N5 is 3 or not. If N5=3 in step 7030, it is determined that the average defocus amount obtained is the third one and the flow proceeds to step 6870 from step 7040. If the variable N5 is not 3 in step 7030, it is determined that the average defocus amount is not the third one and the flow proceeds to step 6930 from 7050.

Figure 54A:
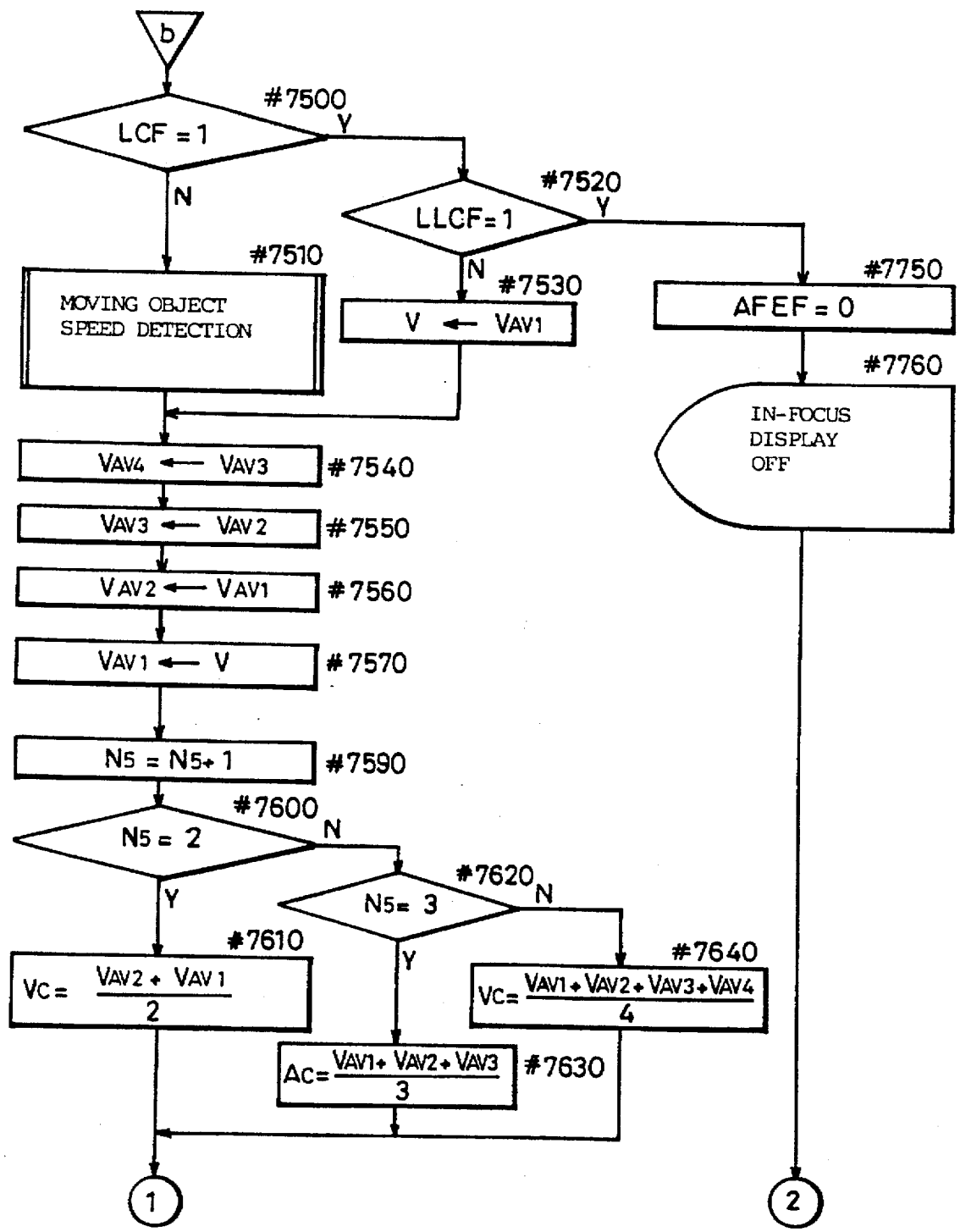
FIGS. 54A and 54B are flowcharts showing detailed procedures when the flag TRCF in FIG. 43A is set.
Figure 54B:
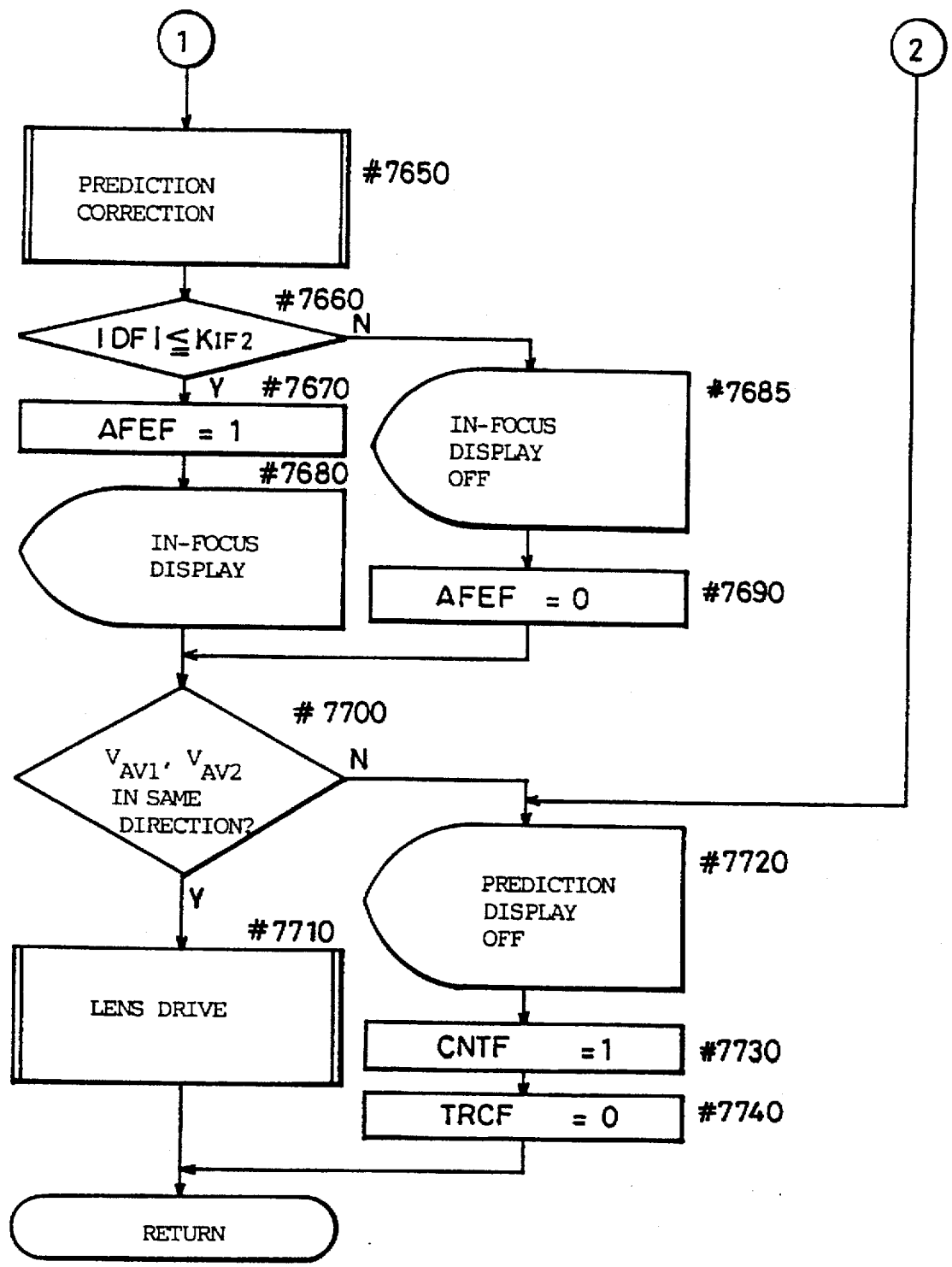

FIGS. 54A and 55B are flow charts in which the flag TRCF indicating the prediction mode is set in step 5300. In step 7500, it is determined whether the flag LCF is set or not in order to determine whether the present focus detection is unavailable or not. If the flag LCF is not set in step 7500, the speed of the moving object is detected in step 7510 and the flow proceeds to step 7540. If the flag LCF is set in step 7500, it is determined that the result of the present focus detection is unavailable and it is determined in step 7520 whether the flag LLCF is set or not in order to determine whether the previous focus detection was also unavailable or not. If the flag LLCF is not set in step 7520, it is determined that the previous focus detection was available, and the previously speed $V_{AV1}$ is substituted for the present speed V, whereby the flow proceeds to step 7540. In steps 7540 to 7570, $V_{AV3}$ is substituted for $V_{AV4}$; $V_{AV2}$ is substituted for $V_{AV3}$; $V_{AV1}$ is substituted for $V_{AV2}$; and V is substituted for $V_{AV1}$, respectively, so that the average speed is updated. The average speed is the speed of one focus detection in the prediction mode. Then, in step 7590, the variable N5 indicating the number of average speeds (average defocus amounts) obtained is incremented by one. In step 7600, it is determined whether the variable N5 is 2 or not. If N5=2 in step 7600, the speed Vc used for the control is calculated by the below indicated equation and the flow proceeds to step 7650.

$$Vc=(V_{AV2}+V_{AV1})/2$$

If N5≠2 in step 7600, it is determined in step 7620 whether the variable N5 is 3 or not. If N5=3 in step 7620, the speed Vc used for the control is calculated by the below indicated equation in step 7630 and the flow proceeds to step 7650.

$$Vc=(V_{AV3}+V_{AV2}+V_{AV1})/3$$

If N5≠3 in step 7620, the speed Vc used for the control is calculated by the below indicated equation in step 7640 and the flow proceeds to step 7650.

$$Vc=(V_{AV4}+V_{AV3}+V_{AV2}+V_{AV1})/4$$

In step 7650, prediction correction is effected based on the obtained speed Vc, so that the defocus amount DF for lens control is obtained. In step 7660, it is determined whether or not the absolute value |DF| of this defocus amount is equal to or smaller than a prescribed defocus amount $K_{IF2}$. In this case, $K_{IF2}$ is set to a value larger than an in-focus determination level $K_{IF1}$ at the time of stop of the lens. This setting takes account of fluctuations of detected values of the speed.

If |DF|≤$K_{IF2}$ in step 7660, an in-focus condition is determined and the flag AFEF indicating the in-focus condition is set in step 7670. An in-focus display is given in 7680 and the flow proceeds to step 7700. If |DF|>$K_{IF2}$ in step 7660, an out-of-focus condition is determined. In step 7685, the in-focus display is turned off and the flag AFEF indicating the in-focus condition is reset in step 7690. Then, the flow proceeds to step 7700.

In step 7700, it is determined whether the present speed $V_{AV1}$ and the previous speed $V_{AV2}$ are given in the same direction or not. If the speeds $V_{AV1}$ and $V_{AV2}$ are given in the same direction in step 7700, the lens is driven in step 7710 based on the defocus amount DF obtained in step 7650 and then the flow returns. If the speeds $V_{AV1}$ and $V_{AV2}$ are not in the same direction in step 7700, the prediction display is turned off in step 7720 so that the processing flow exits from the prediction mode. The flag CNTF is set in step 7730 and the prediction flag TRCF is reset in step 7740, whereby the flow returns. In this case, the continuous flag CNTF is set so as to focus on the object which may move in any direction thereafter since it does not move in a specified direction. However, in the continuous mode, lens drive cannot be effected by predicting the movement of the moving object (and the defocus amount in accordance with the movement).

If the flag LLCF is set in step 7520, it is determined that the previous focus detection was also unavailable and the movement of the object is predicted based on the result of the further previous focus detection so that the object can be followed up. In such a case, the prediction would be incorrect and therefore in order to terminate the prediction mode, the flag AFEF indicating the in-focus condition is reset in step 7750 and the in-focus display is turned off in step 7760. Then, the flow proceeds to the procedures starting from step 7720.

As described in the foregoing, according to the present invention, an appropriate algorithm for determining a defocus amount for in-focus determination or lens drive based on the defocus amounts in a plurality of areas of the photographing image area is selected according to the sequence of the camera. Consequently, compared with the prior art which normally uses only the algorithm for determining one defocus amount, the probability of focus detection for one object to be photographed is improved and the time required for the focus detection can be reduced considerably.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus detecting apparatus comprising:
   plural pieces of image sensor located separately from each other, at locations respectively corresponding to plural areas in an objective field, for generating image data in accordance with an object image formed on the plural pieces of image sensor;
   a focus detector which detects a focus condition of the object based on the image data, said focus detector being capable of detecting plural focus conditions respectively corresponding to said plural areas;
   a selector which selects one of said plural areas based on the detected plural focus conditions; and
   a controller which determines whether the object is moving in an approaching or receding direction or not based on a focus condition detected at the selected area.

2. The focus detecting apparatus according to claim 1, further comprising:
   a second selector, operating when the object is determined to be moving by said controller, for selecting one of said plural areas to be subjected to automatic focus control based on the detected plural focus conditions; and
   driving device for driving a focusing lens based on a focus condition detected at the area selected by said second selector.

3. The focus detecting apparatus according to claim 2, wherein said controller determines whether the object is moving or not based on the detected plural focus conditions after the end of driving the focusing lens by said driving device.

4. The focus detecting apparatus according to claim 1, wherein said focus detector continuously detects plural focus conditions respectively corresponding to plural areas and said controller determines whether the object is moving or not based on focus conditions continuously detected at the selected area.

5. The focus detecting apparatus according to claim 1, wherein said plural pieces of image sensors are line sensors.

6. The focus detecting apparatus according to claim 1, further comprising an indicator which indicates that the object is moving when said controller determines that the object is moving.

7. The focus detecting apparatus according to claim 1, wherein said focus detecting apparatus is applied to a camera.

8. The focus detecting apparatus according to claim 1, wherein said selected device selects one of said plural areas to be subjected to automatic focus control.

9. The focus detecting apparatus according to claim 8, wherein said selector selects one area in which a nearest object stands.

10. The focus detecting apparatus according to claim 8, wherein said selector gives precedence to a central area among the plural areas.

11. The focus detecting apparatus according to claim 8, wherein said selector selects one area at which detected focus condition has high reliability.

12. A method for detecting a focus condition, said method comprising the steps of:

providing plural pieces of image sensor located separately from each other, at locations respectively corresponding to plural areas in an objective field;

generating image data in accordance with an object image formed on the plural pieces of image sensor;

detecting plural focus conditions of the object respectively corresponding to said plural areas based on the generated image data; and determining whether the object is moving in an approaching or receding direction or not based on the detected plural focus conditions.

13. The method according to claim 12, further comprising the steps of:

selecting one of said plural areas to be subjected to automatic focus control based on the detected plural focus conditions; and driving a focusing lens based on a focus condition detected at the selected area.

14. The method according to claim 13, wherein said selecting step includes the step of selecting one area in which a nearest object stands.

15. The method according to claim 13, wherein said selecting step includes the step of giving precedence to a central area among the plural areas.

16. The method according to claim 13, wherein said selecting step includes the step of selecting one area at which detected focus condition has high reliability.

17. A focus detecting apparatus comprising:

image sensing device for generating image data in accordance with an object image formed thereon;

a focus detector which detects a focus condition of the object based on the generated image data, said focus detector being capable of detecting plural focus conditions respectively corresponding to plural specific areas in an object field;

a selector which selects one of said plural specific areas based on the detected plural focus conditions; and a controller for whether the object is moving in an approaching or receding direction or not based on a focus condition detected at the selected area.

18. The focus detecting apparatus according to claim 17, wherein said image sensing device has plural pieces of image sensor located at positions respectively corresponding to said plural specific areas.

19. The focus detecting apparatus according to claim 17, wherein said plural specific areas are predetermined fixed areas.

20. A focus adjusting apparatus comprising:

image sensing device for generating image data in accordance with an object image formed thereon;

focus detecting device for detecting a focus condition of the object based on the image data, said focus detecting device being capable of detecting plural focus conditions respectively corresponding to plural areas in an objective field;

determining device for determining whether the object is moving in an approaching or receding direction not based on the detected plural focus conditions;

calculating device, operating when the object is determined to be moving, for calculating an amount of correction corresponding to movement of an object image position caused by movement of the object;

correcting device for correcting the focus condition detected by said focus detecting device based on the calculated amount of correction; and driving device for driving a focusing lens based on the corrected focus condition.

21. The focus adjusting apparatus according to claim 20, wherein said focus detecting device continuously detects a focus condition and said calculating device calculates the amount of correction based on the continuously detected focus conditions.

22. The focus adjusting apparatus according to claim 20, further comprising a display device for indicating that the detected focus condition is corrected by said correcting device.

* * * * *